US009776747B2

United States Patent
Takahashi et al.

(10) Patent No.: US 9,776,747 B2
(45) Date of Patent: Oct. 3, 2017

(54) PACKAGING DEVICE

(71) Applicant: Brother Kogyo Kabushiki Kaisha, Nagoya-shi, Aichi-ken (JP)

(72) Inventors: Toshihiro Takahashi, Nagoya (JP); Teruo Imamaki, Nissin (JP); Yohei Nishimura, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 537 days.

(21) Appl. No.: 14/451,679

(22) Filed: Aug. 5, 2014

(65) Prior Publication Data
US 2015/0033679 A1  Feb. 5, 2015

(30) Foreign Application Priority Data

Aug. 5, 2013 (JP) ................................. 2013-162689
May 21, 2014 (JP) ................................. 2014-104891

(51) Int. Cl.
*B65B 11/08* (2006.01)
*H02P 1/22* (2006.01)
(Continued)

(52) U.S. Cl.
CPC ............ *B65B 11/08* (2013.01); *B65B 13/025* (2013.01); *B65B 13/305* (2013.01);
(Continued)

(58) Field of Classification Search
CPC ......... B65B 11/00; B65B 11/08; B65B 35/24; B65B 41/16; B65B 51/10; B65B 57/04;
(Continued)

(56) References Cited

U.S. PATENT DOCUMENTS 2,980,231 A * 4/1961 Mahaffy ................. B26D 7/06
198/434
3,815,313 A * 6/1974 Heisler .................. B65B 9/026
206/497
(Continued)

FOREIGN PATENT DOCUMENTS

DE 102011114522 A1 4/2013
EP 1500592 A1 1/2005
(Continued)

OTHER PUBLICATIONS

Aug. 28, 2015—(EP) Office Action—App 14179368.7.
(Continued)

*Primary Examiner* — Hemant M Desai
*Assistant Examiner* — William A Weller
(74) *Attorney, Agent, or Firm* — Banner & Witcoff, Ltd.

(57) ABSTRACT

A packaging device includes a conveyance mechanism, a guide portion and a control portion. The control portion is configured to cause a first section of a film to be bonded to a base, cause the conveyance mechanism to convey the base toward a downstream side in a conveyance direction, move the guide portion along a movement path, cause the conveyance mechanism to convey the base toward the upstream side, cause a second section of the film to be bonded to the base, and cause the film to be moved in an opposite direction to a feeding direction at any time during a period after the first section is bonded to the base and before the second section is bonded to the base, the feeding direction being a direction in which the film is fed out when the base is conveyed.

16 Claims, 58 Drawing Sheets

(51) Int. Cl.
| | |
|---|---|
| *H02P 1/16* | (2006.01) |
| *B65B 35/24* | (2006.01) |
| *B65B 51/10* | (2006.01) |
| *B65B 41/16* | (2006.01) |
| *B65B 57/04* | (2006.01) |
| *B65B 13/02* | (2006.01) |
| *B65B 13/30* | (2006.01) |
| *B65B 13/34* | (2006.01) |

(52) U.S. Cl.
CPC ............ *B65B 13/345* (2013.01); *B65B 35/24* (2013.01); *B65B 41/16* (2013.01); *B65B 51/10* (2013.01); *B65B 57/04* (2013.01); *H02P 1/166* (2013.01); *H02P 1/22* (2013.01)

(58) Field of Classification Search
CPC ......... B65B 11/06; B65B 11/10; B65B 41/12; B65B 47/24; B65B 51/22; B65B 57/08; B65B 61/06
USPC ..................... 53/64, 228, 556, 203
See application file for complete search history.

(56) References Cited

U.S. PATENT DOCUMENTS

| | | | | |
|---|---|---|---|---|
| 4,509,314 | A * | 4/1985 | Bozza | B65B 11/10 53/228 |
| 4,609,101 | A * | 9/1986 | Ullman | B65B 53/02 206/432 |
| 4,674,269 | A * | 6/1987 | Denda | B65B 11/54 53/228 |
| 4,770,289 | A * | 9/1988 | Ganz | B65B 21/245 198/734 |
| 5,115,620 | A * | 5/1992 | Takamura | B65B 57/00 53/222 |
| 5,205,104 | A * | 4/1993 | Nakashima | B65B 11/54 53/389.2 |
| 5,595,042 | A * | 1/1997 | Cappi | B65B 11/54 53/228 |
| 5,855,106 | A * | 1/1999 | Koyama | B65B 11/54 53/168 |
| 6,247,293 | B1 * | 6/2001 | Todd | B31B 19/00 53/329.2 |
| 6,370,839 | B1 * | 4/2002 | Nakagawa | B65B 11/008 52/211 |
| 6,688,082 | B1 * | 2/2004 | Loperfido | B65B 59/00 53/228 |
| 6,848,240 | B2 * | 2/2005 | Frey | B65B 11/00 53/556 |
| 7,117,658 | B2 | 10/2006 | Malini | |
| 7,454,877 | B2 * | 11/2008 | Morrison | B65B 13/06 100/26 |
| 8,001,745 | B2 * | 8/2011 | Carter | B65B 11/025 53/389.4 |
| 8,448,412 | B2 * | 5/2013 | Cere | B65B 11/025 53/399 |
| 2004/0031242 | A1 | 2/2004 | Cerf | |
| 2005/0016127 | A1 | 1/2005 | Malini | |
| 2005/0193880 | A1 * | 9/2005 | Chao | B26D 1/385 83/349 |
| 2013/0167477 | A1 | 7/2013 | Vasse et al. | |
| 2014/0311096 | A1 | 10/2014 | Harms et al. | |

FOREIGN PATENT DOCUMENTS

| | | |
|---|---|---|
| JP | S55-10552 U | 1/1980 |
| JP | S55-010552 B2 | 3/1980 |
| JP | S56-074425 A | 6/1981 |
| JP | H01-111604 A | 4/1989 |
| JP | H07-187114 A | 7/1995 |
| JP | H07291210 A | 11/1995 |
| JP | 2003-175916 A | 6/2003 |
| JP | 2011-105392 A | 6/2011 |
| JP | 2013-233968 A | 11/2013 |

OTHER PUBLICATIONS

Nov. 5, 2014—(EP) Extended Search Report—App 14179368.7.
Mar. 21, 2017—(JP) Notification of Reasons for Rejection—App 2013-162689.

* cited by examiner

FIG. 7
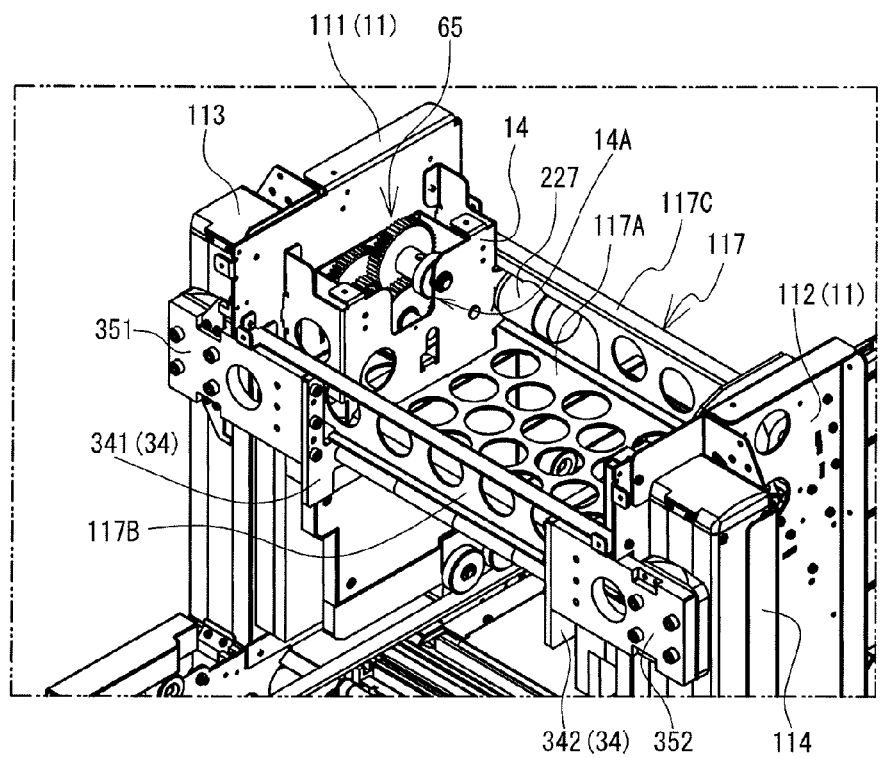
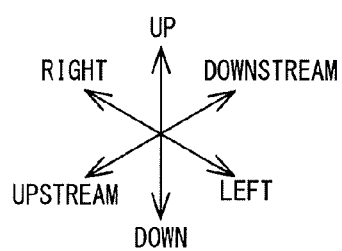

FIG. 47

| TENSION (N) | RADIUS OF FILM ROLL (mm) | FIRST DUTY RATIO | SECOND DUTY RATIO |
|---|---|---|---|
| 1 | 3 | 0.5 | 0.1 |
| 1 | 4 | 0.6 | 0.2 |
| 1 | 5 | 0.7 | 0.3 |
| 2 | 3 | 0.6 | 0.2 |
| 2 | 4 | 0.7 | 0.3 |
| 2 | 5 | 0.8 | 0.4 |
| 3 | 3 | 0.7 | 0.3 |
| 3 | 4 | 0.8 | 0.4 |
| 3 | 5 | 0.9 | 0.5 |

PACKAGING DEVICE

CROSS-REFERENCE TO RELATED APPLICATION

This application claims priority to Japanese Patent Application No. 2013-162689 filed on Aug. 5, 2013, and also claims priority to Japanese Patent Application No. 2014-104891 filed on May 21, 2014. The disclosure of the foregoing applications is herein incorporated by reference in its entirety.

BACKGROUND

The present disclosure relates to a packaging device that is configured to package an object that is placed on a plate-shaped base by covering both the object and the base with a film.

A packaging device is proposed that is configured to package an object by covering the object with a film. For example, in a packaging device, a film is disposed in a position such that the film intersects a conveying surface and along which a conveyed object passes. The object may be conveyed from the upstream side toward the film. The film may be pulled toward the downstream side by the object. The film may firmly be attached to the object by being pressed against the object with a strength corresponding to tension. The packaging device cuts the film by melting the film on the upstream side of the object. The object may be sealed by the film. The packaging device can also package an object that is placed on a plate-shaped base with the film, together with the base.

SUMMARY

In the above-described packaging device, when the tension of the film is increased, a force toward the upstream side is applied from the film to the object. As a result, there may be cases in which the object is not conveyed toward the downstream side or the object is deformed. On the other hand, when the tension of the film is reduced, there may be a case in which the film is not firmly attached to the object. In these cases, there may be a problem that the packaging device cannot appropriately package the object with the film.

Various exemplary embodiments of the general principles described herein provide a packaging device that is capable of appropriately packaging an object.

Various exemplary embodiments herein provide a packaging device configured to package, with a film, a base and an object placed on the base. The packaging device includes a conveyance mechanism, a guide portion, and a control portion. The conveyance mechanism is configured to convey the base on which the object is placed. The guide portion is configured to move along a movement path and configured to guide the film. The movement path extends in a direction that intersects a conveyance path along which the base conveyed by the conveyance mechanism passes. The control portion is configured to cause a first section of the film to be bonded to the base. The first section is a part of the film. The control portion is also configured to cause the conveyance mechanism to convey the base from an upstream side toward a downstream side in a conveyance direction with respect to an intersection position. The intersection position is a position at which the conveyance path and the movement path intersect. The control portion is further configured to move the guide portion along the movement path when the base is conveyed toward the downstream side and an edge of the base on the upstream side is moved farther toward the downstream side than the intersection position. The control portion is further configured to cause the conveyance mechanism to convey the base toward the upstream side after the guide portion is moved. The control portion is further configured to cause a second section of the film to be bonded to the base when the base is conveyed toward the upstream side and the edge of the base on the upstream side is moved farther toward the upstream side than the intersection position. The second section is a part of the film and is different from the first section. The control portion is further configured to cause the film to be moved in an opposite direction to a feeding direction at any time during a period after the first section is bonded to the base and before the second section is bonded to the base. The feeding direction is a direction in which the film is fed out when the base is conveyed.

BRIEF DESCRIPTION OF DRAWINGS

FIG. 7 is a perspective view of an area in the vicinity of the upper end of a side plate portion 11;

FIG. 47 is a diagram that shows a parameter table 2021;

DESCRIPTION OF EMBODIMENTS

Figure 1:
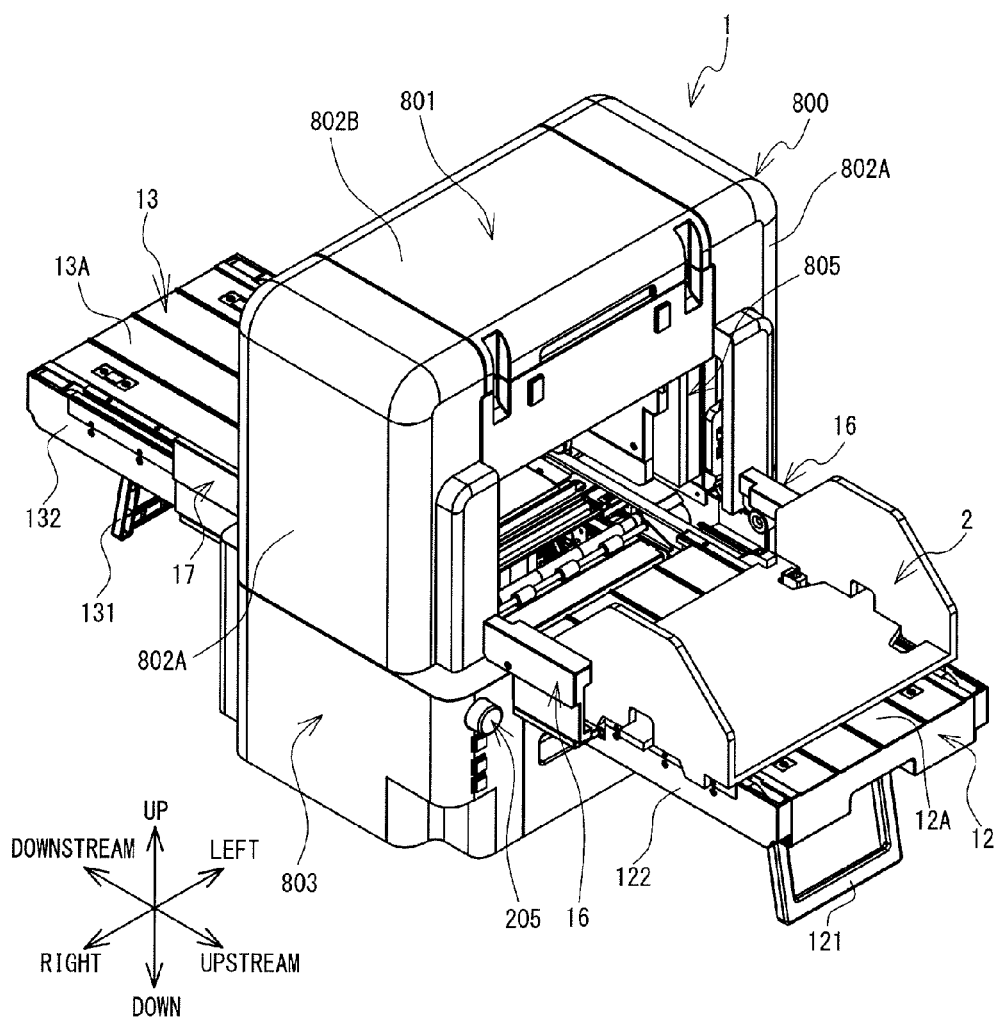
FIG. 1 is a perspective view of a packaging device 1 (in a state in which a housing 800 is mounted) according to a first embodiment.

Hereinafter, embodiments will be explained with reference to the drawings. First, a packaging device 1 according to a first embodiment will be explained with reference to FIG. 1 to FIG. 42. The packaging device 1 is configured to package an object 3 that is placed on a base 2, such as a piece of cardboard or the like, by fixing the object 3 to the base 2 by covering the object 3 with a film 24. Hereinafter, packaging the object 3 in this manner is referred to as "packaging the base 2 and the object 3". The packaging device 1 is configured to package the base 2 and the object 3 while conveying the base 2, on which the object 3 is placed, from the lower right side toward the upper left side of FIG. 1. The upper side, the lower side, the lower left side and the upper right side of FIG. 1 are respectively defined as the upper side, the lower side, the right side and the left side of the packaging device 1. The lower right side and the upper left side of FIG. 1 are respectively defined as the upstream side and the downstream side in a conveyance direction.

Figure 2:
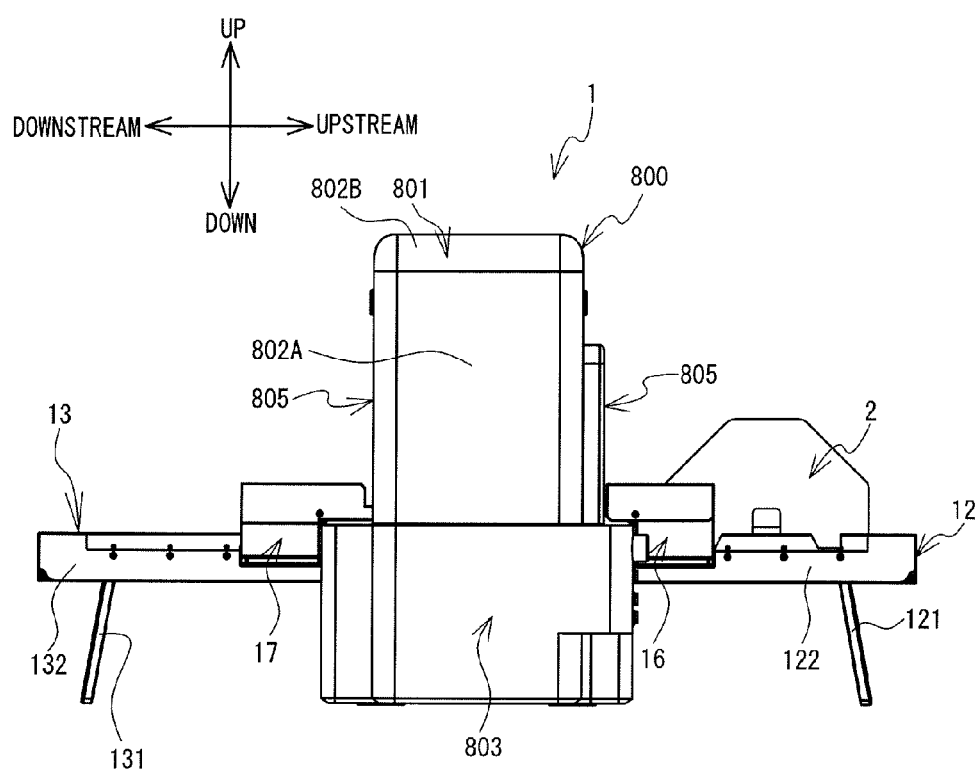
FIG. 2 is a right side view of the packaging device 1 (in a state in which the housing 800 is mounted)

As shown in FIG. 1 and FIG. 2, the packaging device 1 includes a housing 800. The housing 800 has a substantially rectangular parallelepiped shape that is long in the up-down direction. The housing 800 includes an upper housing 801 and a lower housing 803. The lower housing 803 has a substantially rectangular parallelepiped shape that is long in the left-right direction. The upper housing 801 includes two standing portions 802A and a bridge portion 802B. The two standing portions 802A respectively extend upward from the left and right end portions of the lower housing 803. The bridge portion 802B is provided between the upper end portions of the two standing portions 802A. The two standing portions 802A respectively cover side plate portions 11 (refer to FIG. 3, to be described later) from the outside in the left-right direction. The bridge portion 802B covers a film cassette 21 (refer to FIG. 3, to be described later) from the upper side. An opening 805 that is surrounded by the lower housing 803, the two standing portions 802A and the bridge portion 802B is formed in each of the upstream side surface and the downstream side surface of the housing 800.

Receiving trays 12 and 13 will be explained. As shown in FIG. 1 and FIG. 2, the receiving tray 12 extends horizontally from the upper end portion of the upstream side surface of the lower housing 803 toward the upstream side. The receiving tray 13 extends horizontally from the upper end portion of the downstream side surface of the lower housing 803 toward the downstream side. The receiving trays 12 and 13 each have a box shape that is rectangular in a plan view and that is long in the conveyance direction. Leg portions 121 and 131 respectively support the receiving trays 12 and 13 from below. The top surface of the receiving tray 12 is configured to receive the base 2 that is conveyed toward the opening 805. The top surface of the receiving tray 13 is configured to receive the base 2 and the object 3 that have been packaged. Hereinafter, the top surfaces of the receiving trays 12 and 13 are referred to as receiving surfaces 12A and 13A, respectively. In a state in which the receiving trays 12 and 13 extend horizontally, each of the receiving surfaces 12A and 13A is horizontal. Since the receiving surfaces 12A and 13A form the same plane, it is possible to convey the base 2 smoothly. Hereinafter, a path section along which the base 2 is conveyed on the plane that is formed by the receiving surfaces 12A and 13A is referred to as a conveyance path 103 (refer to FIG. 29 and the like).

Figure 3:
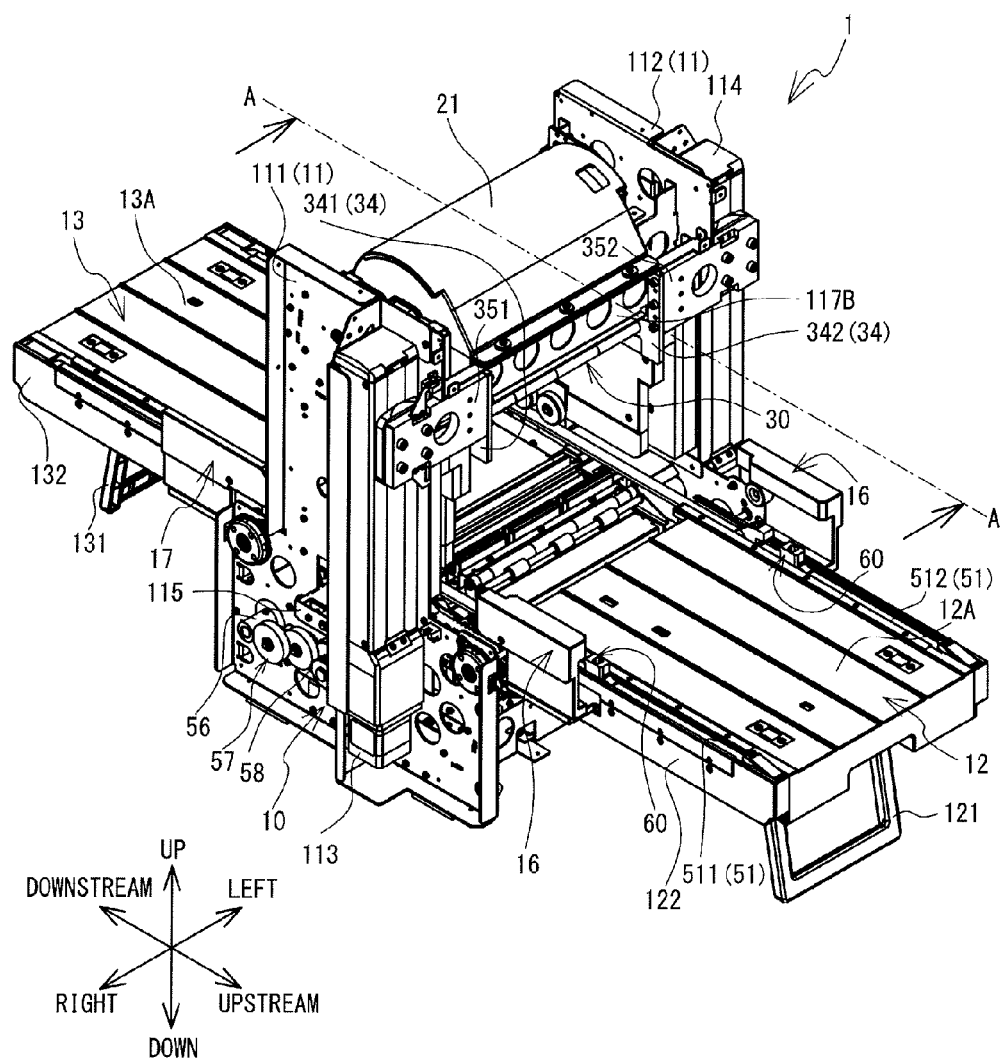
FIG. 3 is a perspective view of the packaging device 1 (in a state in which the housing 800 is removed)

As shown in FIG. 3, the packaging device 1 includes a bottom portion 10 and side plate portions 111 and 112. The bottom portion 10 has a rectangular shape in a plan view. The side plate portion 111 extends vertically upward from the right end portion of the bottom portion 10. The side plate portion 112 extends vertically upward from the left end portion of the bottom portion 10. Hereinafter, the side plate portions 111 and 112 are also collectively referred to as side plate portions 11. The side plate portions 11 are each shaped as a substantially rectangular plate whose long sides extend in the up-down direction. The inner surfaces of the side plate portions 111 and 112 face each other. The receiving tray 12 is supported by the upstream end portions of the side plate portions 11. The receiving tray 13 is supported by the downstream end portions of the side plate portions 11.

The receiving tray 12 is provided with guide portions 16, one of which is provided on a section of the right end face that is close to the side plate portion 11, and the other of which is provided on a section of the left end face that is close to the side plate portion 11. The receiving tray 13 is provided with guide portions 17, one of which is provided on a section of the right end face that is close to the side plate portion 11, and the other of which is provided on a section of the left end face that is close to the side plate portion 11. The guide portions 16 and 17 can support the base 2 that is being conveyed, from both the left and right sides. The guide portions 16 and 17 can inhibit the base 2 that is being conveyed from falling in the left-right direction.

Figure 4:
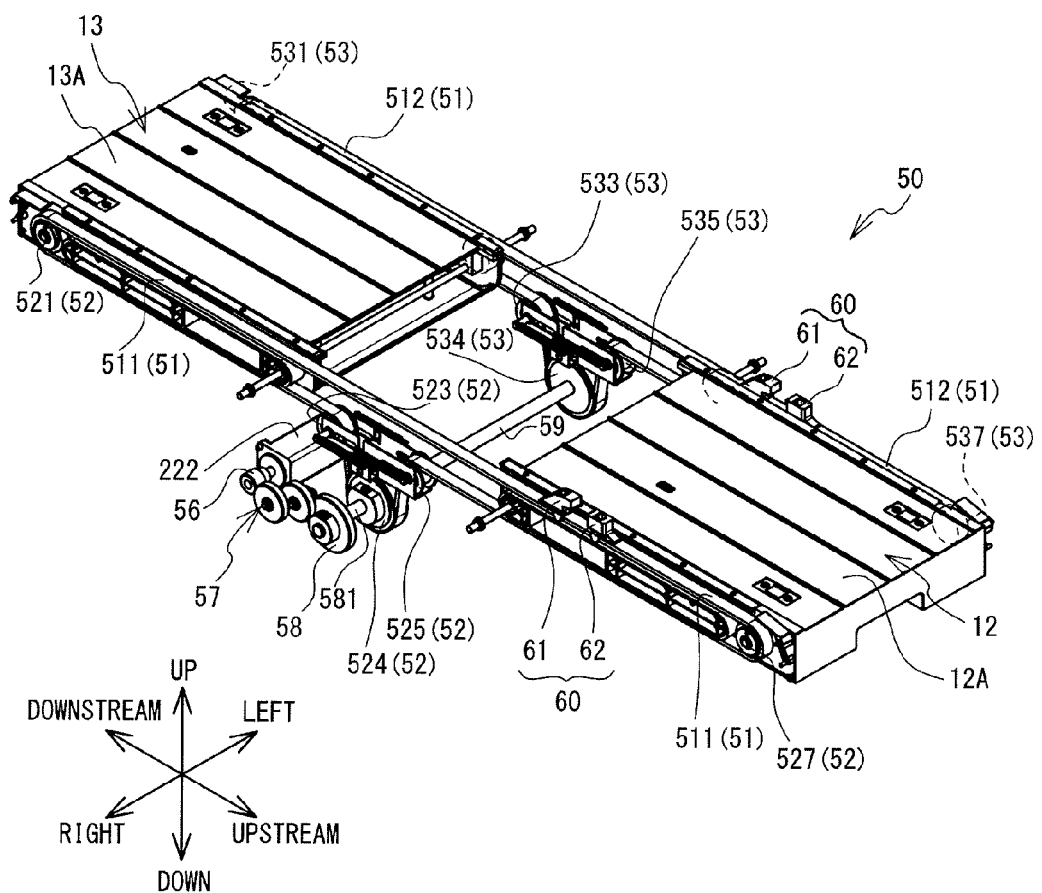
FIG. 4 is a perspective view of a conveyance mechanism 50.

A conveyance mechanism 50 will be explained. As shown in FIG. 4, endless belts 511 and 512 are respectively provided on the right edges and the left edges of the receiving trays 12 and 13. Hereinafter, the belts 511 and 512 are also collectively referred to as belts 51. The belts 51 are made of a composite material of fiber and urethane rubber or the like, and are elastically deformable. Inner surfaces of the belts 51 have teeth. As shown in FIG. 3, sections of the belts 51 that are positioned on the left and right edges of the receiving tray 12 are respectively covered by a pair of covers 122 from the outside. Sections of the belts 51 that are positioned on the left and right edges of the receiving tray 13 are respectively covered by a pair of covers 132 from the outside. The covers 122 and 132 do not respectively cover the receiving surface 12A side and the receiving surface 13A side. Therefore, the belts 51 are respectively exposed to the receiving surface 12A side and the receiving surface 13A side. In FIG. 4, illustration of the covers 122 and 132 is omitted.

As shown in FIG. 4, the belt 511 is routed around pulleys 52, and the belt 512 is routed around pulleys 53. The pulleys 52 include pulleys 521, 523, 524, 525 and 527. The pulleys 53 include pulleys 531, 533, 534, 535 and 537. The axes of the pulleys 521, 523, 524, 525, 527, 531, 533, 534, 535 and 537 respectively extend in the left-right direction. Hereinafter, the pulleys 521, 527, 531 and 537 are referred to as first driven pulleys 521, 527, 531 and 537, respectively. The pulleys 523, 525, 533 and 535 are referred to as second driven pulleys 523, 525, 533 and 535, respectively. The pulleys 524 and 534 are referred to as driving pulleys 524 and 534, respectively.

The first driven pulley 521 is rotatably provided on the downstream side of the right side surface of the receiving tray 13. The first driven pulley 527 is rotatably provided on the upstream side of the right side surface of the receiving tray 12. The second driven pulleys 523 and 525 are respectively provided on the downstream side and the upstream side of the left side surface of the side plate portion 111 (refer to FIG. 3). The first driven pulley 531 is rotatably provided on the downstream side of the left side surface of the receiving tray 13. The first driven pulley 537 is rotatably provided on the upstream side of the left side surface of the receiving tray 12. The second driven pulleys 533 and 535 are respectively provided on the downstream side and the upstream side of the right side surface of the side plate portion 112 (refer to FIG. 3). The first driven pulleys 521 and 527 are in contact with the inner side of the belt 511 and rotatably support the belt 511. The second driven pulleys 523 and 525 are in contact with the outer side of the belt 511 and rotatably support the belt 511. The first driven pulleys 531 and 537 are in contact with the inner side of the belt 512 and rotatably support the belt 512. The second driven pulleys 533 and 535 are in contact with the outer side of the belt 512 and rotatably support the belt 512. The driving pulley 524 is disposed in substantially the center, in the conveyance direction, of the left side surface of the side plate portion 111. The driving pulley 534 is disposed in substantially the center, in the conveyance direction, of the right side surface of the side plate portion 112. The driving pulley 524 is in contact with the inner side of the belt 511, and the driving pulley 534 is in contact with the inner side of the belt 512. The driving pulleys 524 and 524 have teeth on their outer side surfaces, respectively. The driving pulley 524 is engaged with the teeth on the inner side of the belt 511, and the driving pulley 534 is engaged with the teeth on the inner side of the belt 512.

The driving pulleys 524 and 534 are connected by a shaft 59 that extends in the left-right direction. A shaft 581 extends to the right from the right side surface of the driving pulley 524. A spur gear 58 is provided on the leading end of the shaft 581. A motor 222 is provided below an upstream section of the receiving tray 13. A rotating shaft of the motor 222 extends to the right. A spur gear 56 is provided on the leading end of the rotating shaft of the motor 222. A transmission portion 57, which is formed by a plurality of spur gears, is provided between the spur gears 56 and 58. The transmission portion 57 is configured to transmit the rotational driving force of the spur gear 56 to the spur gear 58. The belts 51 may be rotated by the motor 222. Conveyance portions 60 of the belts 51 are configured to convey the base 2 from the upstream side toward the downstream side. The conveyance portions 60 are provided on the outer side surfaces of the belts 51. Hereinafter, the belts 51, the conveyance portions 60, the motor 222 and the transmission portion 57 are also collectively referred to as conveyance mechanism 50. The spur gears 56 and 58 and the transmission portion 57 are configured to rotate the driving pulley 524 by transmitting the rotational driving force of the motor 222 to the driving pulley 524. Since the driving pulleys 524 and 524 are connected by the shaft 59, when the driving pulley 524 rotates, the driving pulley 534 also rotates. The driving pulleys 524 and 534 respectively rotate the belts 511 and 512. The belts 51 rotate in the counterclockwise direction in a right side view, and thus convey the base 2 from the upstream side toward the downstream side.

Figure 5:
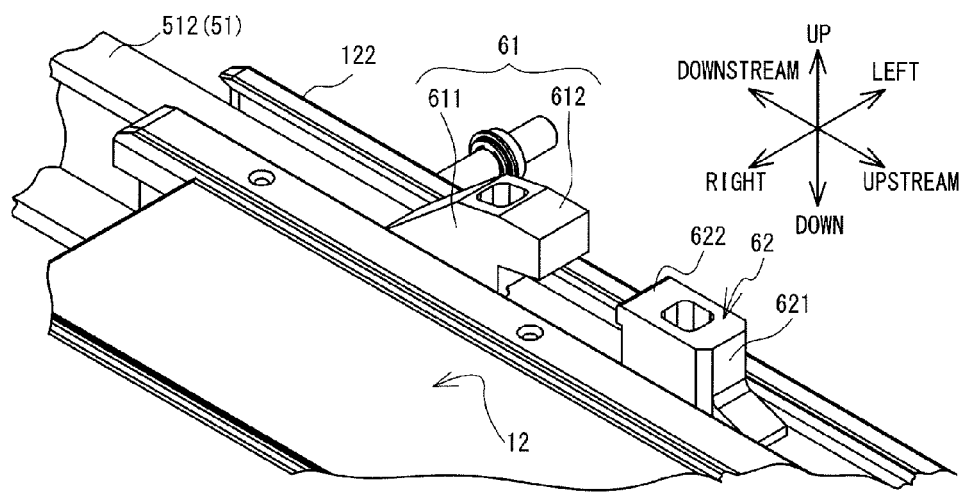
FIG. 5 is an enlarged perspective view of a first conveyance portion 61 and a second conveyance portion 62.
Figure 6:
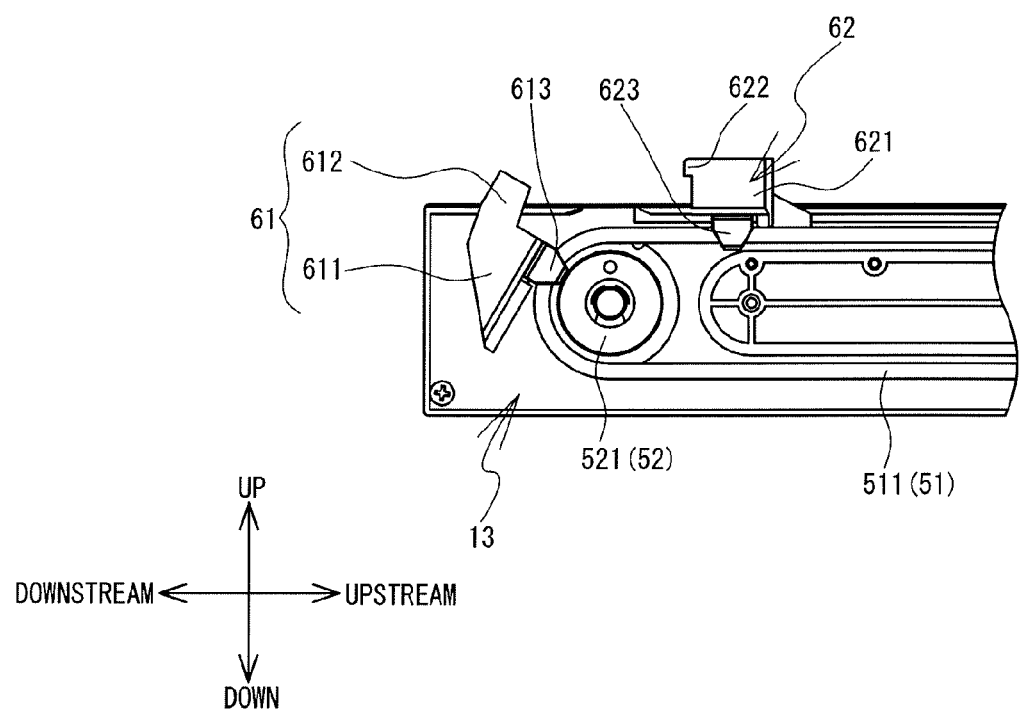
FIG. 6 is a right side view of the first conveyance portion 61 and the second conveyance portion 62.

The conveyance portions 60 will be explained. The conveyance portions 60 are provided on the outer side surfaces of the belts 511 and 512, respectively. The conveyance portions 60 are configured to convey the base 2 from the upstream side toward the downstream side, by moving from above the receiving tray 12 to above the receiving tray 13 in conjunction with the rotation of the belts 51. As shown in FIG. 5, each of the conveyance portions 60 includes a first conveyance portion 61 and a second conveyance portion 62. The first conveyance portion 61 and the second conveyance portion 62 are separated from each other in the direction in which the belt 51 extends, that is, in the conveyance direction. The first conveyance portion 61 includes a first protruding portion 611, a first extending portion 612 and a claw portion 613 (refer to FIG. 6). The first protruding portion 611 protrudes vertically and outwardly with respect to the outer side surface of the belt 51. The first extending portion 612 extends from the end portion of the first protruding portion 611 that is on the opposite side from the side on which the first protruding portion 611 is connected to the belt 51, extending toward the upstream side from the upstream side surface of the first protruding portion 611. A space is formed in a section that is sandwiched between the belt 51 and the first extending portion 612. A part of the upstream side surface of the first conveyance portion 61 that is close to the belt 51 has a shape that is recessed toward the downstream side. As shown in FIG. 6, the claw portion 613 is provided on a section of the first protruding portion 611 that is on the side on which the first protruding portion 611 is in contact with the belt 51. The claw portion 613 is configures to fix the first conveyance portion 61 to the belt 51.

As shown in FIG. 5, the second conveyance portion 62 includes a second protruding portion 621, a second extending portion 622 and a claw portion 623 (refer to FIG. 6). The second protruding portion 621 protrudes vertically and outwardly with respect to the outer side surface of the belt 51. The second protruding portion 621 is provided in a position that is separated from the first protruding portion 611 of the first conveyance portion 61 by a specified distance toward the upstream side. The second extending portion 622 extends from the end portion of the second protruding portion 621 that is on the opposite side from the side on which the second protruding portion 621 is connected to the belt 51, extending toward the downstream side from the downstream side surface of the second protruding portion 621. A space is formed in a section that is sandwiched between the belt 51 and the second extending portion 622. A part of the downstream side surface of the second conveyance portion 62 that is close to the belt 51 has a shape that is recessed toward the upstream side. As shown in FIG. 6, the claw portion 623 is provided on a section of the second protruding portion 621 that is in contact with the belt 51. The claw portion 623 is configured to fix the second conveyance portion 62 to the belt 51.

The packaging device 1 includes a sensor 204 (refer to FIG. 26) on the inner side of the side plate portion 111. The sensor 204 is a non-contact type position sensor that is configured to detect a reflecting plate (not shown in the drawings) that is provided on the outer side surface of the belt 51. The sensor 204 is positioned below the belt 51 and configured to emit light upward. The sensor 204 is configured to detect the reflecting plate by detecting the light that is reflected by the reflecting plate. Note that, when the sensor 204 detects the reflecting plate, the conveyance portions 60 that are provided on the belts 51 are in a state in which they protrude upward higher than the receiving surface 12A of the receiving tray 12.

The film cassette 21 will be explained. As shown in FIG. 7, a plate-shaped bridge plate 117 is mounted between the upper end portion of the side plate portion 111 and the upper end portion of the side plate portion 112. The bridge plate 117 includes a horizontal portion 117A that extends horizontally, a vertical portion 117B that extends upward in the vertical direction from the upstream edge of the horizontal portion 117A, and a vertical portion 117C that extends upward in the vertical direction from the downstream edge of the horizontal portion 117A. The film cassette 21 (refer to FIG. 3) may be placed on the horizontal portion 117A and thus the film cassette 21 may be mounted in the packaging device 1.

As shown in FIG. 7, a winding mechanism 65 is provided above the horizontal portion 117A and on the left side surface of the side plate portion 111. The winding mechanism 65 is a mechanism for winding up the film 24 (refer to FIG. 9) around a film roll 22 inside the film cassette 21. The winding mechanism 65 will be described in more detail later. A wall plate 14 that covers the upstream side, the downstream side and the left side of the winding mechanism 65 is provided on the upper side of the horizontal portion 117A. A recessed portion 14A that is recessed downward is provided in the upper edge of a section of the wall plate 14 that covers the left side of the winding mechanism 65.

Figure 8:
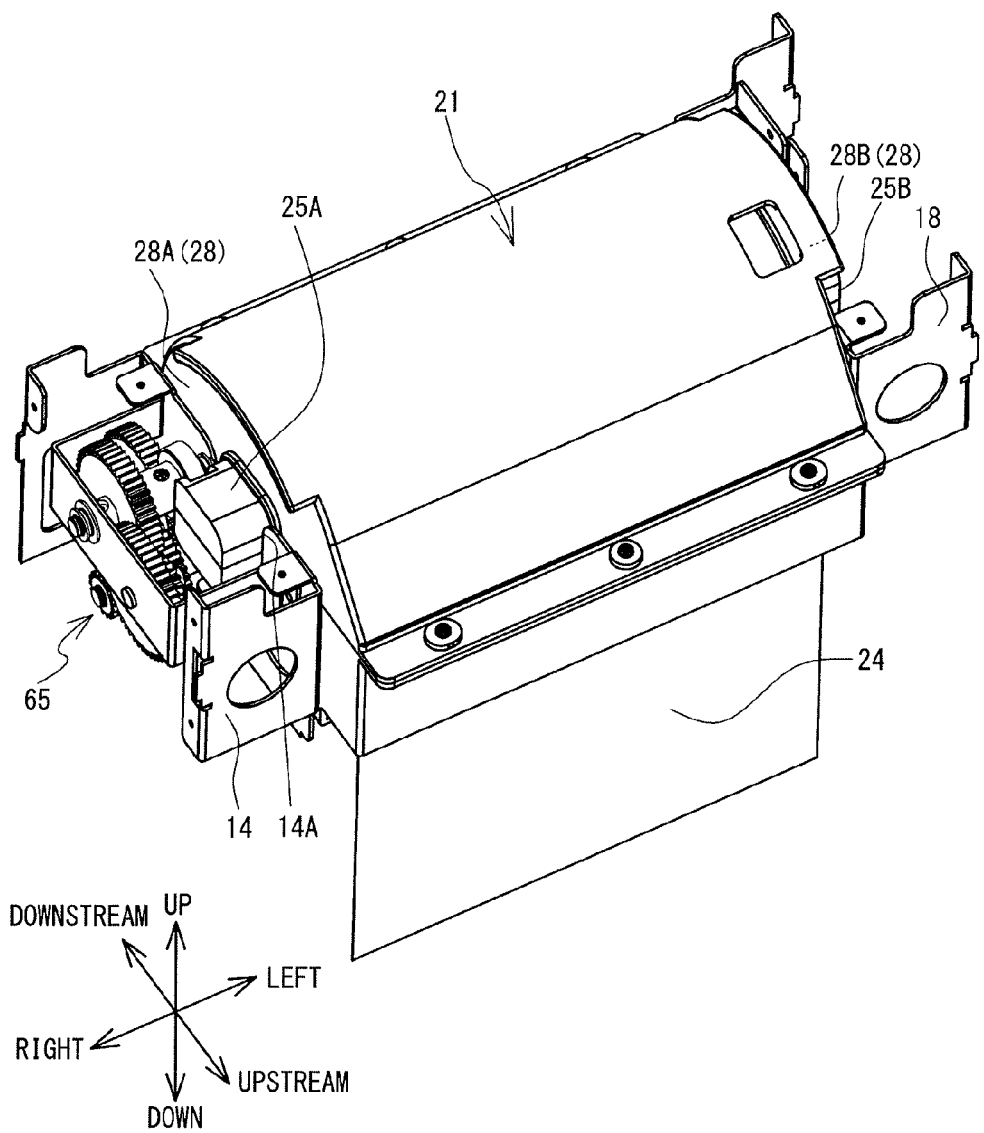
FIG. 8 is a perspective view of a film cassette 21 and a winding mechanism 65.

As shown in FIG. 8, the film cassette 21 has a substantially cylindrical shape. The film cassette 21 contains therein the film roll 22 (refer to FIG. 9) that has a shaft 26 (core 26) around which the film 24 is wound. A discharge opening (not shown in the drawings) that extends in the width direction of the film 24 wound around the film roll 22 is provided in the lower section of the film cassette 21. The film 24 that is fed out from the film roll 22 is discharged downward from the discharge opening. The base 2 on which the object 3 is placed may be conveyed below the film cassette 21 from the upstream side toward the downstream side, and the base 2 and the object 3 may be packaged with the film 24 that is discharged from the film cassette 21.

The film cassette 21 includes two side walls 28 (28A and 28B) that are orthogonal to the axial direction. The side wall 28A is one of the two side walls 28, and is disposed on the right side of the film cassette 21 in a state in which the film cassette 21 is mounted in the packaging device 1. The side wall 28A is provided with a protruding portion 25A that protrudes to the right. The protruding portion 25A has a prismatic shape. The protruding portion 25A extends along the axial line of the film cassette 21. A hole (not shown in the drawings) is provided on the downstream side of a peripheral wall of the protruding portion 25A. When the film cassette 21 is mounted in the packaging device 1, the protruding portion 25A is fitted into the recessed portion 14A of the wall plate 14 (refer to FIG. 7). The winding mechanism 65 is disposed to the right of the film cassette 21 that is mounted in the packaging device 1.

Figure 9:
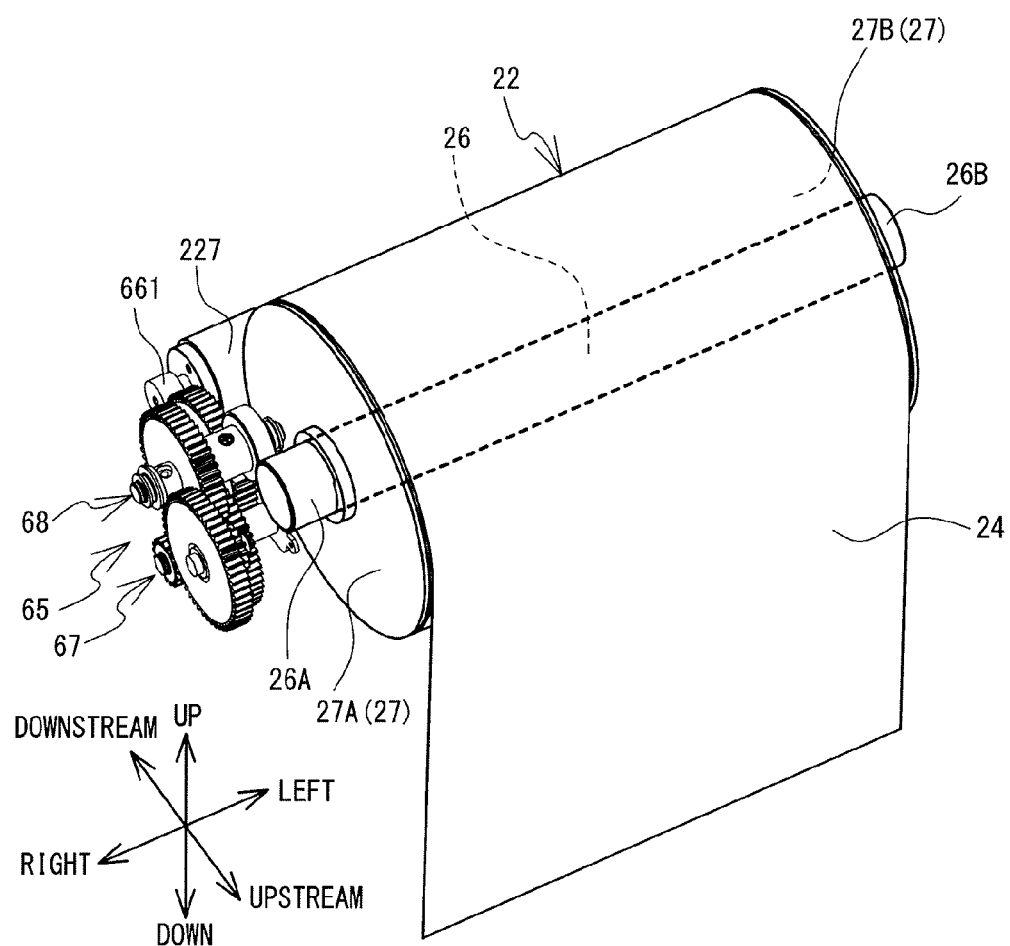
FIG. 9 is a perspective view of a film roll 22 and the winding mechanism 65.

As shown in FIG. 9, flanges 27 (27A and 27B) are provided on both ends of the shaft 26 of the film roll 22. The flange 27A is one of the flanges 27, and is disposed on the right side in a state in which the film cassette 21 is mounted in the packaging device 1. The flange 27A is provided with a film gear 26A that protrudes to the right. The film gear 26A extends along the axial line of the shaft 26 (the core 26) of the film roll 22. The film gear 26A is disposed inside the protruding portion 25A (refer to FIG. 8) of the film cassette 21. A part of the film gear 26A is exposed from the hole that is provided on the downstream side of the peripheral wall of the protruding portion 25A.

The winding mechanism 65 will be explained with reference to FIG. 9 to FIG. 14. As shown in FIG. 9, the winding mechanism 65 includes a motor 227, a first transmission mechanism 67 and a second transmission mechanism 68. The winding mechanism 65 is configured to rotate the film roll 22 by transmitting the rotational driving force of the motor 227 to the film gear 26A via the first transmission mechanism 67 and the second transmission mechanism 68. The wall plate 14 (refer to FIG. 7) that covers the winding mechanism 65 supports the motor 227, the first transmission mechanism 67 and the second transmission mechanism 68.

A rotating shaft of the motor 227 extends horizontally to the right from the motor 227. The rotating shaft of the motor 227 rotates in the clockwise direction in a right side view during forward rotation. A gear 661 is provided on the right end of the rotating shaft of the motor 227. The gear 661 is a spur gear.

Figure 10:
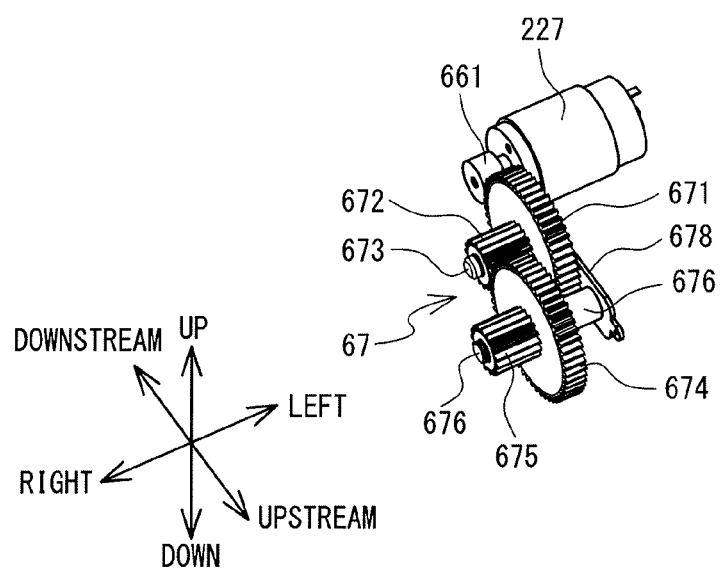
FIG. 10 is a perspective view of a first transmission mechanism 67.

As shown in FIG. 10, the first transmission mechanism 67 includes gears 671, 672, 674 and 675, and a pivot plate 678. The gears 671, 672, 674 and 675 are spur gears. The gears 671 and 672 are fixed to a common rotating shaft 673 and can rotate around the rotating shaft 673. The rotating shaft 673 extends horizontally in the left-right direction. The left end of the rotating shaft 673 is rotatably supported by the wall plate 14 (refer to FIG. 7). The gear 671 meshes with the gear 661 of the motor 227. The gear 671 rotates along with the rotation of the gear 661. The diameter of the gear 671 is approximately three times the diameter of the gear 661. The gear 672 is disposed to the right of the gear 671. The diameter of the gear 672 is approximately one third of the diameter of the gear 671, and is substantially the same as the diameter of the gear 661. The gear 672 rotates along with the rotation of the gear 671.

The gears 674 and 675 are fixed to a common rotating shaft 676 and can rotate around the rotating shaft 676. The rotating shaft 676 extends horizontally in the left-right direction. The gear 674 meshes with the gear 672. The gear 674 rotates along with the rotation of the gear 672. The diameter of the gear 674 is approximately three times the diameter of the gear 672, and is substantially the same as the diameter of the gear 671. The gear 675 is disposed to the right of the gear 674. The diameter of the gear 675 is approximately one third of the diameter of the gear 674, and is substantially the same as the diameter of the gears 661 and 673. The gear 675 rotates along with the rotation of the gear 674.

Figure 11:
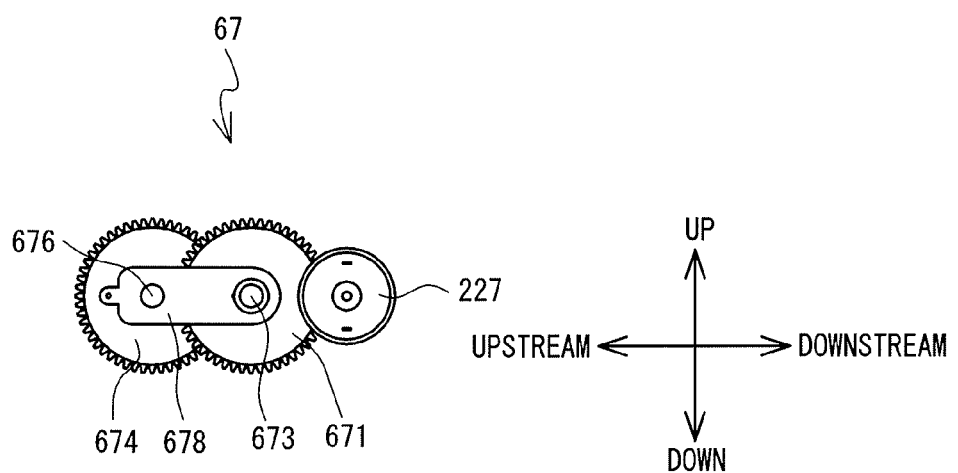
FIG. 11 is a left side view of the first transmission mechanism 67.

As shown in FIG. 10 and FIG. 11, the pivot plate 678 is mounted between the left end of the rotating shaft 673 of the gears 671 and 672 and the left end of the rotating shaft 676 of the gears 674 and 675. The pivot plate 678 is a plate-shaped member. The rotating shaft 673 is inserted through a hole that is provided in the downstream end portion of the pivot plate 678, and the rotating shaft 676 is inserted through a hole that is provided in the upstream end portion of the pivot plate 678. The pivot plate 678 rotatably supports the rotating shaft 676. The rotating shaft 673 and the pivot plate 678 are in firm contact with each other such that a large frictional force is generated at the contact portion between the rotating shaft 673 and the pivot plate 678 when the rotating shaft 673 rotates. Therefore, when the gear 671 and the rotating shaft 673 rotate in accordance with the driving of the motor 227, the pivot plate 678 pivots due to the frictional force. When the pivot plate 678 pivots in accordance with the rotation of the motor 227, the rotating shaft 676 supported on the downstream side of the pivot plate 678 and the gears 674 and 675 fixed to the rotating shaft 676 also pivot about the rotating shaft 673 serving as the fulcrum. Note that the distance between the rotating shafts 673 and 676 does not change even when the pivot plate 678 pivots. Therefore, even when the gear 674 pivots, the gears 672 and 674 maintain their meshed state.

Figure 12:
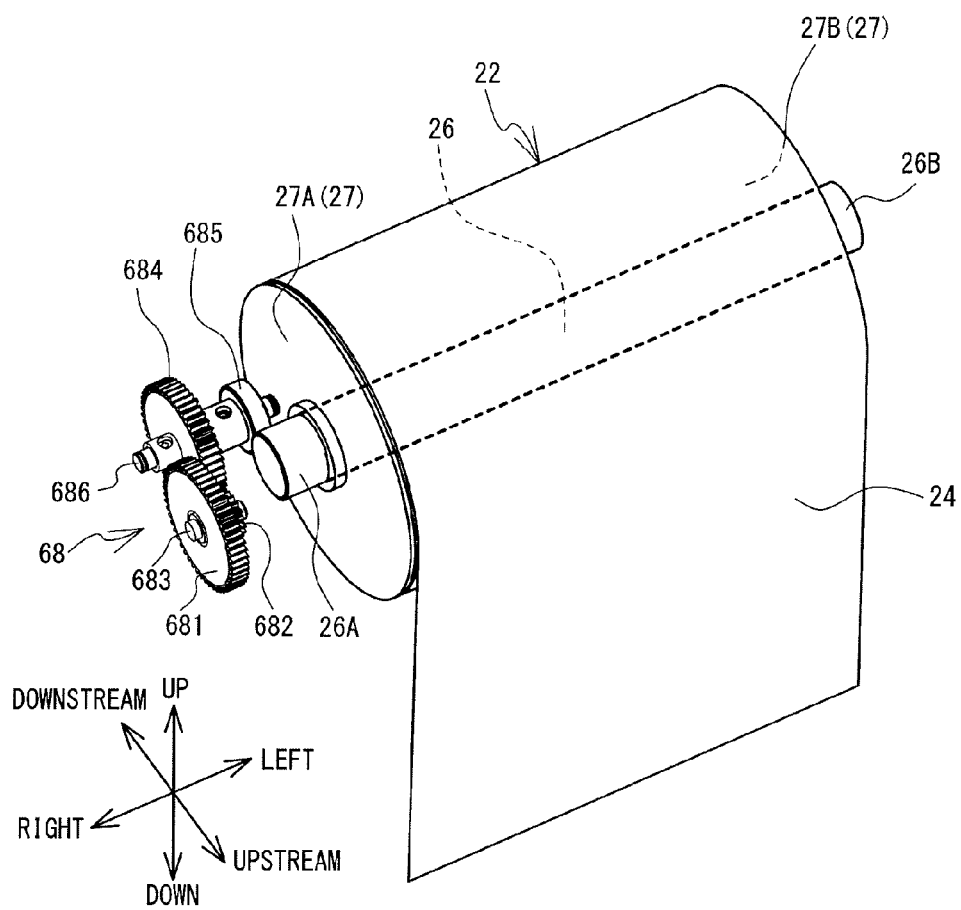
FIG. 12 is a perspective view of a second transmission mechanism 68.

As shown in FIG. 12, the second transmission mechanism 68 includes gears 681, 682, 684 and 685. The gears 681, 682, 684 and 685 are spur gears. The gears 681 and 682 are fixed to a common rotating shaft 683 and can rotate around the rotating shaft 683. The rotating shaft 683 extends horizontally in the left-right direction. The right end of the rotating shaft 683 is rotatably supported by the side plate portion 111 (refer to FIG. 7). When the gear 675 (refer to FIG. 10) pivots and moves upward, the gear 681 meshes with the gear 675. In this case, the gear 681 rotates along with the rotation of the gear 675. On the other hand, when the gear 675 pivots and moves downward, the gear 681 separates from the gear 675. In this case, the gear 681 does not rotate even when the gear 675 rotates. The diameter of the gear 681 is approximately three times the diameter of the gear 675, and is substantially the same as the diameter of the gears 671 and 674. The gear 682 is disposed to the left of the gear 681. The diameter of the gear 682 is approximately one third of the diameter of the gear 681, and is substantially the same as the diameter of the gears 661, 672 and 675. The gear 682 rotates along with the rotation of the gear 681.

The gears 684 and 685 are fixed to a common rotating shaft 686 and can rotate around the rotating shaft 686. The rotating shaft 686 extends horizontally in the left-right direction. The left end of the rotating shaft 686 is rotatably supported by the wall plate 14 (refer to FIG. 7). The gear 684 meshes with the gear 682. The gear 684 rotates along with the rotation of the gear 682. The diameter of the gear 684 is approximately three times the diameter of the gear 682, and is substantially the same as the diameter of the gears 671, 674 and 681. The gear 685 is disposed to the left of the gear 684 and in the vicinity of the left end of the rotating shaft 686. The diameter of the gear 685 is approximately one third of the diameter of the gear 684, and is substantially the same as the diameter of the gears 661, 672, 675 and 682. The gear 685 rotates along with the rotation of the gear 684. In a state in which the film cassette 21 (refer to FIG. 8) is mounted in the packaging device 1, the gear 685 meshes with the film gear 26A. The film gear 26A rotates along with the rotation of the gear 685.

Figure 13:
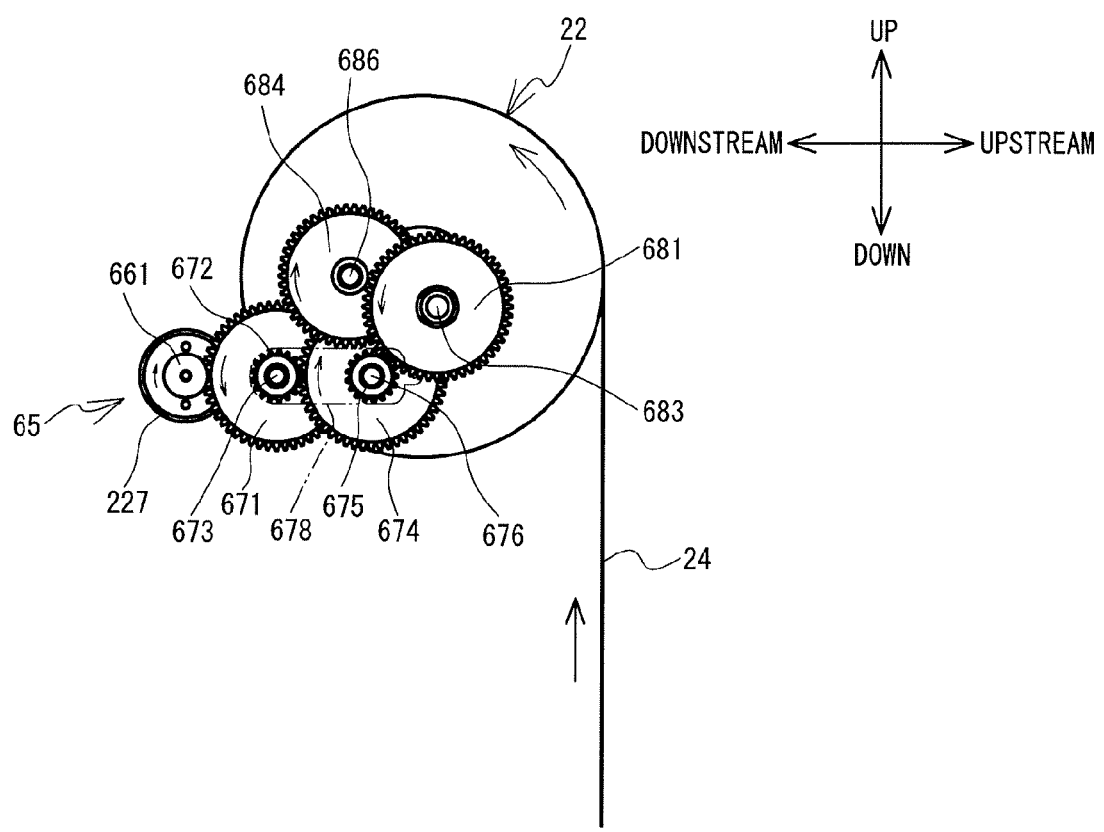
FIG. 13 is a right side view of the winding mechanism 65.

Operations of the winding mechanism 65 when the motor 227 rotates in the forward direction will be explained with reference to FIG. 13. The rotation direction (clockwise or counterclockwise) to be explained below indicates a direction when the winding mechanism 65 is viewed from the right side surface side. In accordance with the forward rotation of the motor 227, the gear 661 rotates clockwise. The gear 671 that meshes with the gear 661 rotates counterclockwise. Along with the rotation of the gear 671, the rotating shaft 673 of the gear 671 rotates counterclockwise and the pivot plate 678 pivots. The gears 674 and 675 move upward, and the gear 675 meshes with the gear 681. The first transmission mechanism 67 and the second transmission mechanism 68 are coupled. The rotational driving force of the motor 227 can be transmitted to the film gear 26A via the first transmission mechanism 67 and the second transmission mechanism 68. Note that the meshing of the gear 675 with the gear 681 inhibits the pivot plate 678 from pivoting. Therefore, when the motor 227 further rotates in the forward direction, the pivot plate 678 does not follow the rotation of the rotating shaft 673, and the meshed state of the gears 675 and 681 is maintained.

Along with the rotation of the gear 671, the gear 672 rotates counterclockwise. The gear 674 that meshes with the gear 672 rotates clockwise. Along with the rotation of the gear 674, the gear 675 also rotates clockwise. Since the gears 675 and 681 are meshed with each other, when the gear 675 rotates clockwise, the gear 681 that meshes with the gear 675 rotates counterclockwise. Along with the rotation of the gear 681, the gear 682 (refer to FIG. 12) also rotates counterclockwise. The gear 684 that meshes with the gear 682 rotates clockwise. Along with the rotation of the gear 684, the gear 685 (refer to FIG. 12) also rotates clockwise. The film gear 26A (refer to FIG. 12) that meshes with the gear 685 rotates counterclockwise. The film roll 22 rotates counterclockwise and winds up the film 24. The film 24 moves in a direction opposite to the direction in which the film 24 is fed out from the film roll 22.

Figure 14:
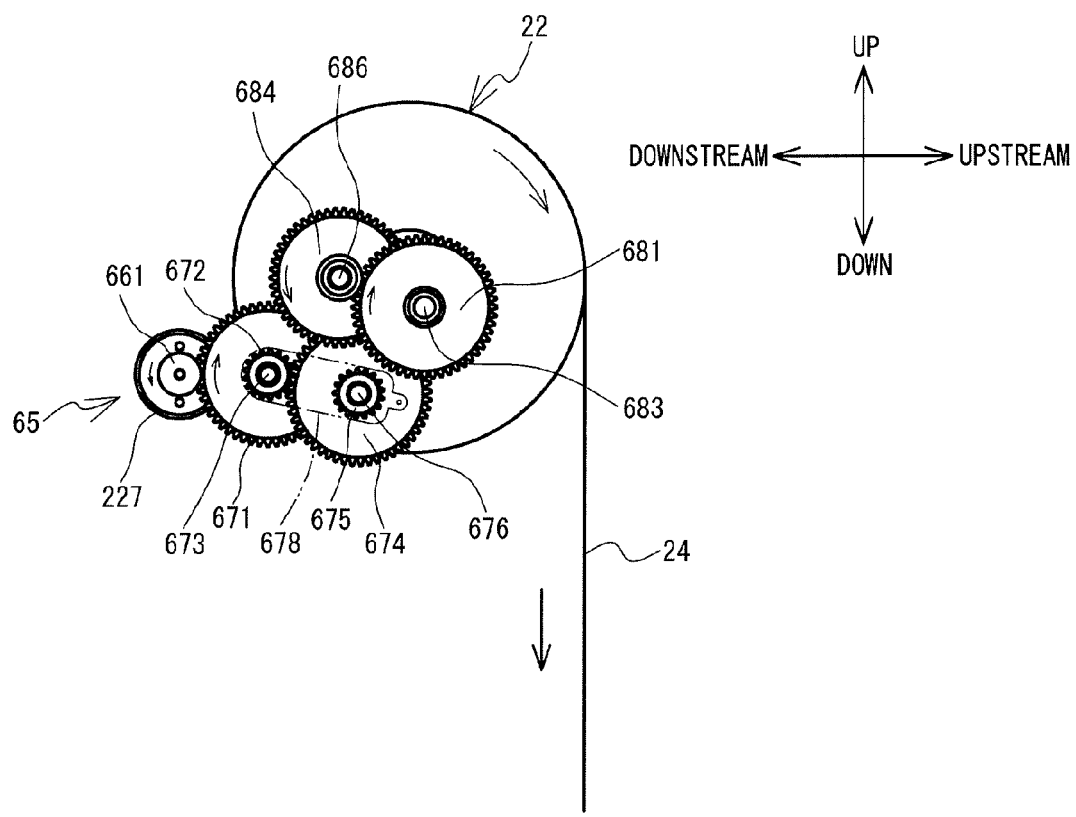
FIG. 14 is another right side view of the winding mechanism 65.

Operations of the winding mechanism 65 when the motor 227 rotates in the reverse direction will be explained with reference to FIG. 14. In accordance with the reverse rotation of the motor 227, the gear 661 rotates counterclockwise. The gear 671 that meshes with the gear 661 rotates clockwise. Along with the rotation of the gear 671, the rotating shaft 673 of the gear 671 also rotates clockwise. The pivot plate 678 pivots. The gears 674 and 675 move downward, and the gear 675 separates from the gear 681. The first transmission mechanism 67 and the second transmission mechanism 68 are disconnected from each other. The rotational driving force of the motor 227 is not transmitted to the film gear 26A via the first transmission mechanism 67 and the second transmission mechanism 68. The gears 681, 683, 684 and 685, and the film gear 26A are put into a state in which they can rotate freely.

For example, when a force in a direction in which the film 24 is pulled out from the film roll 22 is applied to the film 24, the film roll 22 rotates clockwise. The film gear 26A also rotates clockwise. The gear 685 that is meshed with the film gear 26A rotates counterclockwise. Along with the rotation of the gear 685, the gear 684 also rotates counterclockwise. The gear 682 that meshes with the gear 684 rotates clockwise. Along with the rotation of the gear 682, the gear 681 also rotates clockwise. Since the gears 681, 683, 684 and 685 are in a state in which they can rotate freely, the film 24 can be easily pulled out from the film roll 22 even when the force to pull out the film 24 is weak.

Figure 15:
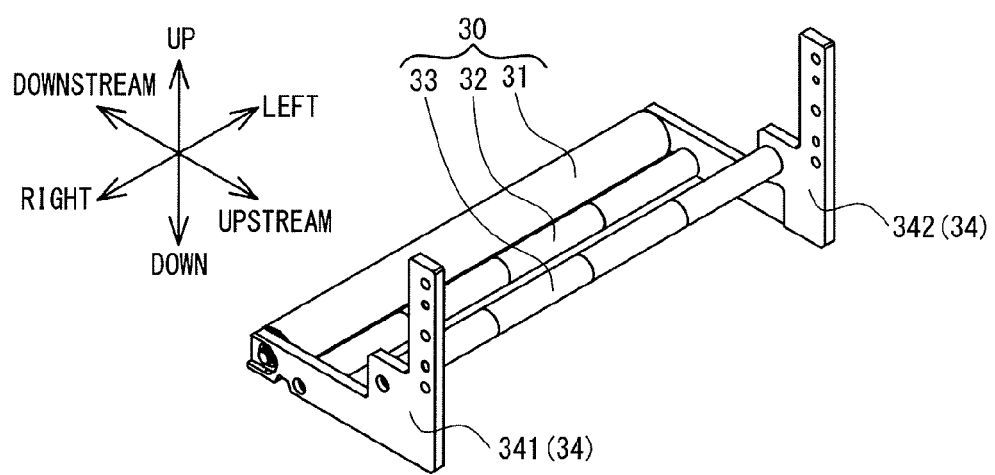
FIG. 15 is a perspective view of movable rollers 30.

Movable rollers 30 will be explained. As shown in FIG. 3, a protruding portion 113 that protrudes to the right is provided on the right side surface of the side plate portion 111. A protruding portion 114 that protrudes to the left is provided on the left side surface of the side plate portion 112. Each of the protruding portions 113 and 114 has a box shape, and extends in the up-down direction. A carriage (not shown in the drawings) that is driven by rotation of a motor 221 (refer to FIG. 26) is provided inside each of the protruding portions 113 and 114. The carriage inside the protruding portion 113 connects to a support plate portion 351 on an upstream portion of the protruding portion 113. The support plate portion 351 is a plate-shaped member. A support portion 341 connects to the left side of the support plate portion 351. The carriage inside the protruding portion 114 connects to a support plate portion 352 on an upstream portion of the protruding portion 114. The support plate portion 352 is a plate-shaped member. A support portion 342 connects to the right side of the support plate portion 352. Hereinafter, the support portions 341 and 342 are also collectively referred to as support portions 34. As shown in FIG. 15, the support portions 34 support a guide roller 31, a first auxiliary roller 32 and a second auxiliary roller 33. Hereinafter, the guide roller 31, the first auxiliary roller 32 and the second auxiliary roller 33 are also collectively referred to as the movable rollers 30. The motor 221 can cause the support portions 34 that respectively connect to the support plate portions 351 and 352 to move up and down via the carriages.

As shown in FIG. 15, each of the movable rollers 30 has a cylindrical column shape. Each of the movable rollers 30 extends in the left-right direction. The length of each of the movable rollers 30 in the left-right direction is substantially the same as the length of the receiving trays 12 and 13 (refer to FIG. 3) in the left-right direction. Each of the movable rollers 30 has a cylindrical portion and a shaft portion. The shaft portion extends in the left-right direction. The cylindrical portion is provided around a peripheral wall of the shaft portion. The cylindrical portion of the guide roller 31 is made of rubber and is fixed to the shaft portion. The cylindrical portions of the first auxiliary roller 32 and the second auxiliary roller 33 can rotate with respect to the shaft portions.

Figure 16:
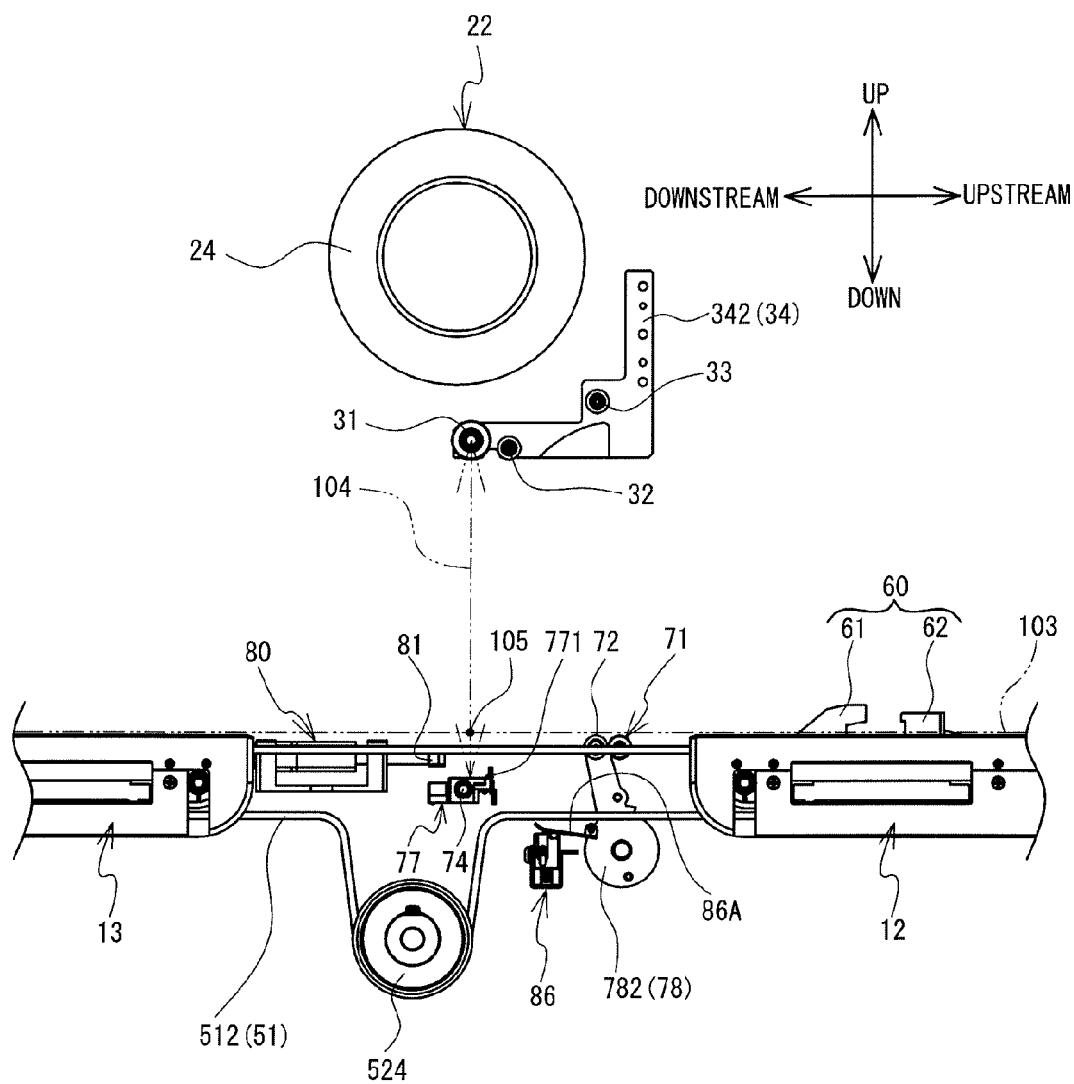
FIG. 16 is a right side view that shows a state in which support portions 34 are located at their highest positions.
Figure 17:
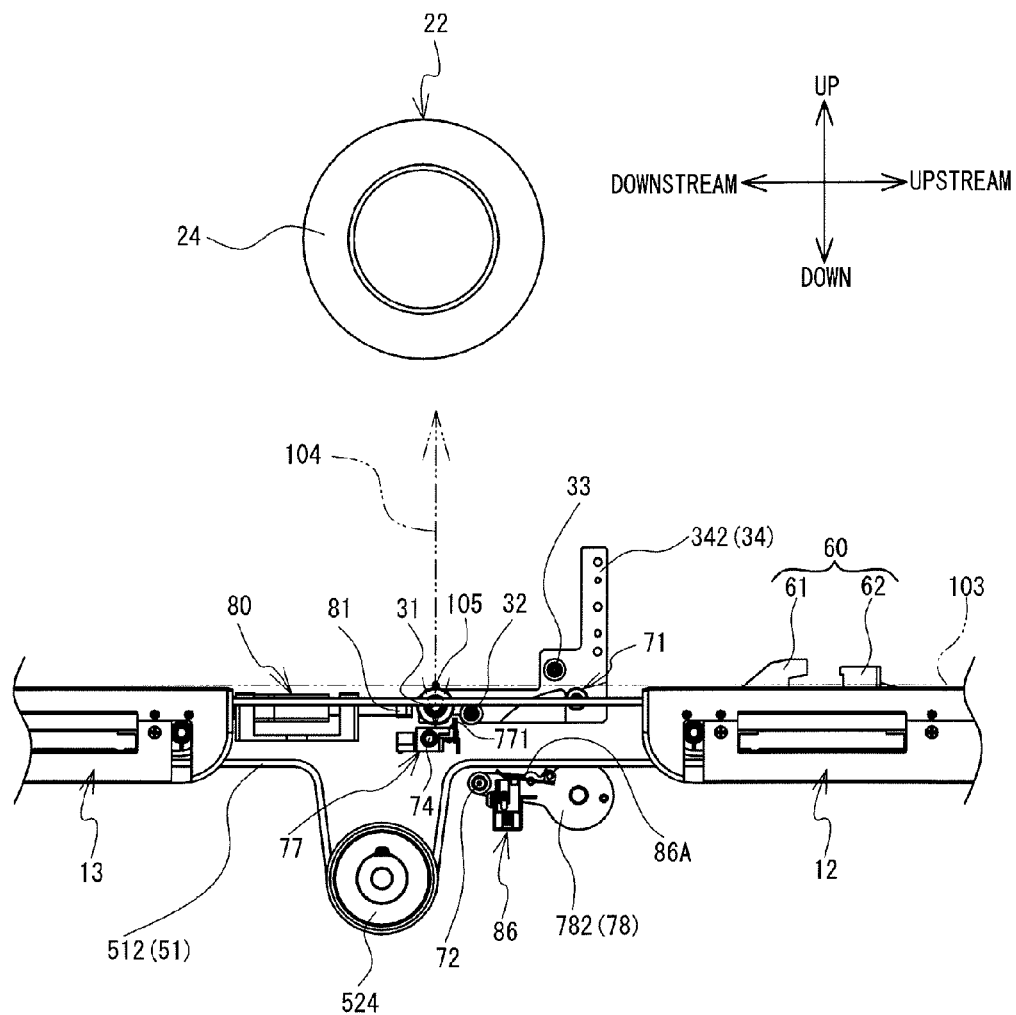
FIG. 17 is a right side view that shows a state in which the support portions 34 are located at their lowest positions.

The support portions 341 and 342 respectively support the right end and the left end of the shaft portion of each of the movable rollers 30. The shaft portion of the guide roller 31 can rotate with respect to the support portions 34. The shaft portions of the first auxiliary roller 32 and the second auxiliary roller 33 are fixed to the support portions 34. The support portions 34 are plate-shaped members having a substantially reverse L shape in a right side view. The guide roller 31 is supported by the support portions 341 and 342 at the downstream ends of the sections of the support portions 341 and 342 that extend in the conveyance direction. The first auxiliary roller 32 is supported by the support portions 341 and 342 close to and on the upstream side of the respective positions where the guide roller 31 is supported. The second auxiliary roller 33 is supported by the support portions 341 and 342 at respective positions where the sections of of the support portions 341 and 342 that extend in the conveyance direction intersect the sections that extend in the up-down direction. As shown in FIG. 16 and FIG. 17, the guide roller 31, the first auxiliary roller 32 and the second auxiliary roller 33 are disposed in that order from the downstream side toward the upstream side.

The movable rollers 30 are configured to move in the up-down direction along with an up-down movement of the support portions 34. FIG. 16 shows a state in which the support portions 34 are located at their highest positions. In this state, the sections of the support portions 341 and 342 that extend in the up-down direction are positioned close to and on the upstream side of the film cassette 21 (refer to FIG. 3) that contains the film roll 22. Further, the sections of the support portions 341 and 342 that extend in the conveyance direction are positioned below the film cassette 21. The movable rollers 30 are positioned below the film cassette 21. FIG. 17 shows a state in which the support portions 34 are located at their lowest positions. In this state, the sections of the support portions 341 and 342 that extend in the conveyance direction are positioned below the conveyance path 103.

Hereinafter, the path along which the guide roller 31 is moved up and down along with the movement of the support portions 34 is referred to as a movement path 104. When the guide roller 31 has moved to its lowest position along the movement path 104 (refer to FIG. 17), the guide roller 31 is positioned below the conveyance path 103. The conveyance path 103 and the movement path 104 intersect. The position at which the conveyance path 103 and the movement path 104 intersect is referred to as an intersection position 105.

Figure 18:
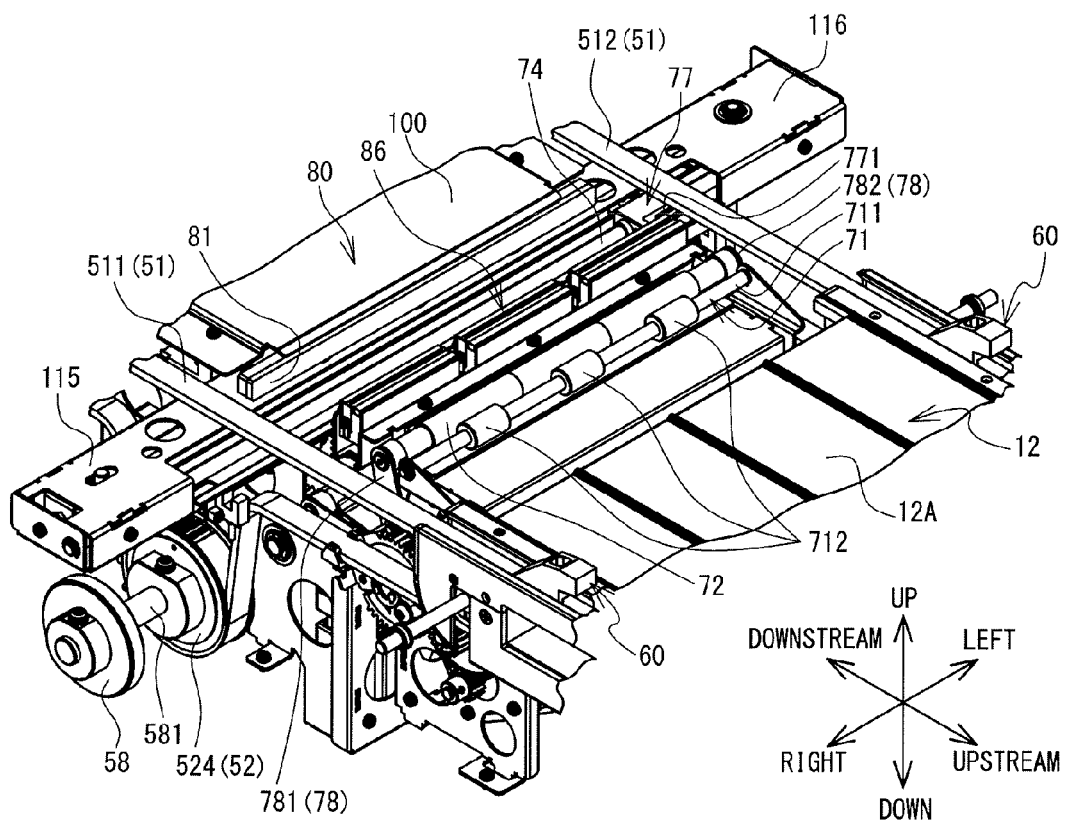
FIG. 18 is a perspective view of a base guide roller 71, a holding roller 72 and a heating portion 86.

A cutting portion 77 will be explained. As shown in FIG. 18, a protruding portion 115 that protrudes to the right is provided on the right side surface of the side plate portion 111 (refer to FIG. 3). A protruding portion 116 that protrudes to the left is provided on the left side surface of the side plate portion 112 (refer to FIG. 3). A guide rail 74 extends between the protruding portions 115 and 116. The guide rail 74 is provided with the cutting portion 77. The cutting portion 77 includes a blade portion 771 that protrudes upward from the top surface of the cutting portion 77. The blade portion 771 extends in the left-right direction. The cutting portion 77 is movable in the left-right direction along the guide rail 74. A carriage (not shown in the drawings) is disposed on the downstream side of the guide rail 74. The carriage may be connected to the cutting portion 77. The carriage is driven by a motor 225 (refer to FIG. 26) that is provided inside the protruding portion 115. When the motor 225 is driven, the cutting portion 77 moves in the left-right direction along the guide rail 74. When the cutting portion 77 moves in the left-right direction along the guide rail 74, the blade portion 771 can cut the film 24 in a width direction of the film 24. As shown in FIG. 17, when the support portions 34 are located at their lowest positions, the guide roller 31 is positioned above the guide rail 74. The blade portion 771 that extends upward from the cutting portion 77 is positioned between the guide roller 31 and the first auxiliary roller 32.

A base guide roller 71, a holding roller 72, a heating portion 86 and a rotation inhibiting portion 80 will be explained. As shown in FIG. 18, the base guide roller 71 is provided on the upstream side of the section that is sandwiched between the side plate portions 111 and 112 (refer to FIG. 3) and below the conveyance path 103 (refer to FIG. 17). The base guide roller 71 includes a shaft portion 711 and a plurality of roller portions 712. The shaft portion 711 extends in the left-right direction. The plurality of roller portions 712 are in contact with the conveyance path 103 from below. The base guide roller 71 is configured to support, from below between the receiving trays 12 and 13, the base 2 that is conveyed from the upstream side toward the downstream side along the conveyance path 103, and to guide the base 2 from the receiving tray 12 to the receiving tray 13. As shown in FIG. 17, when the support portions 34 are located at their lowest positions, the second auxiliary roller 33 is positioned close to and above the base guide roller 71.

As shown in FIG. 18, the holding roller 72 is provided on the downstream side of the base guide roller 71. The holding roller 72 has a cylindrical column shape. The holding roller 72 extends in the left-right direction. The right end portion of the holding roller 72 is rotatably supported by a holding portion 781. The left end portion of the holding roller 72 is rotatably supported by a holding portion 782. Hereinafter, the holding portions 781 and 782 are collectively referred to as holding portions 78. The holding portions 78 are swingable. The holding portions 78 are configured to be swung by a motor 226 (refer to FIG. 26). As shown in FIG. 16 and FIG. 17, as the holding portions 78 are swung, the holding roller 72 is switched between a state in which the holding roller 72 is positioned close to the downstream side of the base guide roller 71 (refer to FIG. 16) and a state in which the holding roller 72 is separated from the base guide roller 71 in the downward direction (refer to FIG. 17). As shown in FIG. 16, when the holding roller 72 is positioned close to the downstream side of the base guide roller 71, the holding roller 72 is in contact with the conveyance path 103 from below. In the state in which the holding roller 72 is positioned close to the downstream side of the base guide roller 71, the holding roller 72 can hold the film 24 that is discharged from the film cassette 21 (refer to FIG. 3) such that the film 24 is clamped between the holding roller 72 and the base guide roller 71.

Figure 19:
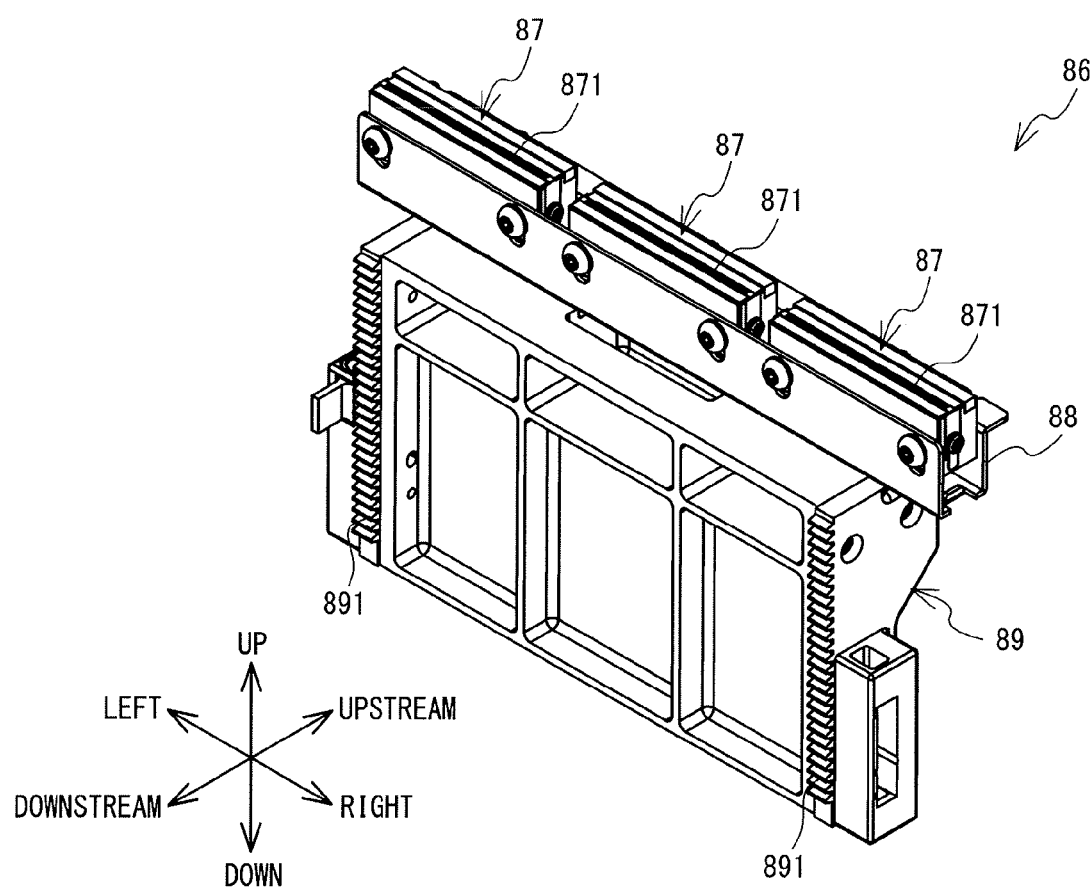
FIG. 19 is a perspective view of the heating portion 86.

As shown in FIG. 18, the heating portion 86 is provided close to the downstream side of the holding roller 72. As shown in FIG. 19, the heating portion 86 includes three heating units 87, a holding portion 88 and a base portion 89. A heater 871 is provided on the top of each of the heating units 87. The heaters 871 are configured to come into contact with the film 24 and heat the film 24. The holding portion 88 is a plate member that is bent in a substantially U shape in a side view. The three heating units 87 are held inside the U-shaped holding portion 88. The base portion 89 supports the holding portion 88 from below. Rack gears are is provided along the left and right edges of the downstream side surface of the base portion 89. Each of the rack gears 891 extends in the up-down direction such that its teeth face downstream. A motor 223 (refer to FIG. 26) is provided above the bottom portion 10 (refer to FIG. 3), in the section that is sandwiched between the side plate portions 111 and 112 (refer to FIG. 3). Pinion gears are provided on the rotating shaft of the motor 223. The pinion gears engage with the rack gears 891. The base portion 89 may be moved in the up-down direction by the rotation of the motor 223. Thus, the holding portion 88 that is provided above the base portion 89, as well as the three heating units 87 that are held by the holding portion 88, may also be moved in the up-down direction.

In a state in which the heating portion 86 is located at its highest position by the motor 223 (refer to FIG. 18), the top surface of each of the three heating units 87 is close to the conveyance path 103. On the other hand, in a state in which the heating portion 86 has been moved by the motor 223 and is located at its lowest position (refer to FIG. 16 and FIG. 17), the top surface of each of the three heating units 87 is set apart from the conveyance path 103.

Figure 20:
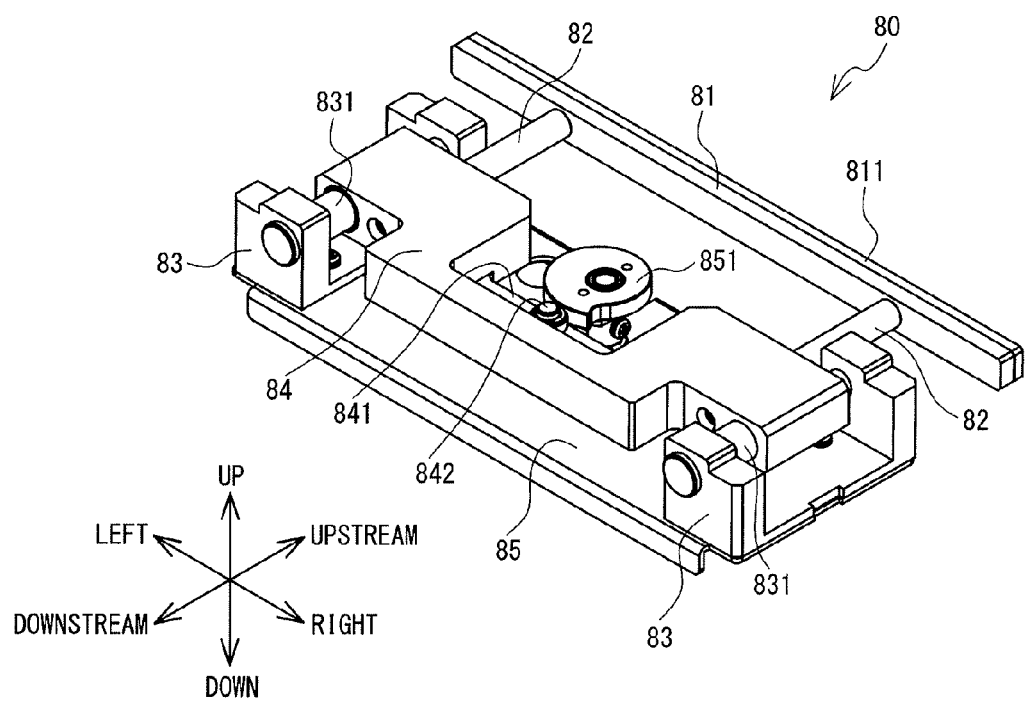
FIG. 20 is a perspective view of a rotation inhibiting portion 80.

As shown in FIG. 18, the rotation inhibiting portion 80 is provided on the downstream side of the heating portion 86. The upper side of the rotation inhibiting portion 80 is covered by a top plate 100. As shown in FIG. 20, the rotation inhibiting portion 80 includes a base portion 85. The base portion 85 is fixed to a section that is above the bottom portion 10 (refer to FIG. 3) and that is sandwiched between the side plate portions 111 and 112 (refer to FIG. 3). A support portion 84 and two shaft support portions 83 are provided on the top surface of the base portion 85.

The support portion 84 is box-shaped and extends in the left-right direction. The central section of the support portion 84 in the left-right direction is recessed toward the downstream side. A plate body 841 extends across the upstream side of the recessed section. A cylindrical protruding portion 842 protrudes upward from the central section of the plate body 841 in the left-right direction. Holes that penetrate through the support portion 84 in the conveyance direction are respectively provided in the left and right end portions of the support portion 84. Two support rods 82 extend in the upstream direction from the upstream side surfaces of the support portion 84. A stopper 81 is attached to the upstream ends of the two support rods 82. The stopper 81 has a rod shape whose cross-sectional shape is rectangular. The stopper 81 extends in the left-right direction. A rubber strip 811 is provided on the upstream side surface of the stopper 81.

The two shaft support portions 83 are respectively provided on the left and right end portions of the base portion 85. The two shaft support portions 83 respectively support shafts 831 that extend in the conveyance direction. The shafts 831 are inserted through the holes that are provided in the support portion 84. The support portion 84 can move in the conveyance direction along the two shafts 831. Springs (not shown in the drawings) are respectively interposed between the support portion 84 and the shaft support portions 83. The springs urge the support portion 84 toward the upstream side.

A cam 851 is provided on the base portion 85. The cam 851 is connected to a rotating shaft that extends upward from a motor 224 (refer to FIG. 26) that is provided below the base portion 85. The cam 851 is arranged on the upstream side of the plate body 841, in the section of the support portion 84 that is recessed toward the downstream side. The downstream side of an outer circumferential surface of the cam 851 is in contact with the protruding portion 842. When the cam 851 is rotated by being driven by the motor 224, the support portion 84 moves in the conveyance direction. In accordance with the movement of the support portion 84, the stopper 81 connected to the support portion 84 also moves in the conveyance direction.

Figure 21:
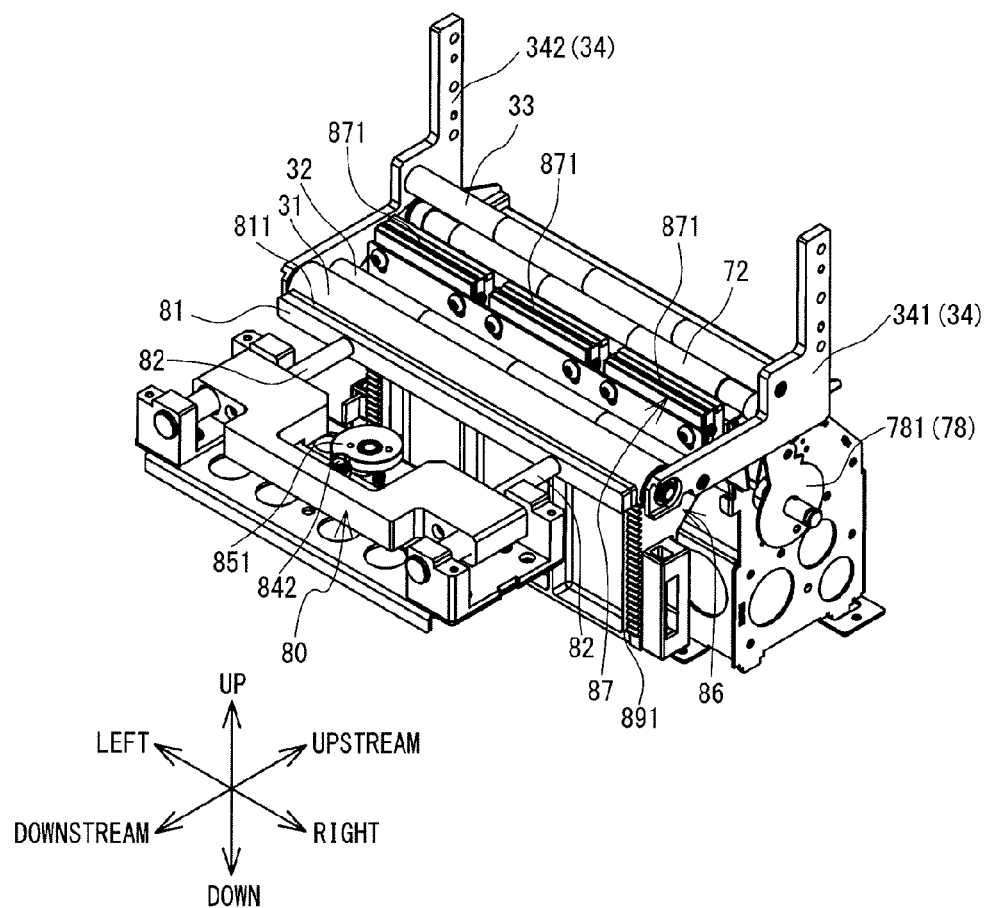
FIG. 21 is a perspective view of the movable rollers 30, the heating portion 86 and the rotation inhibiting portion 80.
Figure 22:
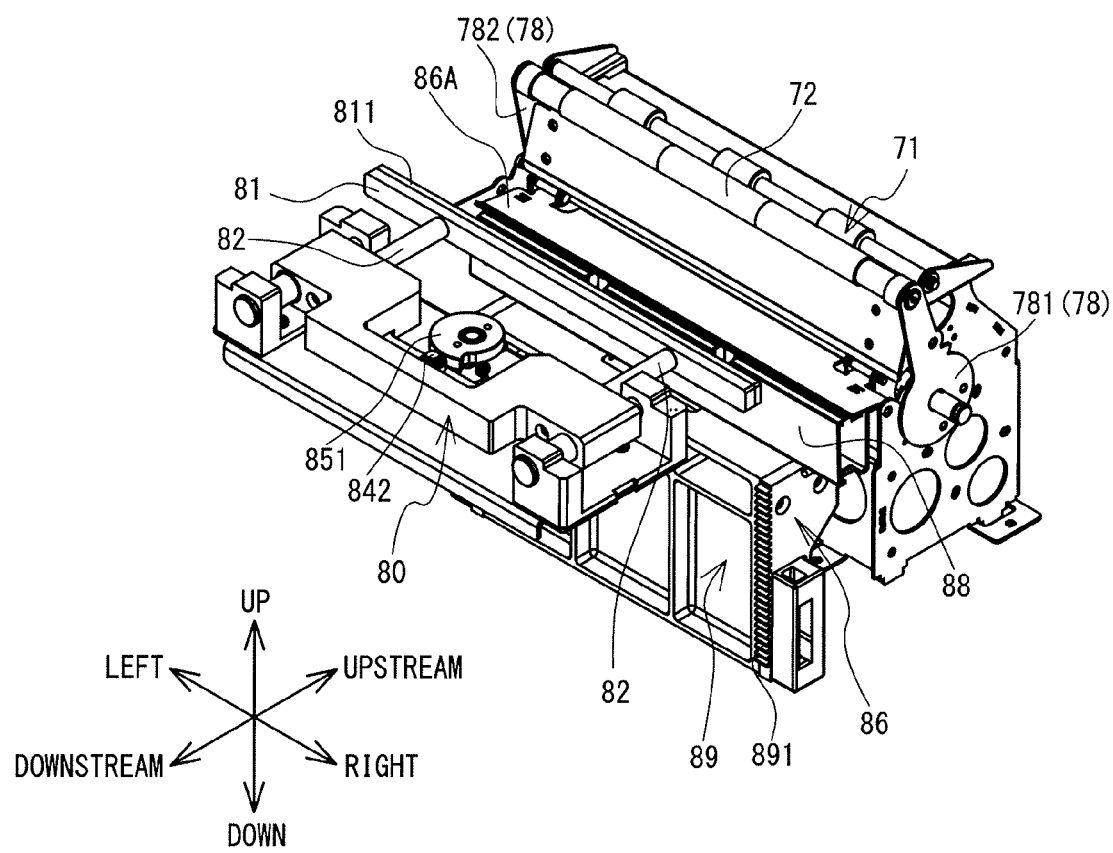
FIG. 22 is a perspective view of the heating portion 86 and the rotation inhibiting portion 80.

FIG. 21 shows a state in which the support portions 34 are located at their lowest positions, the base guide roller 71 and the holding roller 72 are close to each other, the heating portion 86 is located at its highest position, and the stopper 81 is positioned toward the upstream side. The rubber strip 811 of the stopper 81 is located in a position where it can come into contact with the cylindrical portion of the guide roller 31, and is pressed toward the guide roller 31 side. The rotation of the guide roller 31 can be thus inhibited. The heating units 87 of the heating portion 86 protrude upward through a space between the first auxiliary roller 32 and the holding roller 72. FIG. 22 shows a state in which the support portions 34 are located at their highest positions, the base guide roller 71 and the holding roller 72 are close to each other, the heating portion 86 is located at its lowest position, and the stopper 81 is positioned toward the downstream side (refer to FIG. 16). The top surfaces of the three heating units 87 (refer to FIG. 21) of the heating portion 86 that is located at its lowest position are covered by a lid 86A.

The base 2, on which may be placed the object 3 to be packaged by the packaging device 1, will be explained with reference to FIG. 23 to FIG. 25. The base 2 is formed by folding a plate-shaped portion 90, which is a substantially rectangular-shaped plate, at folding portions 911 and 912. The base 2 is, for example, a corrugated cardboard base.

Figure 23:
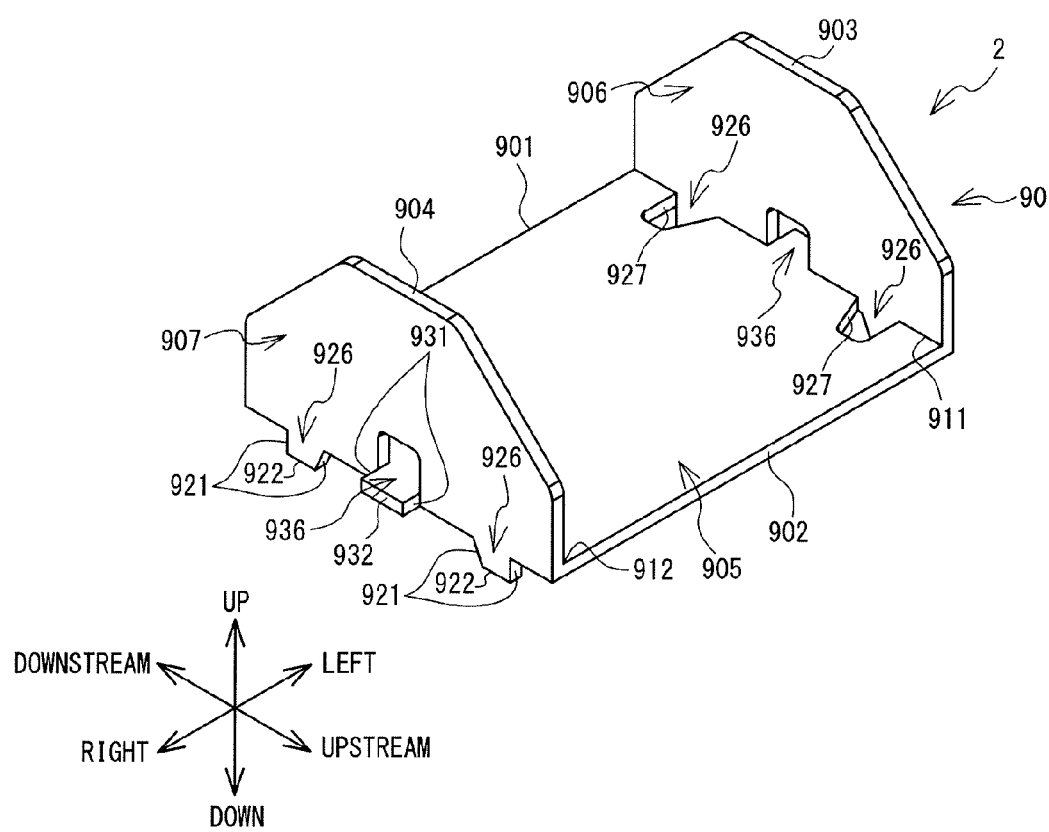
FIG. 23 is a perspective view of a base 2.

As shown in FIG. 23, the plate-shaped portion 90 has two opposing sides 901 and 902 and two opposing sides 903 and 904. The sides 901 and 902 are sides that extend in the long side direction. The sides 903 and 904 are sides that extend in the short side direction. The folding portions 911 and 912 are provided in the vicinity of the sides 903 and 904, respectively, and extend in the short side direction. FIG. 23 shows the base 2 in a state in which the plate-shaped portion 90 has been folded in the same direction at the folding portions 911 and 912, such that the angles formed at the folding portions 911 and 912 are each 90 degrees. Hereinafter, the short side direction of the plate-shaped portion 90 is also referred to as the conveyance direction, and the long side direction of the plate-shaped portion 90 is also referred to as the left-right direction. The side of the plate-shaped portion 90 on the side 901 is also called the downstream side, the side on the side 902 is also called the upstream side, the folding portion 911 side is also called the left side, and the folding portion 912 side is also called the right side. The section of the plate-shaped portion 90 between the folding portions 911 and 912 is called a first plate-shaped portion 905. The section of the plate-shaped portion 90 between the folding portion 911 and the side 903, and the section between the folding portion 912 and the side 904 are called second plate-shaped portions 906 and 907, respectively. The direction that is orthogonal to the first plate-shaped portion 905 is called the up-down direction. The side on which the sides 903 and 904 are positioned is called the upper side, and the opposite side is called the lower side.

A bottom surface protruding portion 926, a side surface protruding portion 936, and another bottom surface protruding portion 926 are provided in that order from the downstream side toward the upstream side of each of the folding portions 911 and 912, respectively, at positions that divide each of the folding portions 911 and 912 into four approximately equal sections in the conveyance direction. Each of the bottom surface protruding portions 926 is a section that is surrounded by a pair of first bottom surface cuts 921 and a second bottom surface cut 922. The bottom surface protruding portions 926 are positioned on the same plane as the second plate shaped-portions 906 and 907, and are orthogonal to the first plate-shaped portion 905. The bottom surface protruding portions 926 protrude downward with respect to the first plate-shaped portion 905. Each of the side surface protruding portions 936 is a section that is surrounded by a pair of first side surface cuts 931 and a second side surface cut 932. The side surface protruding portions 936 are positioned on the same plane as the first plate-shaped portion 905, and are orthogonal to the second plate-shaped portions 906 and 907. The side surface protruding portions 936 protrude in the left and right directions with respect to the second plate-shaped portions 906 and 907. Holes 927 that correspond to the bottom surface protruding portions 926 are formed in the first plate-shaped portion 905.

Figure 24:
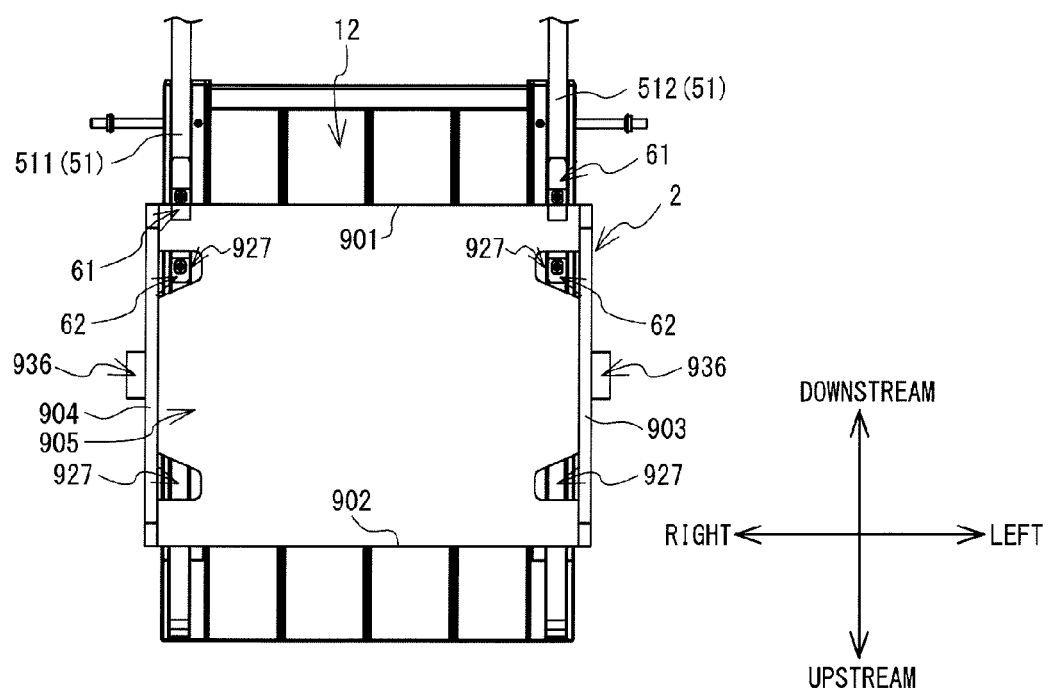
FIG. 24 is a plan view of the base 2 placed on a receiving tray 12.
Figure 25:
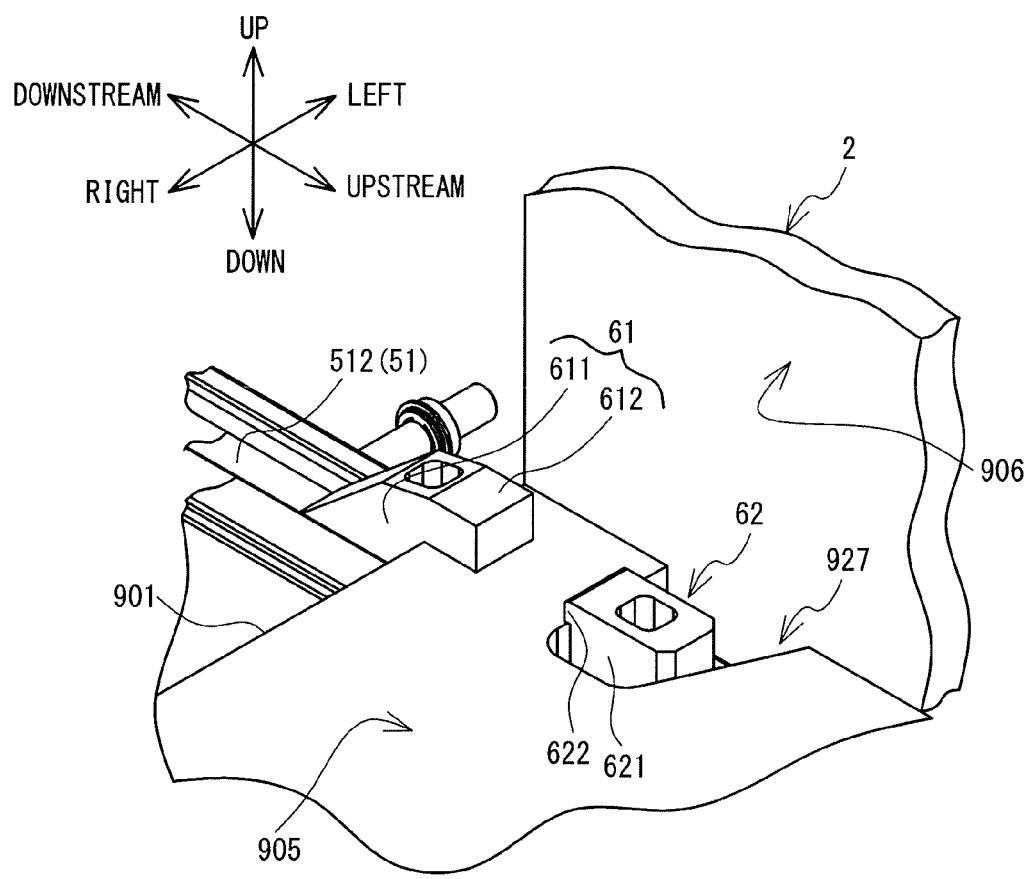
FIG. 25 is a perspective view of the base 2 that is mounted on the first conveyance portion 61 and the second conveyance portion 62.

FIG. 24 and FIG. 25 show the base 2 in a state in which it is placed on the receiving tray 12. A user may move the base 2 obliquely downward from the upstream side toward the downstream side in order to fit the side 901 of the first plate-shaped portion 905 of the base 2 into the space between the first extending portion 612 of the first conveyance portion 61 and the belt 51. The side 901 of the first plate-shaped portion 905 of the base 2 may move obliquely downward from the upstream side toward the downstream side and may enter the space that is sandwiched between the first extending portion 612 and the belt 51. As shown in FIG. 25, the side 901 of the base 2 may be fitted into the space that is sandwiched between the first extending portion 612 and the belt 51. The first extending portion 612 may be put into a state in which it covers the side 901 of the first plate-shaped portion 905 of the base 2 from above. The first conveyance portions 61 are provided on the belts 51 that are provided on both the left and right side surfaces of the receiving tray 12. Therefore, the side 901 of the first plate-shaped portion 905 of the base 2 may be put into a state in which it is held on both the left and right sides in the space that is sandwiched between the first extending portion 612 and the belt 51. The second protruding portion 621 of the second conveyance portion 62 may be fitted into the hole 927. The downstream end of the hole 927 may enter the space that is sandwiched between the second extending portion 622 and the belt 51. The downstream end of the hole 927 may be fitted into the space. The second extending portion 622 may be put into a state in which it covers the downstream end of the hole 927 from above.

Figure 26:
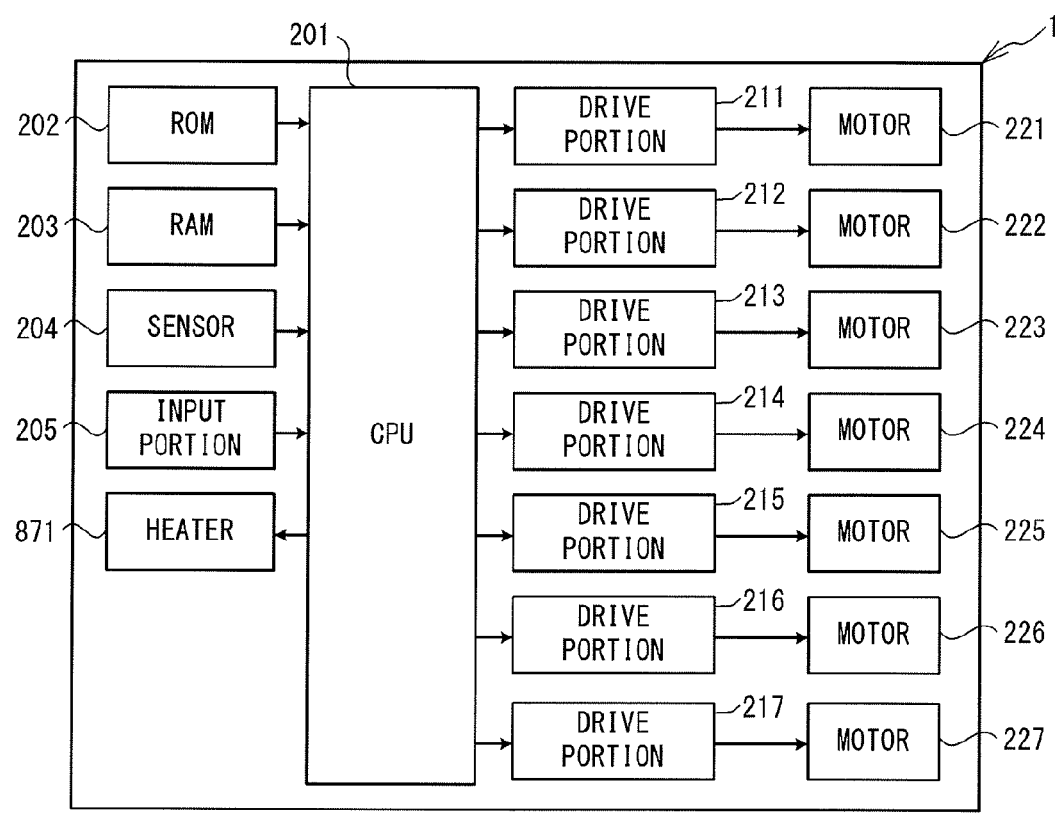
FIG. 26 is a block diagram that shows an electrical configuration of the packaging device 1.

An electrical configuration of the packaging device 1 will be explained with reference to FIG. 26. The packaging device 1 includes a CPU 201, a ROM 202, a RAM 203, the sensor 204, an input portion 205, and the heaters 871. The CPU 201 is configured to perform overall control of the packaging device 1. The CPU 201 is configured to perform packaging processing by executing a program that is stored in the ROM 202. The packaging processing is processing that packages, with the film 24, the object 3 that is placed on the base 2. The ROM 202 is configured to store the program for the packaging processing that may be executed by the CPU 201. The RAM 203 is configured to store temporary data. The sensor 204 is configured to detect the reflecting plate provided on the outer side surface of the belt 51. The input portion 205 includes a plurality of input buttons through which the user may perform an input operation with respect to the packaging device 1. The packaging device 1 also includes drive portions 211 to 217 and the motors 221 to 227. The drive portions 211 to 217 are configured to drive the motors 221 to 227, respectively. The CPU 201 is electrically connected to the ROM 202, the RAM 203, the sensor 204, the heaters 871 and the drive portions 211 to 217. The drive portions 211 to 217 are electrically connected to the motors 221 to 227, respectively.

The packaging processing that may be performed by the CPU 201 of the packaging device 1 and packaging steps that may be performed by the packaging device 1 will be explained with reference to FIG. 27 to FIG. 39. Note that FIG. 29 to FIG. 39 each show a cross-sectional view taken in the direction of arrows on a line A-A shown in FIG. 3. When the power supply of the packaging device 1 is turned on, the CPU 201 starts the packaging processing by reading and executing the program stored in the ROM 202.

The CPU 201 initializes the state of the packaging device 1 (Step S7). Specifically, the CPU 201 performs the following processing. The CPU 201 drives the motor 221 by controlling the drive portion 211, thus causing the support portions 34 to move upward and be positioned at their highest positions. That causes the movable rollers 30 supported by the support portions 34 to be positioned at their highest positions (refer to FIG. 29). The CPU 201 drives the motor 222 by controlling the drive portion 212, thus causing the belts 51 (refer to FIG. 29) of the conveyance mechanism 50 to rotate. When the sensor 204 detects the reflecting plate, the CPU 201 stops the driving of the motor 222 by controlling the drive portion 212. That puts the conveyance portions 60 into a state in which they protrude upward higher than the receiving surface 12A of the receiving tray 12. The packaging device 1 is put into a state in which the user can set the base 2 on the receiving surface 12A of the receiving tray 12.

The CPU 201 drives the motor 223 by controlling the drive portion 213, thus moving the heating portion 86 downward such that the heating portion 86 is positioned at its lowest position. That puts the heaters 871 that are located at the top of the heating units 87 into a state in which they are separated from the conveyance path 103 (refer to FIG. 29). The CPU 201 drives the motor 224 by controlling the drive portion 214, thus moving the stopper 81 toward the downstream side (refer to FIG. 29). The CPU 201 drives the motor 225 by controlling the drive portion 215, thus moving the cutting portion 77 to the left. The CPU 201 drives the motor 226 by controlling the drive portion 216, thus causing the holding portions 78 to swing. The holding roller 72 is put into a state in which it is separated from the base guide roller 71 in the downward direction (refer to FIG. 17). The CPU 201 drives the motor 227 to rotate in the reverse direction by controlling the drive portion 217, thus causing the first transmission mechanism 67 and the second transmission mechanism 68 of the winding mechanism 65 to separate from each other (refer to FIG. 14). The film gear 26A is put into a state in which it can rotate freely.

The CPU 201 receives, from the user via the input portion 205, an operation that specifies a torque of the motor 227 when the film 24 is wound up by the winding mechanism 65 (Step S9). The torque that may be accepted is one of "strong", "medium" and "weak". The CPU 201 stores information indicating the accepted torque in the RAM 203 (Step S11).

The CPU 201 determines whether or not a command to start the packaging of the base 2 and the object 3 with the film 24 is input via the input portion 205 (Step S12). In a case where the command to start the packaging is not input (NO at Step S12), the CPU 201 returns the processing to Step S12. The CPU 201 continues to wait for the input of the start command. After the packaging device 1 is initialized, the user manually pulls down the film 24 that is discharged from the discharge opening of the film cassette 21, through the upstream side of the second auxiliary roller 33. Since the film 24 comes into contact with the upstream side of the second auxiliary roller 33, the film 24 is guided slightly to the upstream side. The user pulls the leading end of the pulled down film 24 until the leading end is below the conveyance path 103 and arranges the leading end on the downstream side of the base guide roller 71 (refer to FIG. 29).

The user performs an input operation via the input portion 205 in order to notify the packaging device 1 that the film 24 is ready. The CPU 201 drives the motor 226 by controlling the drive portion 216, thus causing the holding portions 78 to swing. Doe to the swing of the holding portions 78, the holding roller 72 is put into a state in which it is positioned in the vicinity of and on the downstream side of the base guide roller 71 (refer to FIG. 29). The leading end of the film 24 that is discharged from the film cassette 21 is clamped by the base guide roller 71 and the holding roller 72 from both the upstream side and the downstream side in the conveyance direction. The film 24 and the conveyance path 103 intersect with each other in the vicinity of the leading end of the film 24. The film 24 is put into a state in which it extends straight in the up-down direction between the upstream side of the second auxiliary roller 33 and the section that is clamped by the base guide roller 71 and the holding roller 72.

The user places the base 2 on the receiving tray 12 (refer to FIG. 24 and FIG. 25). The base 2 is positioned by the conveyance portions 60. The side 901 of the first plate-shaped portion 905 of the base 2 is positioned on the downstream side, and the side 902 is positioned on the upstream side. The base 2 is put into a state in which it can be conveyed toward the downstream side by the conveyance portions 60. The user places the object 3 on the first plate-shaped portion 905 of the base 2 that is placed on the receiving tray 12. The user performs an input operation, via the input portion 205, that issues a command to start the packaging of the base 2 and the object 3 with the film 24.

Figure 27:
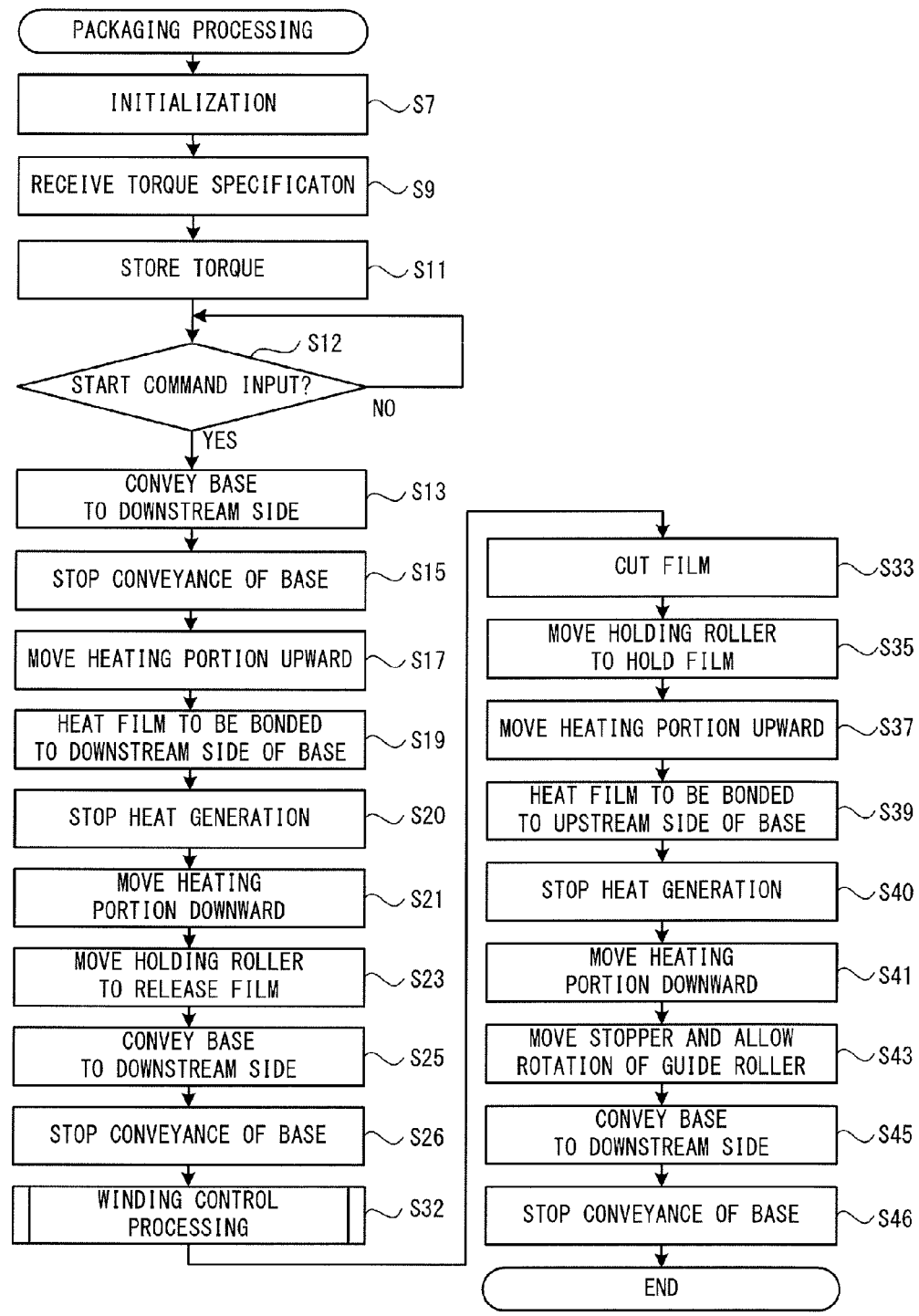
FIG. 27 is a flowchart of packaging processing according to the first embodiment.

As shown in FIG. 27, in a case where the command to start the packaging is input (YES at Step S12), the CPU 201 drives the motor 222 by controlling the drive portion 212. The CPU 201 adjusts the rotation direction of the motor 222 by controlling the drive portion 212 such that the belts 51 rotate in the direction in which the base 2 is conveyed from the upstream side toward the downstream side. The motor 222 rotates the belts 51. The belts 51 rotate in the direction (the direction of an arrow 141 in FIG. 29) in which the conveyance portions 60 that protrude upward higher than the receiving surface 12A of the receiving tray 12 move from the upstream side toward the downstream side. The conveyance portions 60 convey the base 2 along the conveyance path 103 from the upstream side toward the downstream side (Step S13). Hereinafter, the rotation direction of the motor 222 and the belts 51 when the base 2 is conveyed from the upstream side toward the downstream side is referred to as the forward direction, and the rotation direction of the motor 222 and the belts 51 that is opposite to the forward direction is referred to as the reverse direction.

Figure 29:
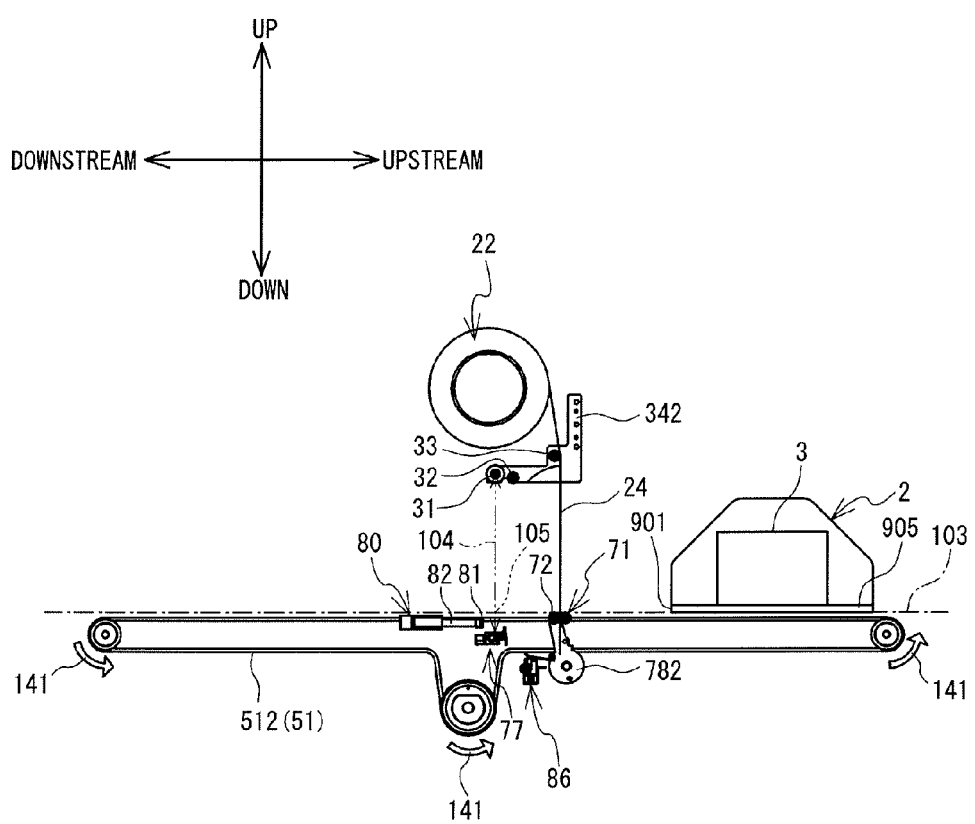
FIG. 29 is a figure that shows a packaging step in the packaging processing.

As shown in FIG. 29, the downstream edge of the base 2 gradually approaches the film 24 that is extending in the up-down direction. The downstream edge (the side 901) of the first plate-shaped portion 905 of the base 2 comes into contact with the film 24 and thereafter passes over the holding roller 72. The CPU 201 continues to drive the motor 222 by controlling the drive portion 212, thus causing the belts 51 to continue to rotate in the forward direction. The base 2 continues to be conveyed toward the downstream side.

Figure 30:
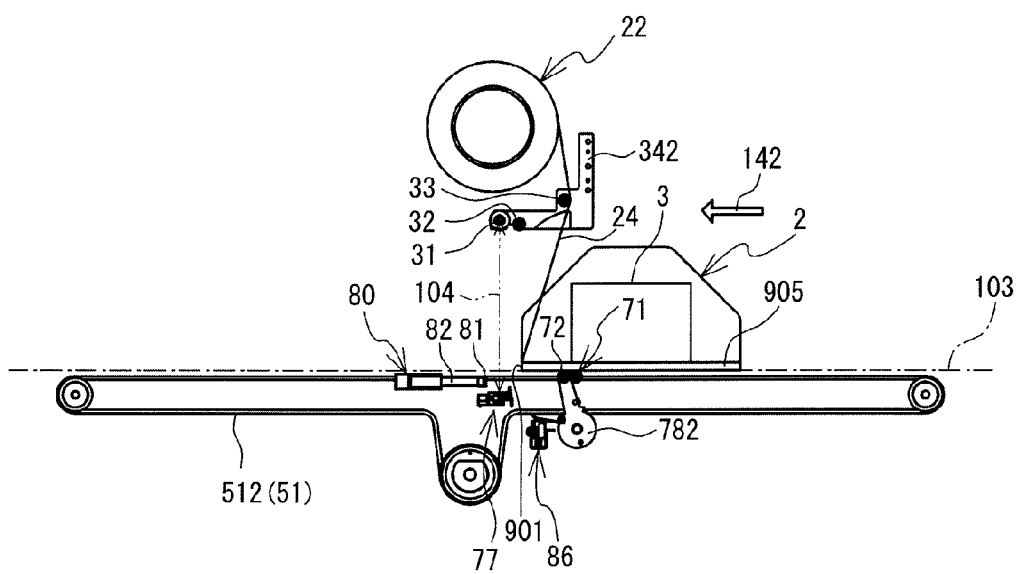
FIG. 30 is a figure that shows a packaging step in the packaging processing.

As shown in FIG. 30, the moving of the base 2 toward the downstream side (in the direction of an arrow 142) causes the side 901 of the first plate-shaped portion 905 of the base 2 to push the film 24 toward the downstream side. The side 901 approaches the movement path 104 from the upstream side. The base 2 moves farther toward the downstream side, and the side 901 passes above the heating portion 86. Note that the leading end of the film 24 is clamped by the base guide roller 71 and the holding roller 72. When the film 24 is pushed toward the downstream side by the side 901 of the base 2, the leading end of the film 24 is moved around to the lower surface of the first plate-shaped portion 905 of the base 2. The film 24 is fed out from the film roll 22 and the film roll 22 rotates. Since the first transmission mechanism 67 and the second transmission mechanism 68 of the winding mechanism 65 are disconnected, the film gear 26A rotates freely. Thus, the film 24 is smoothly fed out from the film roll 22.

Based on the number of rotations of the motor 222 from when the conveyance of the base 2 toward the downstream side is started at Step S13 (refer to FIG. 27), the CPU 201 detects whether the side 901 of the base 2 has been moved toward the downstream side by a specified distance in relation to the position above the heating portion 86. In a case where the side 901 has been moved farther toward the downstream side than the position above the heating portion 86 by the specified distance, the CPU 201 stops the driving of the motor 222 by controlling the drive portion 212, thus stopping the conveyance of the base 2 toward the downstream side, as shown in FIG. 27 (Step S15).

Figure 31:
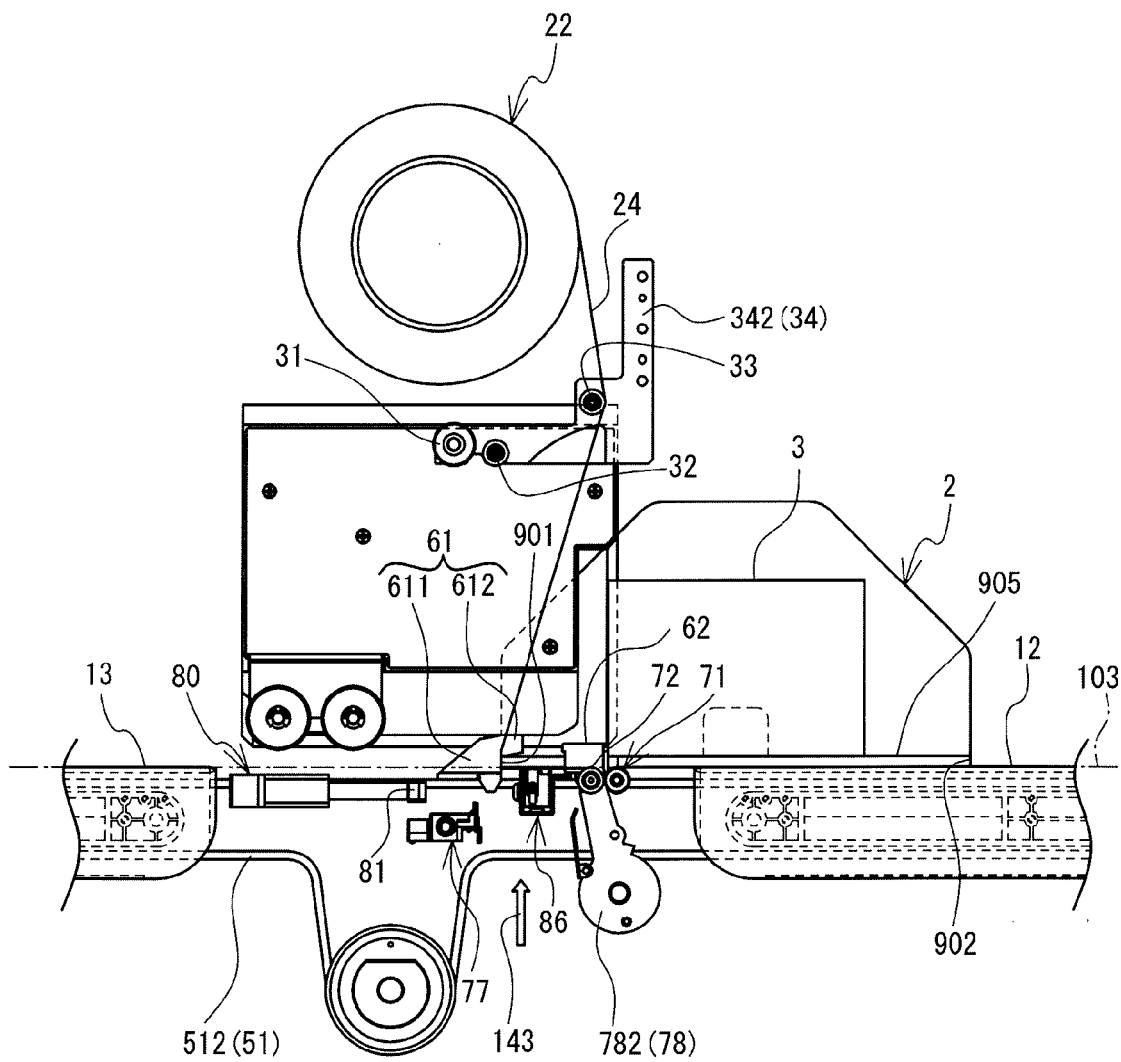
FIG. 31 is a figure that shows a packaging step in the packaging processing.

The CPU 201 drives the motor 223 by controlling the drive portion 213, thus causing the heating portion 86 to move upward (Step S17). After the heating portion 86 is put into a state in which it is at its highest position, the CPU 201 stops the driving of the motor 223 by controlling the drive portion 213, thus stopping the upward movement of the heating portion 86. As shown in FIG. 31, in a case where the heating portion 86 has been moved upward (in the direction of an arrow 143) to its highest position, the top surfaces of the heating units 87 of the heating portion 86 are positioned close to the conveyance path 103 from below. The side 901 of the base 2 has been moved farther toward the downstream side than the position above the heating portion 86 by the specified distance. The film 24 has been moved around to the lower surface of the first plate-shaped portion 905. Therefore, in a state in which the heating portion 86 is located at its highest position, the film 24 is sandwiched between the top surfaces of the heating units 87 and the lower surface of the first plate-shaped portion 905.

Figure 32:
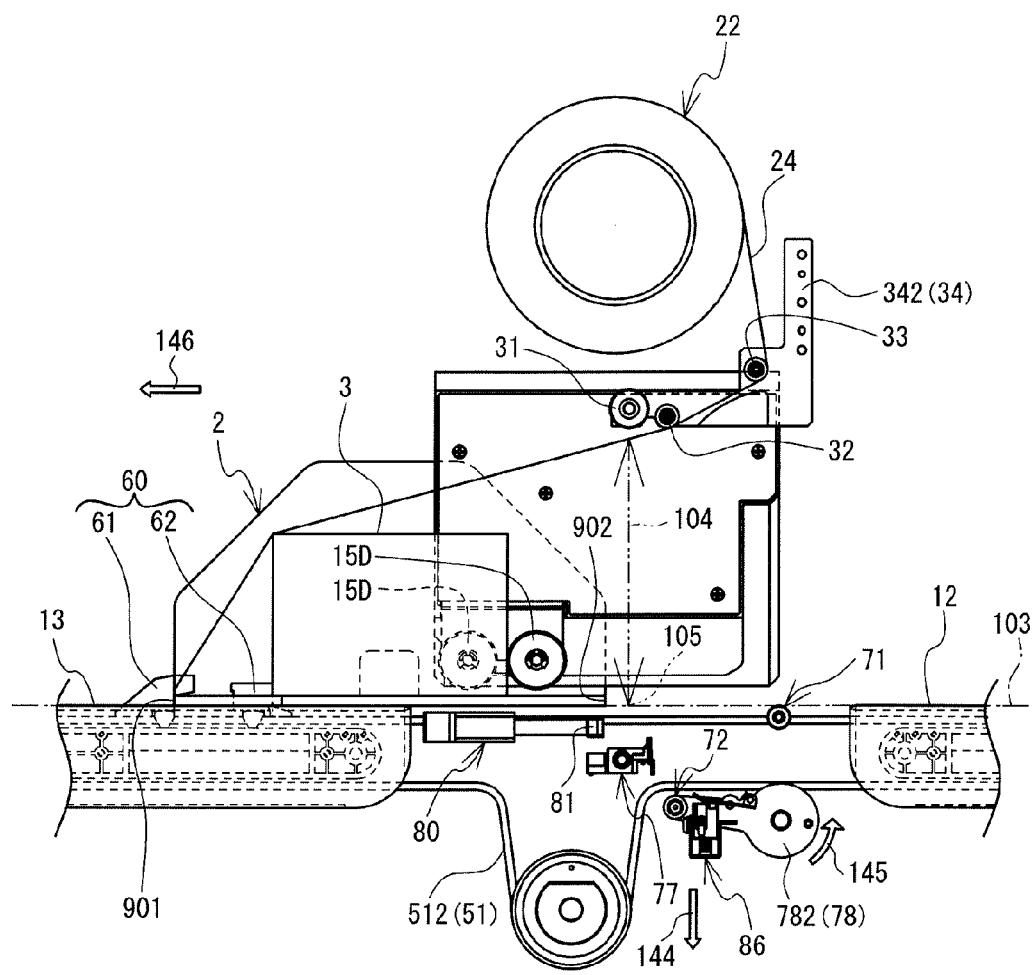
FIG. 32 is a figure that shows a packaging step in the packaging processing.

As shown in FIG. 27, the CPU 201 causes the heaters 871 of the heating portion 86 to generate heat (Step S19). The heaters 871 heat and melt the leading end of the film 24. The melted leading end of the film 24 is bonded to the lower surface of the first plate-shaped portion 905 in the vicinity of the side 901 (Step S19). The CPU 201 stops the heat generation of the heaters 871 after a specified time period has elapsed from when the heat generation of the heaters 871 is started (Step S20). The specified time period is a time period that is necessary for the heaters 871 to heat the film 24 to its melting point. The CPU 201 drives the motor 223 by controlling the drive portion 213, thus causing the heating portion 86 to move downward in the direction of an arrow 144, as shown in FIG. 32 (Step S21). The top surfaces of the heating units 87 of the heating portion 86 move away from the conveyance path 103. After the heating portion 86 has reached its lowest position, the CPU 201 stops the driving of the motor 223 by controlling the drive portion 213, thus stopping the downward movement of the heating portion 86.

The CPU 201 drives the motor 226 by controlling the drive portion 216, thus causing the holding portions 78 to swing (Step S23). As shown in FIG. 32, when the holding portions 78 is swung in the direction of an arrow 145, the holding roller 72 is put into a state in which it is separated from the base guide roller 71 in the downward direction. The base guide roller 71 and the holding roller 72 release the leading end of the film 24 that is clamped between them. The leading end of the film 24, which was melted by being heated by the heaters 871 at Step S19, is in a state in which it is bonded to the lower surface of the base 2. As shown in FIG. 27, the CPU 201 drives the motor 222 by controlling the drive portion 212, thus causing the belts 51 to rotate in the forward direction such that the base 2 is conveyed toward the downstream side (Step S25).

As shown in FIG. 32, the conveyance portions 60 move along the conveyance path 103 from the upstream side toward the downstream side and convey the base 2 toward the downstream side (in the direction of an arrow 146). The leading end of the film 24 has been released from the base guide roller 71 and the holding roller 72. In the state in which the leading end of the film 24 is bonded to the lower surface of the base 2, the leading end of the film 24 moves toward the downstream side in conjunction with the movement of the base 2. The film 24 is fed out from the film roll 22 and the film roll 22 rotates. The film 24 is smoothly fed out from the film roll 22. The side 901 of the base 2, in moving from the upstream side toward the downstream side, traverses the intersection position 105 at which the conveyance path 103 and the movement path 104 intersect. The base 2 moves farther toward the downstream side (in the direction of the arrow 146). The side 901 and the downstream end portion of the object 3 are pressed against the film 24 by the movement of the base 2 toward the downstream side. The film 24 is bent at portions where the film 24 is in contact with the side 901 and the object 3. The CPU 201 continuously drives the motor 222 by controlling the drive portion 212, thus causing the belts 51 to continuously rotate in the forward direction. The first conveyance portions 61 move to positions above the receiving tray 13, and the downstream side of the base 2 is conveyed to a position on the receiving tray 13.

The base 2 is continuously conveyed toward the downstream side, and the film 24 is disposed in a position where the film 24 covers the first plate-shaped portion 905 of the base 2 and the upper side of the object 3. The upstream edge (the side 902) of the first plate-shaped portion 905 of the base 2 passes over the base guide roller 71. The base 2 is conveyed farther toward the downstream side (in the direction of the arrow 146). The side 902 traverses the intersection position 105 from the upstream side toward the downstream side. The film 24 that extends from the film roll 22 comes into contact with the upstream side of the second auxiliary roller 33 and is guided slightly to the upstream side. Then, the film 24 comes into contact with the lower side of the second auxiliary roller 33 and extends toward the downstream side. The film 24 comes into contact with the lower side of the first auxiliary roller 32 and extends farther toward the downstream side, eventually reaching the downstream side of the side 901 of the base 2 and the object 3. The guide roller 31 is in a state in which it is disposed above the film 24 that extends between the first auxiliary roller 32 and the base 2 and the object 3.

As shown in FIG. 27, the CPU 201 detects whether the side 902 of the base 2 has been moved farther toward the downstream side than the intersection position 105, based on the number of rotations of the motor 222 from when the conveyance of the base 2 toward the downstream side is started at Step S25. In a case where the side 902 has been moved farther toward the downstream side than the intersection position 105, the CPU 201 stops the driving of the motor 222 by controlling the drive portion 212, thus stopping the conveyance of the base 2 (Step S26). The CPU 201 performs winding control processing (refer to FIG. 28) (Step S32).

The winding control processing will be explained with reference to FIG. 28. The CPU 201 reads, from the RAM 203, the information indicating the torque (one of "strong", "medium" and "weak") of the motor 227 stored at Step S11 (refer to FIG. 27). The CPU 201 drives the motor 227 to rotate in the forward direction by controlling the drive portion 217 such that the motor 227 rotates with a torque corresponding to the read information. The first transmission mechanism 67 and the second transmission mechanism 68 of the winding mechanism 65 are coupled (Step S51, refer to FIG. 13). The rotational driving force of the motor 227 can be transmitted to the film gear 26A via the first transmission mechanism 67 and the second transmission mechanism 68. The CPU 201 further drives the motor 227 to rotate in the forward direction. The film gear 26A rotates in a direction to wind up the film 24 fed out from the film roll 22 (Step S51). The film roll 22 winds up the film 24 with a force corresponding to the torque of the motor 227. The film 24 moves in a direction that is opposite to the direction in which the film 24 is fed out from the film roll 22. Since the leading end of the film 24 is bonded to the lower surface of the base 2, when the film 24 is wound up, a strong tension corresponding to the torque of the motor 227 is exerted on the film 24. The film 24 is pressed against the object 3 by the strong tension and is firmly attached to the downstream side and the upper side of the object 3. When the motor 227 rotates by a number of rotations, the rotation of the motor 227 is inhibited by the strong tension exerted on the film 24 and is stopped. Note that even after the rotation of the motor 227 has stopped, the drive portion 217 continues to drive the motor 227 to rotate in the forward direction. Therefore, the strong tension corresponding to the torque of the motor 227 continues to be exerted on the film 24.

The CPU 201 drives the motor 221 by controlling the drive portion 211, thus causing the support portions 34 to move downward. The guide roller 31 supported by the support portions 34 starts to move from its highest position to its lowest position along the movement path 104 (Step S53). The guide roller 31 comes into contact from above with the film 24 that is disposed below the guide roller 31, and guides the film 24 downward along the movement path 104. Since the guide roller 31 guides the film 24 downward, the film 24 is fed out from the film roll 22. Since the drive portion 217 continues to drive the motor 227 to rotate in the forward direction, the rotation of the film gear 26A is inhibited by the motor 227. When the guide roller 31 guides the film 24, the tension that is exerted on the film 24 is further increased. The film 24 is pressed against the upper side and the upstream side of the object 3 by the strong tension corresponding to the torque of the motor 227, and is firmly attached to the object 3. The CPU 201 detects whether the guide roller 31 is located at its lowest position, based on the number of rotations of the motor 221 from when the downward movement of the guide roller 31 is started at Step S53. When the guide roller 31 has moved to its lowest position, the CPU 201 stops the driving of the motor 221, thus stopping the downward movement of the guide roller 31 (Step S55).

Figure 33:
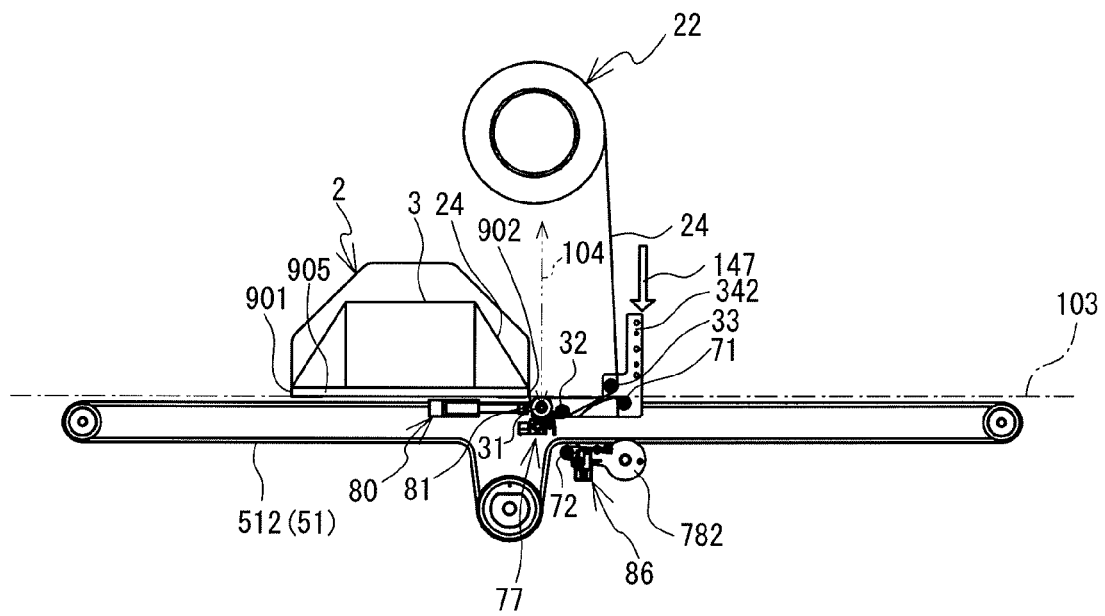
FIG. 33 is a figure that shows a packaging step in the packaging processing.

As shown in FIG. 33, the guide roller 31 moves downward (in the direction of an arrow 147) along the movement path 104 and is disposed at its lowest position. The guide roller 31 is put into a state in which it is in contact with the conveyance path 103 from below. The film 24 is disposed in a position where the film 24 covers the first plate-shaped portion 905 of the base 2 and the upstream side of the object 3.

The film 24 extends toward the guide roller 31 from the portion where the film 24 comes into contact with the side 902 of the base 2, then comes into contact with the downstream side and the lower side of the guide roller 31, and extends toward the upstream side. The film 24 comes into contact with the lower side of the first auxiliary roller 32 and extends farther toward the upstream side, then comes into contact with the lower side and the upstream side of the second auxiliary roller 33, and reaches the film roll 22. A section of the film 24 that is located between the portion that is in contact with the lower side of the guide roller 31 and the portion that is in contact with the lower edge of the first auxiliary roller 32 extends substantially in the horizontal direction, and is disposed below the upper edge of the blade portion 771 that extends upward from the cutting portion 77 (refer to FIG. 35). Note that, when the packaging device 1 is in the initialized state (refer to Step S7), the cutting portion 77 is in a state in which it has been moved to the left side. Therefore, the film 24 is not in contact with the blade portion 771 at this point in time.

Figure 28:
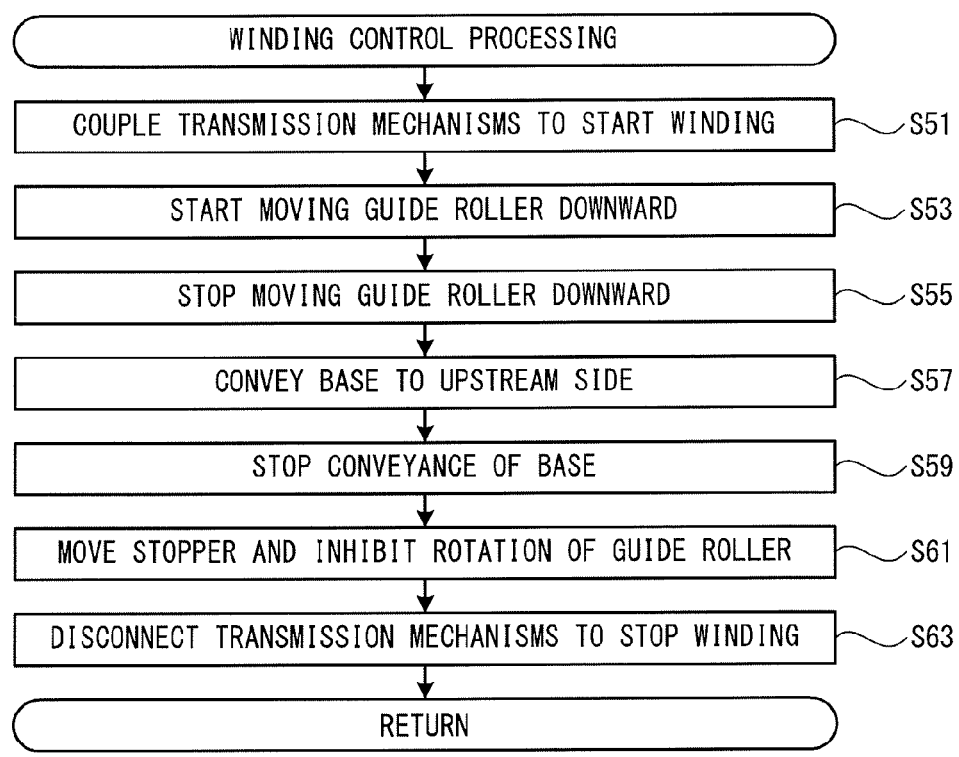
FIG. 28 is a flowchart of winding control processing.
Figure 34:
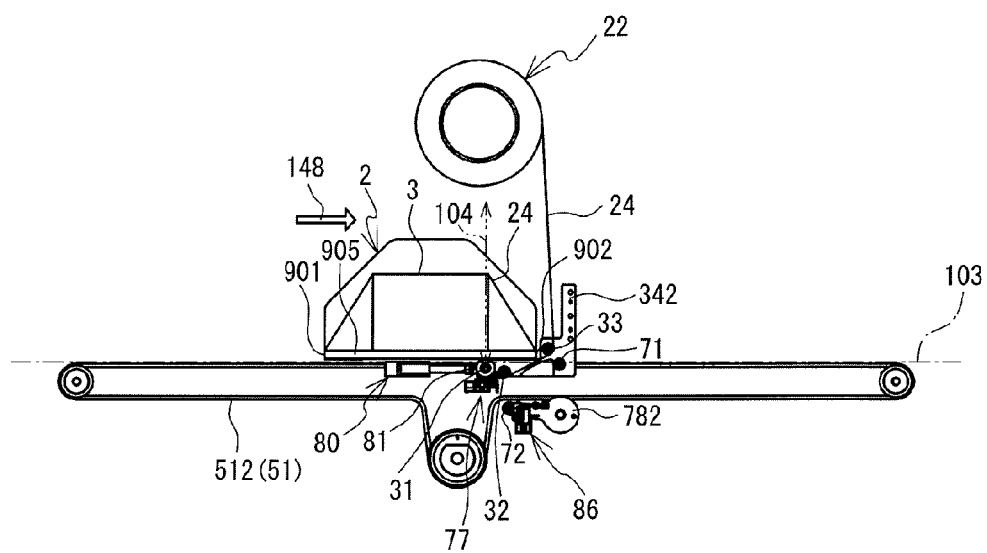
FIG. 34 is a figure that shows a packaging step in the packaging processing.

As shown in FIG. 28, the CPU 201 drives the motor 222 by controlling the drive portion 212, thus causing the belts 51 to rotate in the reverse direction. The conveyance portions 60 move from the downstream side toward the upstream side and convey the base 2 toward the upstream side along the conveyance path 103 (Step S57). The base 2 is conveyed in the reverse direction (the direction from the downstream side toward the upstream side). As shown in FIG. 34, the base 2 moves from the downstream side toward the upstream side (in the direction of an arrow 148), thus causing the side 902 of the base 2 to approach the intersection position 105 from the downstream side. The side 902 traverses the intersection position 105 from the downstream side toward the upstream side. The side 902 passes through the position above the heating portion 86 and moves toward the upstream side. In a state in which the guide roller 31 is in contact with the lower surface of the first plate-shaped portion 905 from below, the guide roller 31 moves relatively from the side 902 toward the downstream side. The film 24 is put into a state in which it is sandwiched between the lower surface of the first plate-shaped portion 905 and the guide roller 31.

In accordance with the conveyance of the base 2 toward the upstream side, the film 24 is further fed out from the film roll 22. Since the drive portion 217 continues to drive the motor 227 to rotate in the forward direction, the rotation of the film gear 26A is inhibited by the motor 227. When the base 2 is conveyed to the upstream side, the tension that is exerted on the film 24 is further increased. The film 24 is pressed against the upstream side of the object 3 by the further increased tension and is firmly attached to the object 3.

Figure 35:
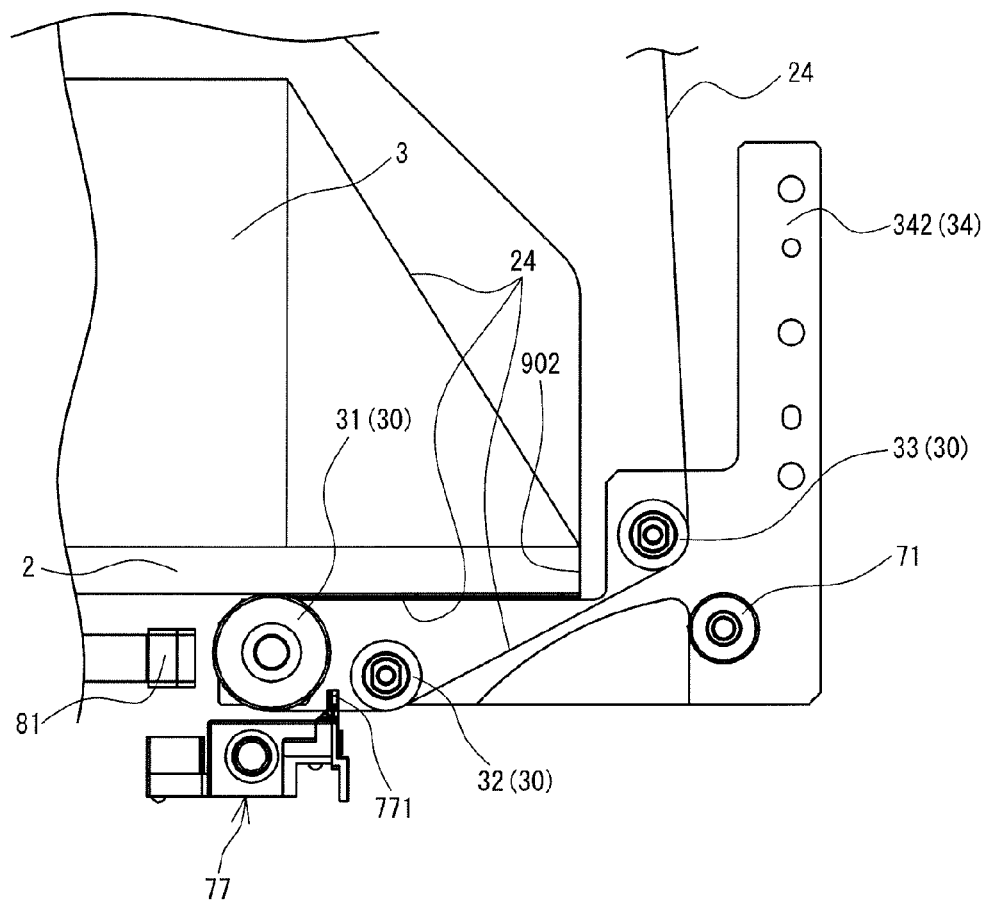
FIG. 35 is a figure that shows a packaging step in the packaging processing.

As shown in FIG. 35, the film 24 extends along the lower surface of the first plate-shaped portion 905 toward the downstream side from the portion where the film 24 comes into contact with the side 902 of the base 2. The film 24 is wound around the guide roller 31 from above, and the direction of the film 24 is changed. Then, the film 24 extends toward the upstream side from the lower side of the guide roller 31. The film 24 comes into contact with the lower side of the first auxiliary roller 32 and extends farther toward the upstream side. The film 24 eventually comes into contact with the lower side and the upstream side of the second auxiliary roller 33 and reaches the film roll 22.

As shown in FIG. 28, based on the number of rotations of the motor 222 from when the conveyance of the base 2 toward the upstream side is started at Step S57, the CPU 201 detects whether the side 902 has been moved toward the upstream side by a specified distance in relation to the position above the heating portion 86. In a case where the side 902 has been moved farther toward the upstream side than the position above the heating portion 86 by the specified distance, the CPU 201 stops the driving of the motor 222 by controlling the drive portion 212, thus stopping the conveyance of the base 2 (Step S59).

Figure 36:
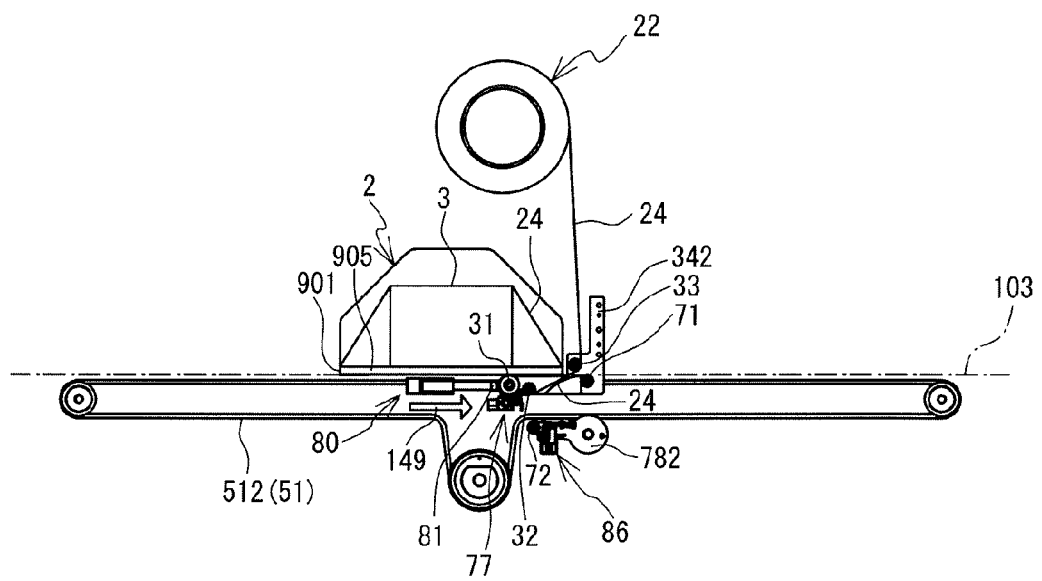
FIG. 36 is a figure that shows a packaging step in the packaging processing.

The CPU 201 drives the motor 224 by controlling the drive portion 214, thus causing the stopper 81 of the rotation inhibiting portion 80 to move toward the upstream side (Step S61). As shown in FIG. 36, the guide roller 31 that has moved to its lowest position is positioned on the upstream side of the stopper 81 of the rotation inhibiting portion 80. The movement of the stopper 81 toward the upstream side (in the direction of an arrow 149) causes the rubber strip 811 of the stopper 81 to come close to the guide roller 31, such that the film 24 that is wound around the guide roller 31 is clamped between the rubber strip 811 and the guide roller 31. The rubber strip 811 pushes the guide roller 31 toward the upstream side through the film 24, and the guide roller 31 is thus inhibited from rotating. The film 24 is clamped between the guide roller 31 and the rubber strip 811.

As shown in FIG. 28, the CPU 201 drives the motor 227 to rotate in the reverse direction by controlling the drive portion 217. The first transmission mechanism 67 and the second transmission mechanism 68 of the winding mechanism 65 are disconnected (refer to FIG. 14). The gears 681, 683, 684 and 685 and the film gear 26A (refer to FIG. 14) are put into a state in which they can rotate freely (Step S63). The CPU 201 ends the winding control processing and returns the processing to the packaging processing (refer to FIG. 27). Note that the film 24 is clamped between the guide roller 31 and the rubber strip 811 at Step S31. Therefore, even after the film gear 26A is put into a state in which it can rotate freely, the film 24 remains firmly attached to the downstream side, the upper side and the upstream side of the object 3.

Figure 37:
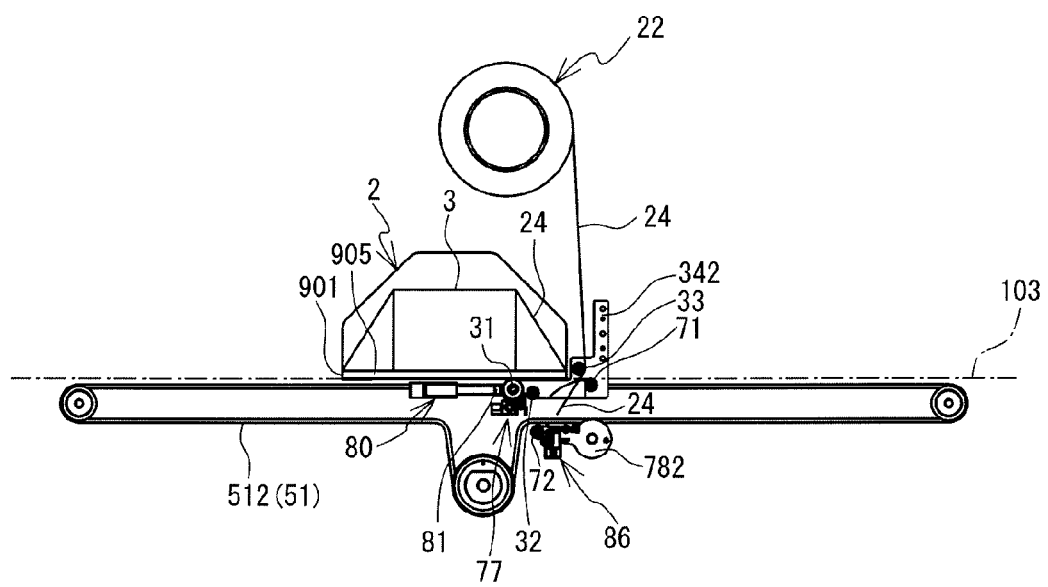
FIG. 37 is a figure that shows a packaging step in the packaging processing.

As shown in FIG. 27, the CPU 201 drives the motor 225 by controlling the drive portion 215, thus moving the cutting portion 77 from the left to the right along the guide rail 74 (refer to FIG. 18) (Step S33). As shown in FIG. 35, the upper edge of the blade portion 771 of the cutting portion 77 is positioned higher than the film 24 that extends substantially horizontally between the lower side of the guide roller 31 and the lower side of the first auxiliary roller 32. Therefore, the movement of the cutting portion 77 to the right causes the film 24 to be cut by the blade portion 771, in the section of the film 24 that extends between the guide roller 31 and the first auxiliary roller 32. The cutting portion 77 cuts the section of the film 24 that covers the first plate-shaped portion 905 of the base 2 and the object 3 away from the section of the film 24 that is wound around the film roll 22. As shown in FIG. 37, after the film 24 has been cut, the cut end of the film 24 that extends from the film roll 22 hangs down below the base guide roller 71.

Figure 38:
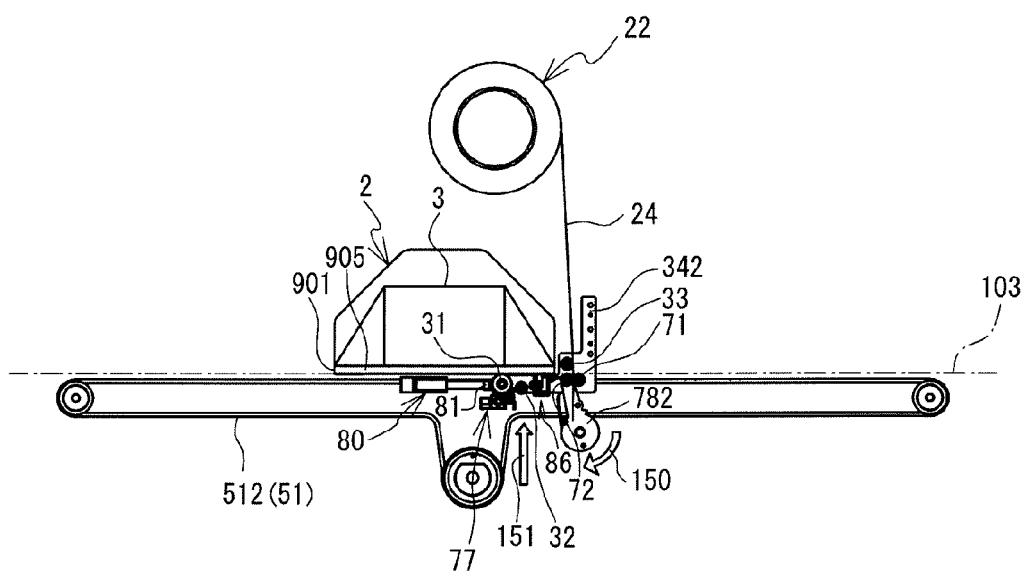
FIG. 38 is a figure that shows a packaging step in the packaging processing.

As shown in FIG. 27, the CPU 201 drives the motor 226 by controlling the drive portion 216, thus causing the holding portions 78 to swing (Step S35). As shown in FIG. 38, the holding portions 78 swings in the direction of an arrow 150. The holding roller 72 is put into a state in which it is positioned close to the downstream side of the base guide roller 71. The end of the film 24 that has been cut by the cutting portion 77 is clamped by the base guide roller 71 and the holding roller 72.

As shown in FIG. 27, the CPU 201 drives the motor 223 by controlling the drive portion 213, thus causing the heating portion 86 to move upward (Step S37). After the heating portion 86 has been located at its highest position, the CPU 201 stops the driving of the motor 223 by controlling the drive portion 213, thus stopping the upward movement of the heating portion 86. As shown in FIG. 38, in the state in which the heating portion 86 has been moved upward (in the direction of an arrow 151) to its highest position, the top surfaces of the heating units 87 of the heating portion 86 are in a state in which they are close to the conveyance path 103 from below. Note that the side 902 of the base 2 has been moved farther toward the upstream side than the position above the heating portion 86 by the specified distance. The film 24, which has been guided by the guide roller 31, is positioned along the lower surface of the first plate-shaped portion 905, close to the side 902. Therefore, in a case where the heating portion 86 has been moved upward and is located at its highest position, the film 24 is in a state in which it is sandwiched between the top surfaces of the heating units 87 and the base 2.

As shown in FIG. 27, the CPU 201 causes the heaters 871 of the heating portion 86 to generate heat (Step S39). The heaters 871 heat the end of the film 24 that was cut by the cutting portion 77, thereby melting the film 24. The melted film 24 is bonded to the lower surface of the first plate-shaped portion 905, in the vicinity of the side 902 (Step S39). The film 24 that was cut away from the film roll 22 is put into a state in which the film 24 covers the base 2 and the object 3.

Figure 39:
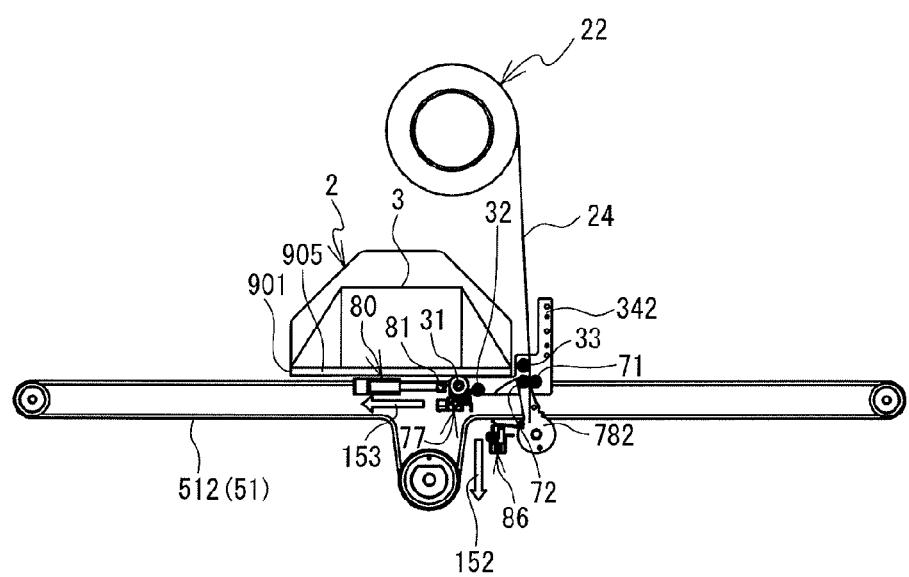
FIG. 39 is a figure that shows a packaging step in the packaging processing.

The CPU 201 stops the heat generation of the heaters 871 after a specified time period has elapsed from when the heat generation of the heaters 871 is started at Step S39 (Step S40). The CPU 201 drives the motor 223 by controlling the drive portion 213, thus causing the heating portion 86 to move downward in the direction of an arrow 152, as shown in FIG. 39 (Step S41). The top surfaces of the heating units 87 move away from the conveyance path 103. After the heating portion 86 has reached its lowest position, the CPU 201 stops the rotation of the motor 223 by controlling the drive portion 213.

The CPU 201 drives the motor 224 by controlling the drive portion 214, thus causing the stopper 81 of the rotation inhibiting portion 80 to move toward the downstream side (in the direction of an arrow 153), as shown in FIG. 39 (Step S43). The stopper 81 moves toward the downstream side, and the rubber strip 811 that is provided on the stopper 81 separates away from the guide roller 31. The guide roller 31 is put into a state in which it can rotate.

The CPU 201 drives the motor 222 by controlling the drive portion 212, thus causing the belts 51 to rotate in the forward direction such that the base 2 is conveyed toward the downstream side (Step S45). The base 2 and the object 3, for which the packaging has been completed, are conveyed toward the downstream side. The CPU 201 detects whether the first conveyance portions 61 have been moved toward the downstream side and have reached the downstream end portion of the receiving tray 13, based on the number of rotations of the motor 222 from when the conveyance of the base 2 toward the downstream side is started at Step S45. In a case where the first conveyance portions 61 have been moved toward the downstream side and have reached the downstream end portion of the receiving tray 13, the CPU 201 stops the driving of the motor 222 by controlling the drive portion 212, thus stopping the conveyance of the base 2 (Step S46). The packaging processing ends.

As explained above, the packaging device 1 can exert a strong tension on the film 24 by winding up the film 24 during execution of the packaging processing. It is therefore possible for the packaging device 1 to firmly attach the film 24 to the object 3. The packaging device 1 is configured to wind up the film 24 at any time during a period after the film 24 is bonded to the downstream side of the base 2 and before the film 24 is bonded to the upstream side of the base 2. The film 24 moves in the direction opposite to the direction in which the film 24 is fed out from the film roll 22. The packaging device 1 is configured to adjust the time at which the film 24 is wound up, and thus adjust the force exerted on the base 2 and the object 3 by the film 24 such that the force does not increase excessively. Therefore, the packaging device 1 can inhibit the tension exerted on the film 24 from obstructing the conveyance of the base 2 and the object 3, and thus can inhibit the base 2 and the object 3 from not being conveyed appropriately. Further, the packaging device 1 can inhibit the base 2 and the object 3 from being deformed due to the excessive tension being exerted on the film 24. Further, the packaging device 1 can firmly attach the film 24 to the object 3 by exerting an appropriate tension on the film 24. It is thus possible for the packaging device 1 to appropriately package the object 3 with the film 24.

After the film 24 is bonded to the downstream end portion of the base 2 at Step S19 and before the film 24 is bonded to the upstream end portion of the base 2 at Step S39, the packaging device 1 causes the winding mechanism 65 to wind up the film 24. The packaging device 1 can exert a strong tension on the film 24 by winding up the film 24. As a result, the packaging device 1 can strongly and firmly attach the film 24 to the object 3. It is therefore possible for the packaging device 1 to appropriately package the base 2 and the object 3 with the film 24.

Particularly, in the present embodiment, the packaging device 1 winds up the film 24 at a time before the downward movement of the guide roller 31 is started at Step S53, and after the conveyance of the base 2 toward the downstream side is started at Step S25 and then is completed at Step S26. In this case, the packaging device 1 can firmly attach the film 24 to the downstream section and the upper section of the object 3. Therefore, the packaging device 1 can appropriately package a large area of the object 3 with the film 24.

The packaging device 1 can easily wind up the film 24 by coupling the first transmission mechanism 67 and the second transmission mechanism 68 of the winding mechanism 65 and transmitting the rotational driving force of the motor 227 to the film gear 26A. Further, the packaging device 1 can allow the film gear 26A to rotate freely by disconnecting the first transmission mechanism 67 and the second transmission mechanism 68 of the winding mechanism 65. Therefore, depending on the process of the packaging operation, the packaging device 1 can appropriately adjust the tension that is exerted on the film 24 when the base 2 and the object 3 are packaged with the film 24. Thus, the packaging device 1 can appropriately package the base 2 and the object 3 with the film 24.

In response to the input operation performed by the user, the packaging device 1 can change the torque of the motor 227 with which the motor 227 is driven to rotate in the forward direction and the film 24 is wound up at Step S51 (Step S9, Step S11). In this case, the packaging device 1 can change the tension exerted on the film 24 in accordance with the command of the user, by changing the force used to wind up the film 24. Therefore, the packaging device 1 can appropriately package the base 2 and the object 3, which are made of different materials, with the film 24 by adjusting the tension of the film 24 depending on the base 2 and the object 3. For example, the packaging device 1 can reduce the torque of the motor 227 in accordance with the materials of the base 2 and the object 3, thereby reducing the tension of the film 24. Thus, the packaging device 1 can inhibit the base 2 and the object 3 from being deformed when they are packaged.

Figure 40:
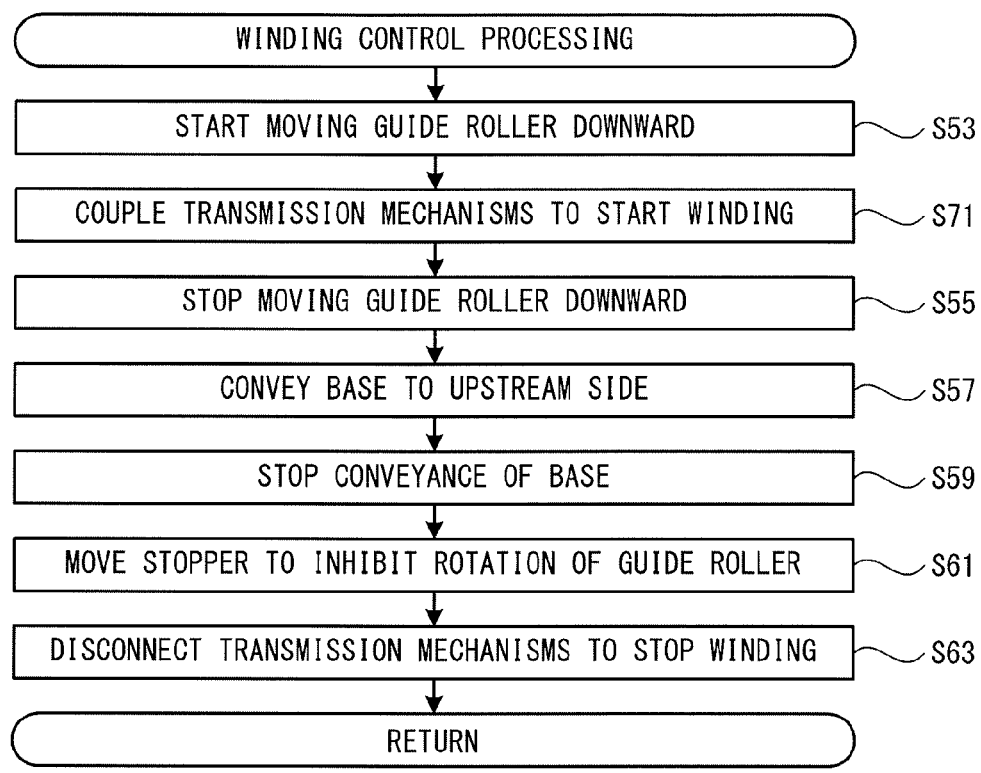
FIG. 40 is a flowchart of winding control processing according to a first modified example.
Figure 41:
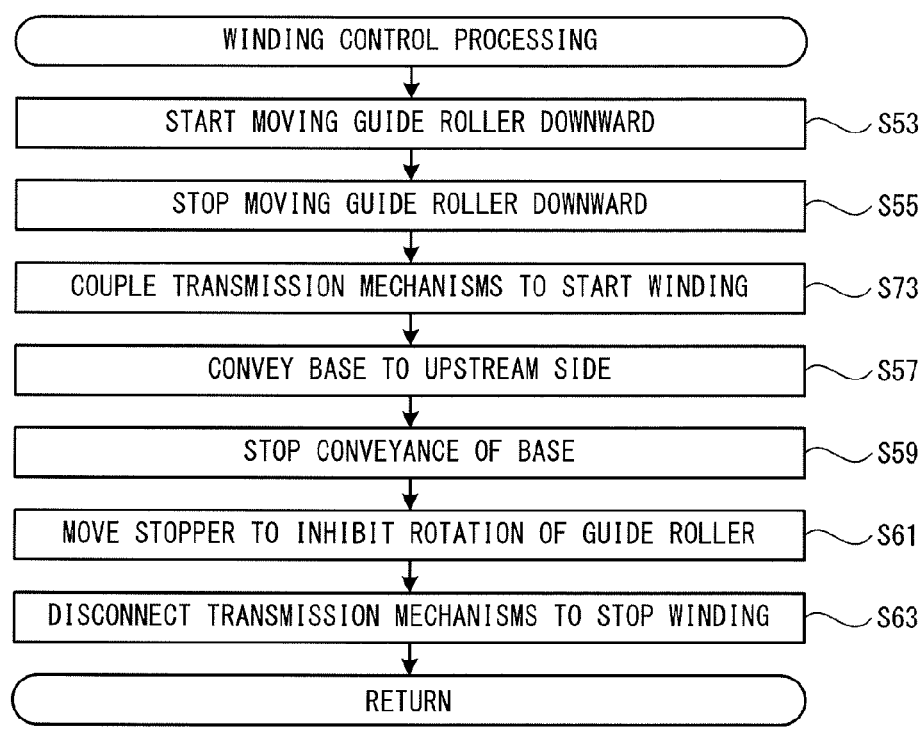
FIG. 41 is a flowchart of winding control processing according to a second modified example.
Figure 42:
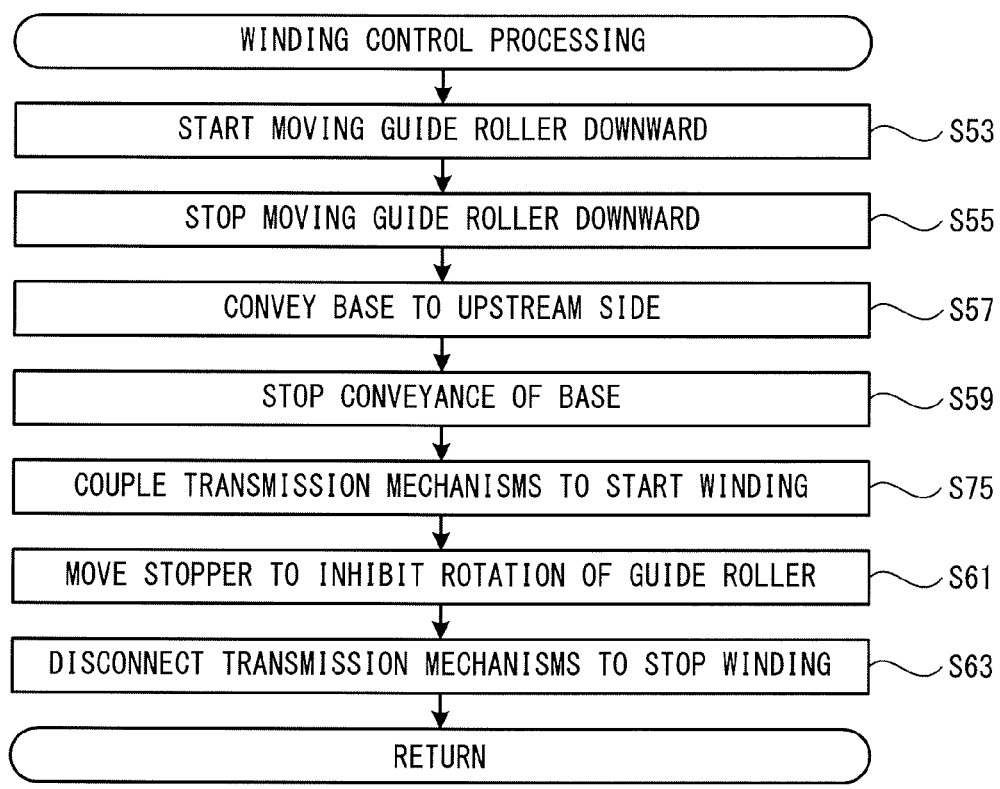
FIG. 42 is a flowchart of winding control processing according to a third modified example.

Modified examples of the above-described first embodiment will be explained with reference to FIG. 40 to FIG. 42. In the modified examples, at Step S32 of the packaging processing (refer to FIG. 27), the CPU 201 performs winding control processing shown in FIG. 40, FIG. 41 and FIG. 42, respectively, in place of the processing shown in FIG. 28. A point of difference in the winding control processing shown in FIG. 40, FIG. 41 and FIG. 42 from the winding control processing shown in FIG. 28 is the time at which the film 24 is wound up by the winding mechanism 65. In FIG. 40, FIG. 41 and FIG. 42 and the explanation below, the same step numbers are assigned to steps of the same processing content as that of the winding control processing (refer to FIG. 28) of the first embodiment.

The winding control processing according to a first modified example will be explained with reference to FIG. 40. The CPU 201 drives the motor 221 by controlling the drive portion 211, thus causing the support portions 34 to move downward. The guide roller 31 starts to move from its highest position to its lowest position along the movement path 104 (Step S53). The CPU 201 drives the motor 227 to rotate in the forward direction by controlling the drive portion 217 while the guide roller 31 is moving, and couples the first transmission mechanism 67 and the second transmission mechanism 68 of the winding mechanism 65 (Step S71). The CPU 201 further drives the motor 227 to rotate in the forward direction. The film gear 26A attempts to rotate in the direction in which the film 24 fed out from the film roll 22 is wound up (Step S71). A force in a direction opposite to the rotation direction when the film 24 is fed out is exerted on the film roll 22. As a result, a strong tension is exerted on the film 24. The film 24 is pressed against the object 3 by the strong tension and is firmly attached to the upper side of the object 3. After Step S71, processing from Step S55 to Step S63 is the same as that in the winding control processing shown in FIG. 28. Therefore, an explanation thereof is thus omitted here.

As explained above, in the first modified example, the packaging device 1 winds up the film 24 by using the winding mechanism 65 while the guide roller 31 is moving. As a result, the force in the direction opposite to the rotation direction when the film 24 is fed out is exerted on the film gear 26A, and a strong force is exerted on the film 24. Thus, the packaging device 1 can appropriately and firmly attach the film 24 to the upstream section of the object 3, in particular. Therefore, the packaging device 1 can reliably package a particular section (the upstream section) of the object 3 with the film 24. Further, the time at which the film 24 is wound up is delayed in comparison to the case of the above-described first embodiment. It is thus possible for the packaging device 1 to inhibit the strong tension exerted on the film 24 from applying a force to the downstream end portions of the base 2 and the object 3, in particular. Thus, the packaging device 1 can appropriately inhibit the conveyance of the base 2 and the object 3 from being obstructed by the film 24. The packaging device 1 can appropriately inhibit the base 2 and the object 3 from being deformed by the film 24.

Winding control processing according to a second modified example will be explained with reference to FIG. 41. The CPU 201 drives the motor 221 by controlling the drive portion 211, thus causing the support portions 34 to move downward. The guide roller 31 starts to move from its highest position to its lowest position along the movement path 104 (Step S53). When the guide roller 31 has moved to its lowest position, the CPU 201 stops the driving of the motor 221, thus stopping the downward movement of the guide roller 31 (Step S55). The CPU 201 drives the motor 227 to rotate in the forward direction by controlling the drive portion 217, and couples the first transmission mechanism 67 and the second transmission mechanism 68 of the winding mechanism 65 (Step S73). The CPU 201 further drives the motor 227 to rotate in the forward direction. The film gear 26A rotates in the direction to wind up the film 24 fed out from the film roll 22 (Step S73). The film roll 22 winds up the film 24. A strong tension is exerted on the film 24 as a result of the film 24 being wound up. The film 24 is pressed against the object 3 by the strong tension and is firmly attached to the upper side of the object 3. After Step S73, processing from Step S57 to Step S63 is the same as that in the winding control processing shown in FIG. 28. Therefore, an explanation thereof is thus omitted here.

As explained above, in the second modified example, the packaging device 1 winds up the film 24 by using the winding mechanism 65 after the guide roller 31 has moved. Thus, the packaging device 1 can appropriately and firmly attach the film 24 to the upstream section of the object 3, in particular. Therefore, the packaging device 1 can reliably package the particular section (the upstream section) of the object 3 with the film 24. Further, the time at which the film 24 is wound up is delayed in comparison to the case of the above-described first modified example. It is thus possible for the packaging device 1 to further inhibit the strong tension exerted on the film 24 from applying a force to the downstream end portions of the base 2 and the object 3. Thus, the packaging device 1 can more appropriately inhibit the conveyance of the base 2 and the object 3 from being obstructed by the film 24. The packaging device 1 can more appropriately inhibit the base 2 and the object 3 from being deformed by the film 24. Further, the packaging device 1 can inhibit a strong tension from being exerted on the film 24 while the support portions 34 are moved downward by the motor 221. As a result of this, the packaging device 1 can reduce the torque of the motor 221 that is necessary to move the support portions 34 downward. Thus, the packaging device 1 can smoothly move the support portions 34. It is therefore possible for the packaging device 1 to more appropriately package the base 2 and the object 3 with the film 24.

Winding control processing according to a third modified example will be explained with reference to FIG. 42. The CPU 201 drives the motor 221 by controlling the drive portion 211, thus causing the guide roller 31 to move from its highest position to its lowest position along the movement path 104 (Step S53, Step S55). The CPU 201 drives the motor 222 by controlling the drive portion 212, thus causing the belts 51 to rotate in the reverse direction. The conveyance portions 60 move from the downstream side toward the upstream side and convey the base 2 toward the upstream side along the conveyance path 103 (Step S57). When the side 902 of the first plate-shaped portion 905 of the base 2 has been moved farther toward the upstream side than the position above the heating portion 86 by a specified distance, the CPU 201 stops the driving of the motor 222 by controlling the drive portion 212, thus stopping the conveyance of the base 2 (Step S59). The CPU 201 drives the motor 227 to rotate in the forward direction by controlling the drive portion 217, and couples the first transmission mechanism 67 and the second transmission mechanism 68 of the winding mechanism 65 (Step S75). The CPU 201 further drives the motor 227 to rotate in the forward direction. The film gear 26A rotates in the direction to wind up the film 24 fed out from the film roll 22 (Step S75). The film roll 22 winds up the film 24. A strong tension is exerted on the film 24 as a result of the film 24 being wound up. The film 24 is pressed against the object 3 by the strong tension and is firmly attached to the upstream side of the object 3. After Step S75, processing at Step S61 and Step S63 is the same as that in the winding control processing shown in FIG. 28. Therefore, an explanation thereof is thus omitted here.

As explained above, in the third modified example, the packaging device 1 winds up the film 24 by using the winding mechanism 65 after the base 2 and the object 3 have been moved toward the upstream side by the conveyance portions 60. Thus, the packaging device 1 can appropriately and firmly attach the film 24 to the upstream section of the object 3, in particular. Therefore, the packaging device 1 can reliably package the particular section (the upstream section) of the object 3 with the film 24. Further, the time at which the film 24 is wound up is delayed in comparison to the case of the above-described second modified example. It is thus possible to further inhibit the strong tension exerted on the film 24 from applying a force to the downstream end portions of the base 2 and the object 3. Thus, the packaging device 1 can more appropriately inhibit the conveyance of the base 2 and the object 3 from being obstructed by the film 24. The packaging device 1 can more appropriately inhibit the base 2 and the object 3 from being deformed by the film 24. Further, the packaging device 1 can inhibit a strong tension from being exerted on the film 24 while the belts 51 are rotated in the reverse direction by the motor 222. It is therefore possible to reduce the torque of the motor 222 that is necessary to convey the base 2 and the object 3 toward the upstream side. Thus, the packaging device 1 can smoothly convey the base 2 and the object 3 toward the upstream side. It is therefore possible for the packaging device 1 to more appropriately package the base 2 and the object 3 with the film 24.

In addition to the first to third modified examples, various modifications can be made to the above-described first embodiment. The time at which the CPU 201 of the packaging device 1 drives the motor 227 to rotate in the forward direction by controlling the drive portion 217 and winds up the film 24 by coupling the first transmission mechanism 67 and the second transmission mechanism 68 of the winding mechanism 65 can be changed to any time during the period from Step S19 to Step S39. For example, the CPU 201 may wind up the film 24 by coupling the first transmission mechanism 67 and the second transmission mechanism 68 of the winding mechanism 65 at any time during the period from when the film 24 is bonded to the downstream end portion of the base 2 at Step S19 to when the conveyance of the base 2 and the object 3 toward the downstream side is started at Step S25. Further, the CPU 201 may wind up the film 24 by coupling the first transmission mechanism 67 and the second transmission mechanism 68 of the winding mechanism 65 at any time during the period from when the conveyance of the base 2 and the object 3 toward the downstream side is started at Step S25 to when the conveyance of the base 2 and the object 3 toward the downstream side is completed at Step S26. In this case, it is possible to firmly attach the film 24 to the downstream section of the object 3. Therefore, the packaging device 1 can reliably package a particular section (the downstream section) of the object 3 with the film 24.

In the first modified example, the time at which the CPU 201 of the packaging device 1 performs the processing of Step S71 may be a time immediately after the guide roller 31 has started the downward movement from its highest position, or may be a time immediately before the guide roller 31 has reached its lowest position. Further, the time at which the CPU 201 performs the processing of Step S71 may be a time at which the guide roller 31 has moved to an intermediate position between its highest position and its lowest position.

The CPU 201 of the packaging device 1 may drive the motor 227 to rotate in the forward direction by controlling the drive portion 217 and may wind up the film 24 by coupling the first transmission mechanism 67 and the second transmission mechanism 68 of the winding mechanism 65 at any time during the period from when the conveyance of the base 2 and the object 3 toward the upstream side is started at Step S57 to when the conveyance of the base 2 and the object 3 is stopped at Step S59.

The rotating shaft of the motor 227 and the gear 661 may be in firm contact with each other such that a large frictional force is generated when the motor 227 rotates. When the tension that is exerted on the film 24 is less than a certain level, the gear 661 may rotate in the forward direction when the motor 227 is driven to rotate in the forward direction. On the other hand, when the tension that is exerted on the film 24 is equal to or more than the certain level, the gear 661 may idle with respect to the rotating shaft of the motor 227. Thus, the packaging device 1 can exert a certain level of tension on the film 24 by using the winding mechanism 65.

The packaging device 1 may include a mechanism that is configured to change the distance between the shaft 26 of the film roll 22 and the conveyance path 103. The packaging device 1 may move the film 24 in the direction opposite to the direction in which the film 24 is fed out at a time of packaging, by moving the film roll 22 in the direction in which the shaft 26 moves away from the conveyance path 103.

An adhesive may be applied in advance to the downstream side and the upstream side of the lower surface of the first plate-shaped portion 905 of the base 2. The film 24 may be bonded to the base 2 using the adhesive.

Figure 43:
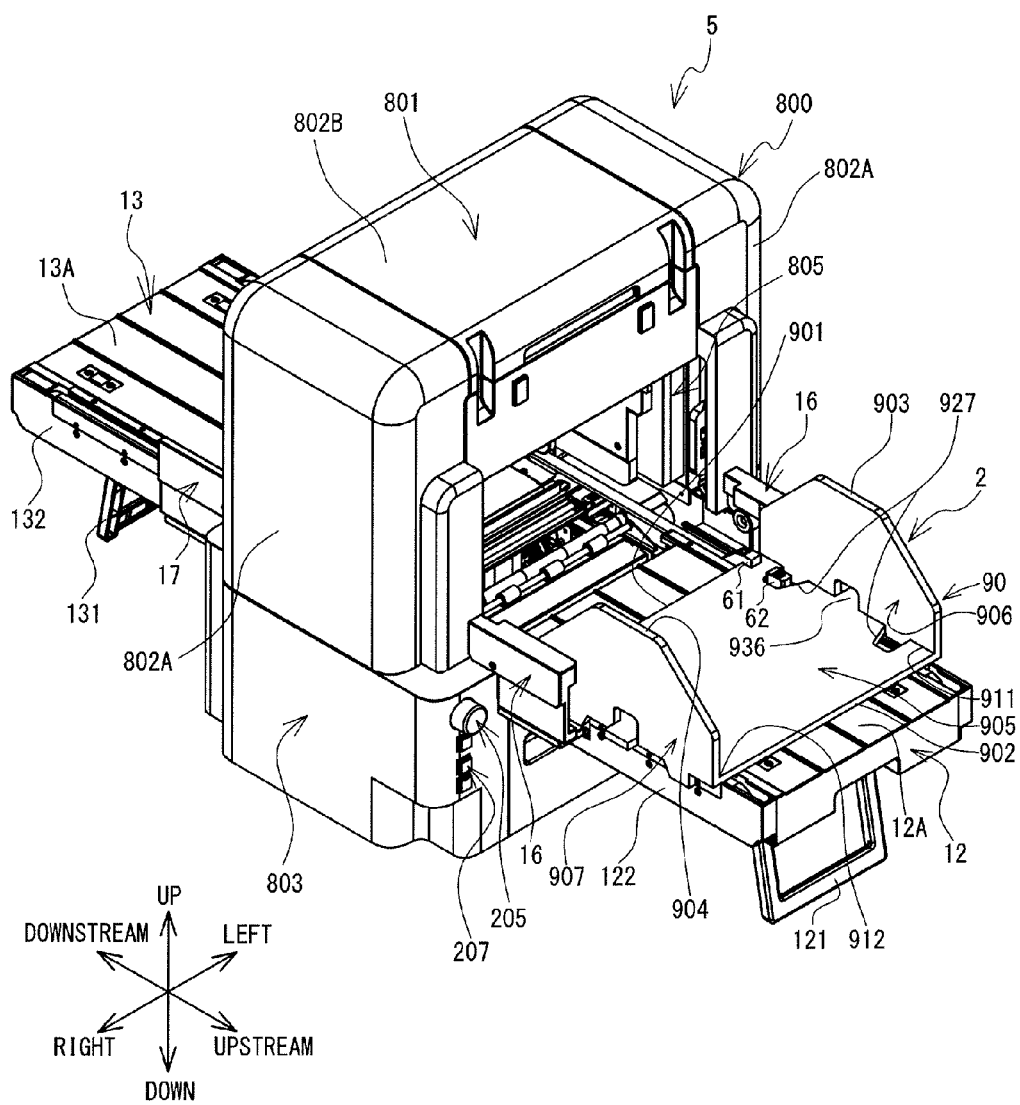
FIG. 43 is a perspective view of a packaging device 5 (in a state in which the housing 800 has been mounted) according to a second embodiment.

Hereinafter, a packaging device 5 according to a second embodiment will be explained with reference to FIG. 43 to FIG. 58. Most of structural members of the packaging device 5 according to the second embodiment are the same as those of the packaging device 1 according to the first embodiment. Accordingly, in the following explanation and the drawings that are referred to, structural members that are the same as those of the packaging device 1 are denoted by the same reference numerals and the explanation relating to the same structural members is omitted or simplified. Structural members that are different from those of the packaging device 1 will be mainly explained. Similarly to the packaging device 1 (refer to FIG. 1) of the first embodiment, the upper side, the lower side, the lower left side and the upper right side of FIG. 43 are respectively referred to as the upper side, the lower side, the right side and the left side of the packaging device 5. The lower right side and the upper left side of FIG. 43 are respectively referred to as the upstream side and the downstream side in the conveyance direction.

As shown in FIG. 43, the packaging device 5 includes the housing 800, the receiving trays 12 and 13, and the guide portions 16 and 17, in the same manner as in the packaging device 1. However, in the present embodiment, the input portion 205 and LEDs 207 are provided on the upstream surface of the lower housing 803. The input portion 205 is an input button by which the user can perform an input operation with respect to the packaging device 1. The appearance of the packaging device 5 when the housing 800 is removed is the same as the appearance of the packaging device 1 shown in FIG. 3. Similarly to the packaging device 1, the packaging device 5 includes the bottom portion 10, the side plate portions 111 and 112, the conveyance mechanism 50, the conveyance portions 60 and the like (refer to FIG. 3 and FIG. 4).

Figure 44:
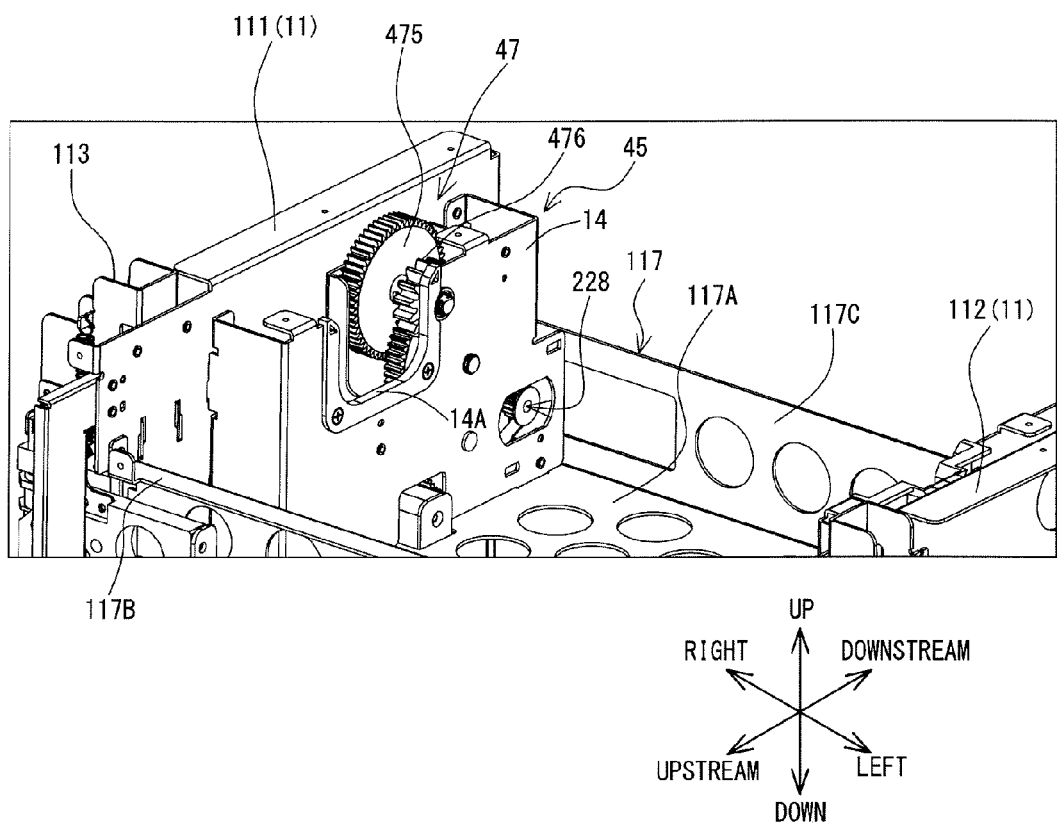
FIG. 44 is a perspective view of an area in the vicinity of the upper end of the side plate portion 11.

As shown in FIG. 44, similarly to the packaging device 1 of the first embodiment, also in the packaging device 5, the plate-shaped bridge plate 117 is mounted between the upper end portion of the side plate portion 111 and the upper end portion of the side plate portion 112. The bridge plate 117 includes the horizontal portion 117A that extends horizontally, the vertical portion 117B that extends upward in the vertical direction from the upstream edge of the horizontal portion 117A, and the vertical portion 117C that extends upward in the vertical direction from the downstream edge of the horizontal portion 117A. The film cassette 21 (refer to FIG. 3) may be placed on the horizontal portion 117A and thus the film cassette 21 may be mounted in the packaging device 5. Hereinafter, the state in which the film cassette 21 is mounted in the packaging device 5 is used as an example, and the directions of the packaging device 5 (the upper side, the lower side, the right side, the left side, the upstream side and the downstream side) also apply to the film cassette 21 and the film roll 22. The structure of the film cassette 21 of the present embodiment is basically the same as that of the first embodiment. The film cassette 21 contains therein the film roll 22 that has the core 26 (the shaft 26) (refer to FIG. 45) around which the film 24 is wound.

Figure 45:
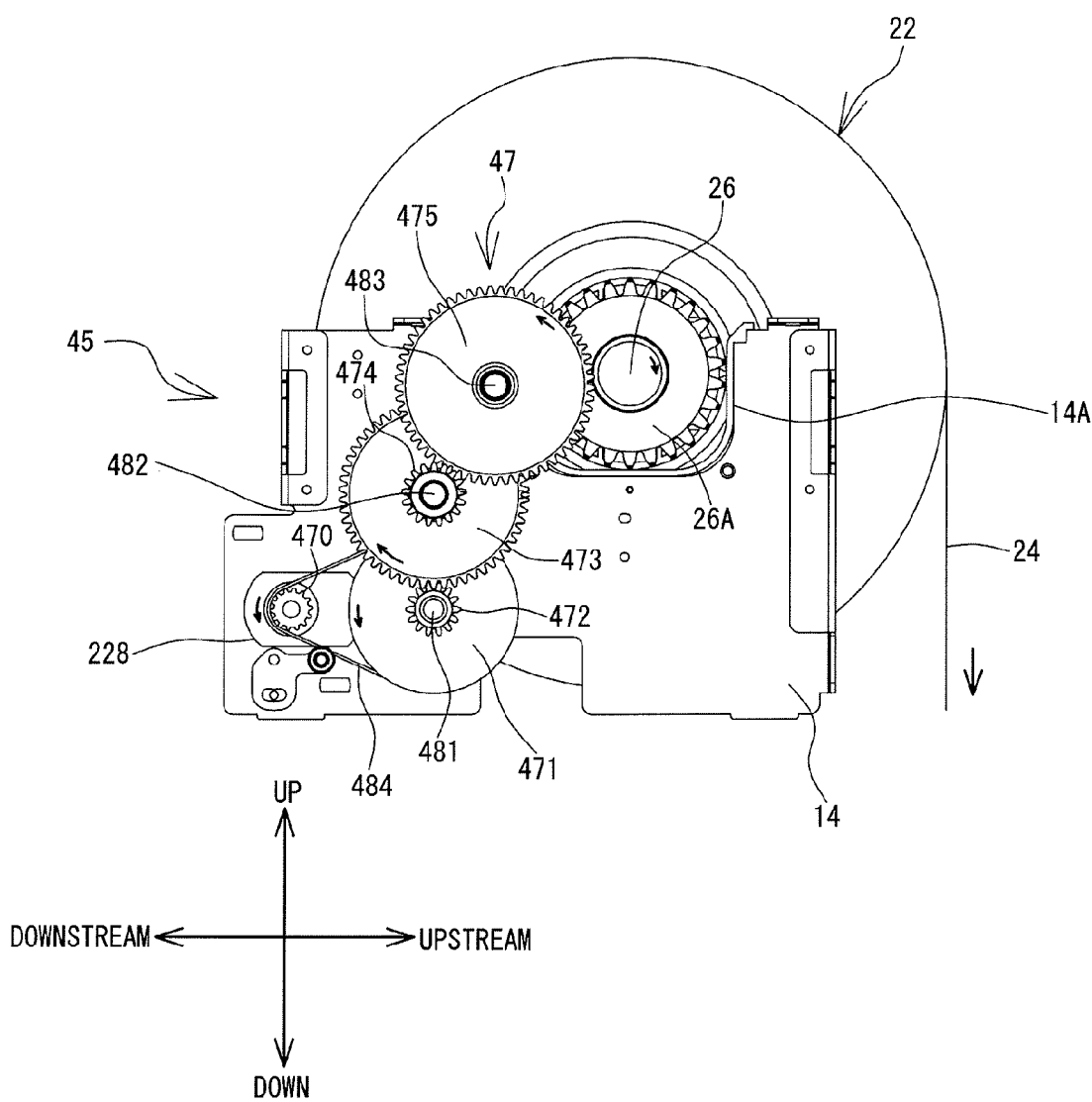
FIG. 45 is a right side view of a rotation mechanism 45.

A rotation mechanism 45 of the present embodiment will be explained. As shown in FIG. 45, the film gear 26A that protrudes to the right is provided on the right end of the core 26 (the shaft 26) of the film roll 22. The rotating shaft of the film gear 26A extends along the axial line of the core 26 (the shaft 26) of the film roll 22. The film gear 26A protrudes to the right from a right side wall portion of the film cassette 21 (refer to FIG. 3). When the film cassette 21 is mounted in the packaging device 5, the film gear 26A enters into the recessed portion 14A of the wall plate 14 (refer to FIG. 44) that will be described later.

As shown in FIG. 44, the rotation mechanism 45 is provided above the horizontal portion 117A and on the left side surface of the side plate portion 111. The rotation mechanism 45 is a mechanism that is configured to take up the film 24 (refer to FIG. 45) into the film cassette 21 and to feed the film 24 to the outside of the film cassette 21. The rotation mechanism 45 includes a motor 228 and a transmission mechanism 47. The transmission mechanism 47 of the rotation mechanism 45 is disposed to the right of the film cassette 21 that is mounted in the packaging device 5. The wall plate 14 that covers the upstream side, the downstream side and the left side of the transmission mechanism 47 is provided on the upper side of the horizontal portion 117A. The recessed portion 14A that is recessed downward is provided in the upper edge of a section of the wall plate 14 that covers the left side of the transmission mechanism 47. The rotation mechanism 45 is configured to transmit the rotational driving force of the motor 228 to the film gear 26A (refer to FIG. 45) via the transmission mechanism 47, thus causing the film roll 22 (refer to FIG. 45) to rotate. The wall plate 14 supports the motor 228 and the transmission mechanism 47.

As shown in FIG. 45, the transmission mechanism 47 includes gears 470 to 476. The gears 470 to 476 are spur gears. The gear 470 is fixed to the right end of the rotating shaft that extends horizontally to the right from the motor 228. A belt 484 is routed around the gears 470 and 471. The gears 471 and 472 are fixed to a common rotating shaft 481 and can rotate around the rotating shaft 481. The diameter of the gear 472 is approximately one fourth of the diameter of the gear 471. The gears 473 and 474 are fixed to a common rotating shaft 482 and can rotate around the rotating shaft 482. The diameter of the gear 474 is approximately one fourth of the diameter of the gear 473. The gears 475 and 476 (refer to FIG. 44) are fixed to a common rotating shaft 483 and can rotate around the rotating shaft 483. The diameter of the gear 476 is approximately one fourth of the diameter of the gear 475. The rotating shafts 481 to 483 extend in the left-right direction and are rotatably supported by the wall plate 14 (refer to FIG. 44). The gears 472 and 473 mesh with each other. The gears 474 and 475 mesh with each other. When the film cassette 21 is mounted in the packaging device 5, the gear 476 meshes with the film gear 26A of the film roll 22. The gears 470 to 476 and the film gear 26A rotate in accordance with the rotation of the motor 228.

When the film 24 is fed to the outside of the film cassette 21, the motor 228 rotates counterclockwise (in the arrow direction in FIG. 45) when the rotation mechanism 45 is viewed from the right side surface side. On the other hand, when the film 24 is taken up into the film cassette 21, the motor 228 rotates clockwise when the rotation mechanism 45 is viewed from the right side surface side. Hereinafter, causing the motor 228 to rotate clockwise (in the direction in which the film 24 is taken up) when the rotation mechanism 45 is viewed from the right side surface side is referred to as "causing the motor 228 to rotate in a take-up direction". The rotation direction of the film roll 22 when the motor 228 rotates in the take-up direction is referred to as a first direction. Causing the motor 228 to rotate counterclockwise (in the direction in which the film 24 is fed out) when the rotation mechanism 45 is viewed from the right side surface side is referred to as "causing the motor 228 to rotate in a feeding direction". The rotation direction of the film roll 22 when the motor 228 rotates in the feeding direction is referred to as a second direction. Note that a drive portion 218 (refer to FIG. 46) that is configured to drive the motor 228 can switch the rotation direction of the motor 228 by reversing the polarity of a pulse signal that is output to the motor 228.

Figure 51:
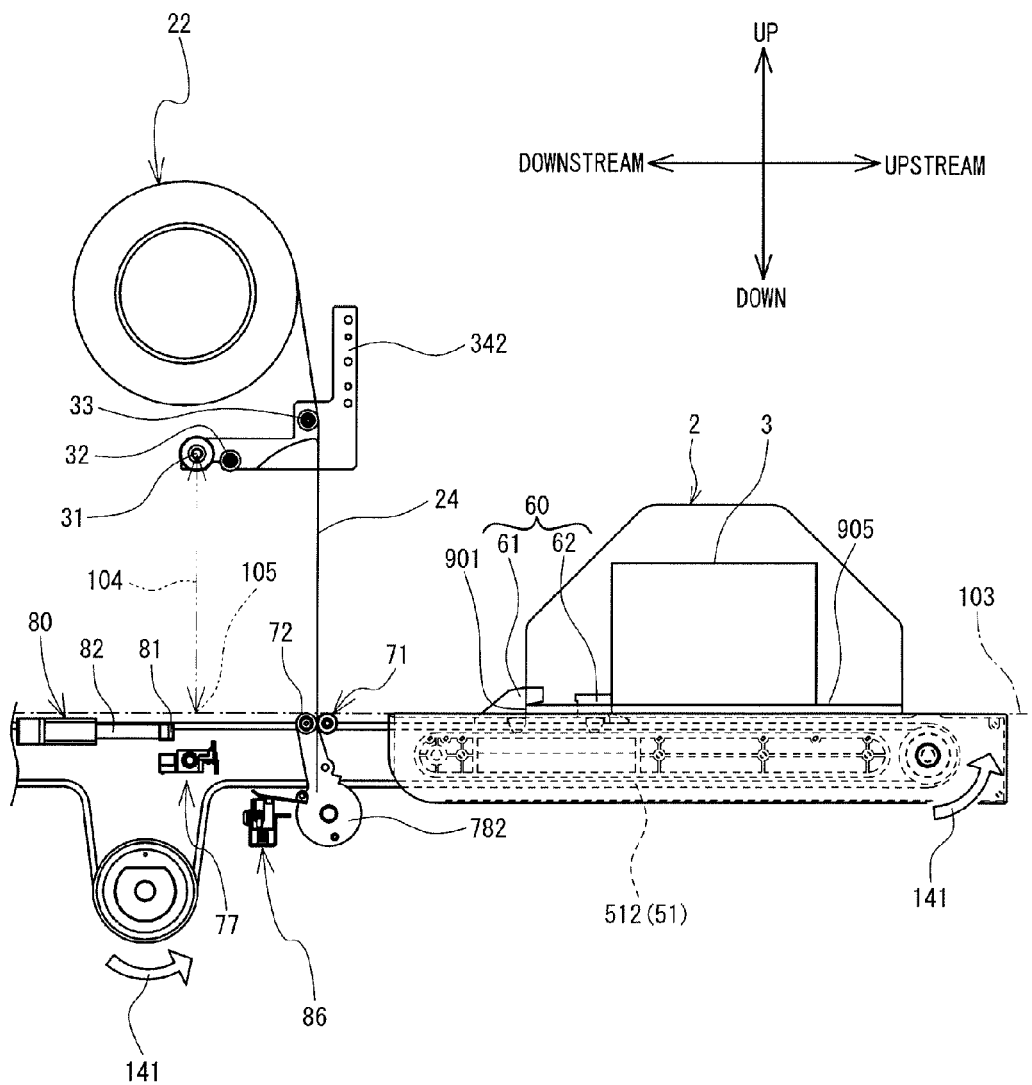
FIG. 51 is a figure that shows a packaging step in the packaging processing.
Figure 54:
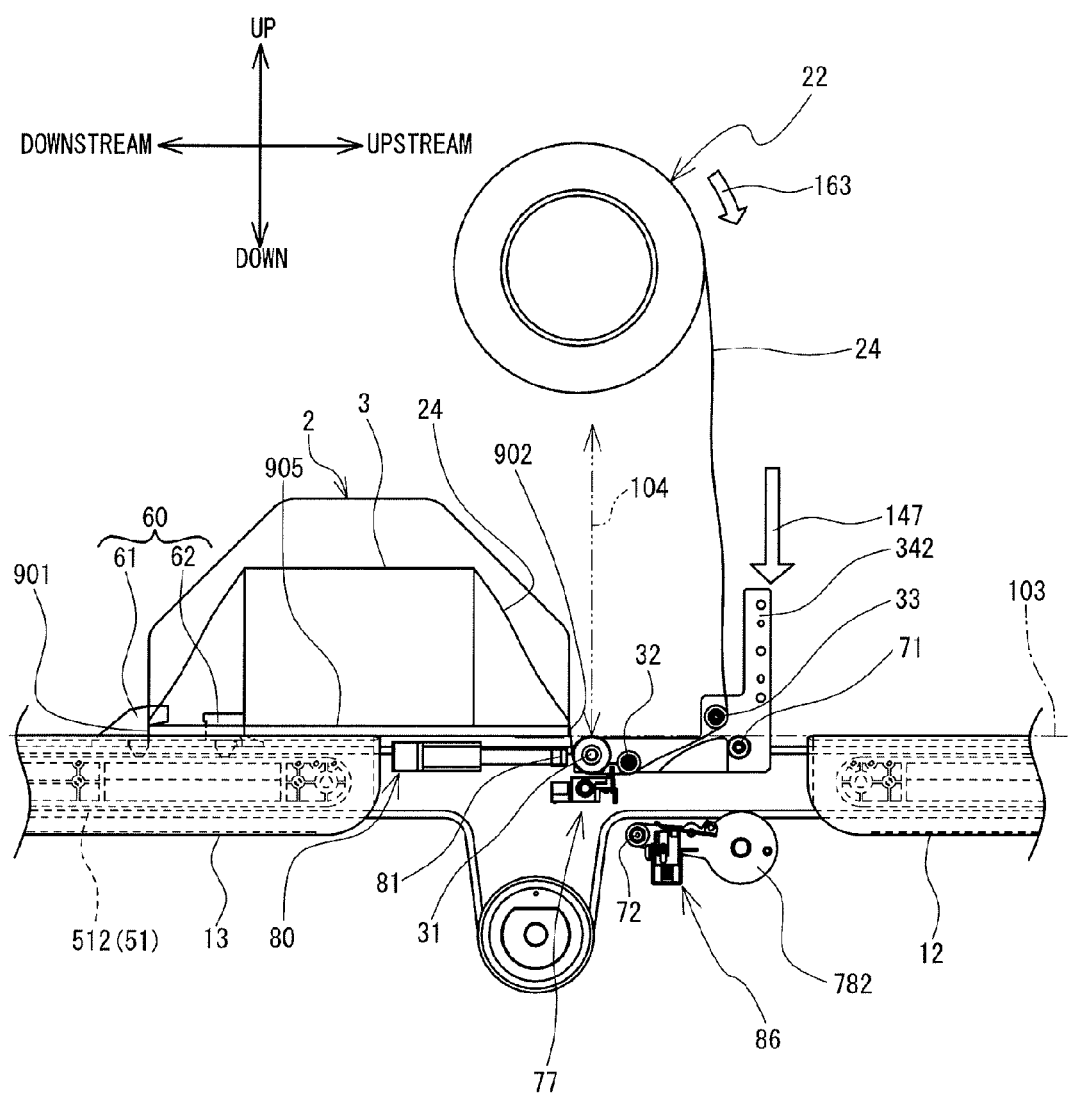
FIG. 54 is a figure that shows a packaging step in the packaging processing.

Similarly to the packaging device 1 of the first embodiment, the packaging device 5 includes the movable rollers 30 (refer to FIG. 3 and FIG. 15) that are supported by the support portions 34 that is movable in the up-down direction. Note that FIG. 51 shows a state in which the support portions 34 are located at their highest positions. FIG. 54 shows a state in which the support portions 34 are located at their lowest positions. Also in the present embodiment, the path along which the guide roller 31 is moved up and down along with the movement of the support portions 34 is the movement path 104, in the same manner as in the first embodiment. Further, similarly to the packaging device 1 of the first embodiment, the packaging device 5 includes the cutting portion 77, the base guide roller 71, the holding roller 72, the heating portion 86 and the rotation inhibiting portion 80 (refer to FIG. 18 and FIG. 21). Further, the structure and the usage mode of the base 2 on which may be placed the object 3 to be packaged by the packaging device 5 is the same as explained in the first embodiment (refer to FIG. 43).

Figure 46:
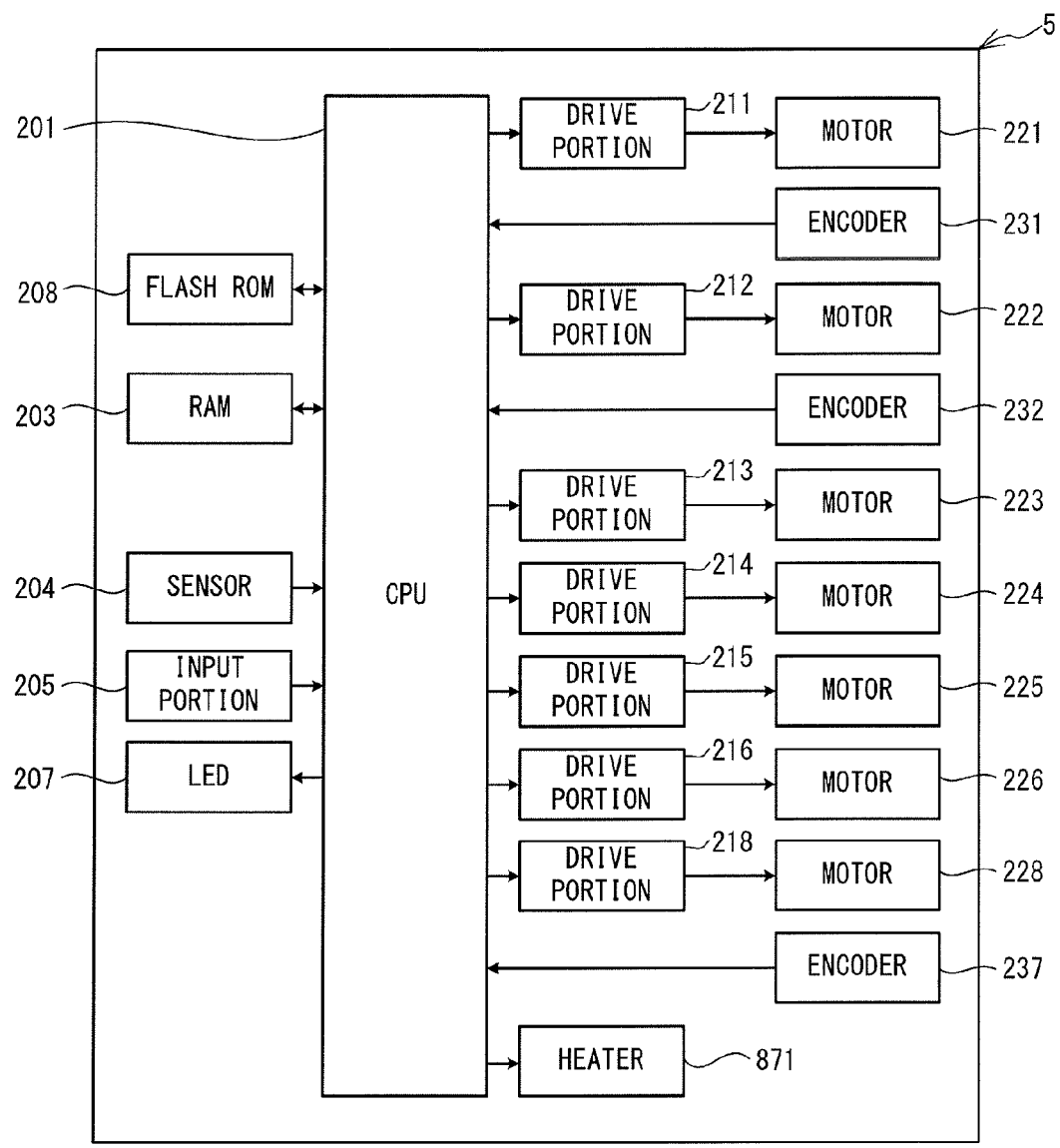
FIG. 46 is a block diagram that shows an electrical configuration of the packaging device 5.

An electrical configuration of the packaging device 5 will be explained with reference to FIG. 46. The packaging device 5 includes the CPU 201, a flash ROM 208, the RAM 203, the sensor 204, the input portion 205, the LEDs 207 and the heaters 871. The CPU 201 is configured to perform overall control of the packaging device 5. The CPU 201 is configured to perform the processing that packages, with the film 24, the object 3 that is placed on the base 2, by executing a program that is stored in the flash ROM 208. The flash ROM 208 is configured to store programs for packaging processing (refer to FIG. 48) and rotation control processing (refer to FIG. 49) that may be executed by the CPU 201. The flash ROM 208 is also configured to store a parameter table 2021 (refer to FIG. 47) that will be described later. The flash ROM 208 is further configured to store a total number of rotations of the motor 228 in the feeding direction (hereinafter referred to as the total number of feeding rotations) and a total number of rotations of the motor 228 in the take-up direction (hereinafter referred to as the total number of take-up rotations). The flash ROM 208 is further configured to store a setting value of the tension of the film 24. Hereinafter, the setting value of the tension of the film 24 stored in the flash ROM 208 is referred to as the tension setting value. The tension setting value may be stored in the flash ROM 208 when the CPU 201 detects an input operation for the tension performed by the user via the input portion 205.

The packaging device 5 includes the drive portions 211 to 216 and 218, the motors 221 to 226 and 228, and encoders 231, 232 and 237. The drive portions 211 to 216 and 218 are configured to output pulse signals to the motors 221 to 226 and 228, respectively, thus driving the motors 221 to 226 and 228. The motors 221 to 226 and 228 are DC motors. The encoders 231, 232 and 237 are each configured to output pulse signals of a number, which corresponds to the rotation of the corresponding one of the motors 221, 222 and 228. The CPU 201 is electrically connected to the flash ROM 208, the RAM 203, the sensor 204, the input portion 205, the LEDs 207, the heaters 871, the drive portions 211 to 216 and 218, and the encoders 231, 232 and 237. The drive portions 211 to 216 and 218 are electrically connected to the motors 221 to 226 and 228, respectively.

The parameter table 2021 will be explained with reference to FIG. 47. In the parameter table 2021, the tension, the radius of the film roll 22 and a first duty ratio and a second duty ratio are associated with each other. The second duty ratio indicates a duty ratio of a pulse signal to be output from the drive portion 218 to the motor 228 when the CPU 201 causes the motor 228 to rotate in the take-up direction with a torque that is necessary to exert a corresponding tension on the film 24. The first duty ratio indicates a duty ratio of a pulse signal to be output from the drive portion 218 to the motor 228 when the CPU 201 causes the motor 228 to rotate in the take-up direction at a rotation speed V1 that is faster than a rotation speed V2. The rotation speed V2 is a rotation speed of the motor 228 when the motor 228 rotates in the take-up direction based on the pulse signal of the second duty ratio. The reason why the first duty ratio and the second duty ratio vary depending on the radius of the film roll 22 is that, when the radius of the film roll 22 is different, the torque exerted on the surface of the film roll 22 varies depending on the radius of the film roll 22 even when the motor 228 rotates under the same conditions. In order to exert a specified tension on the film 24, it is necessary to vary the force that causes the motor 228 to rotate, depending on the radius of the film roll 22. For that reason, in the parameter table 2021, the duty ratios that correspond to the radius of the film roll 22 are respectively associated with each other. The CPU 201 is configured to refer to the parameter table 2021 and adjust the rotation condition of the motor 228 such that a desired tension is constantly exerted on the film 24 even when the radius of the film roll 22 is different or even when the radius of the film roll 22 changes due to the consumption of the film 24 as a result of the packaging processing being repeated.

Since the speed V1 is larger than the speed V2, when comparing the first duty ratio and the second duty ratio that are associated with the same tension and the same radius of the film roll 22, the first duty ratio is always larger than the second duty ratio. The torque of the motor 228 that is rotated by the pulse signals of the first duty ratio is larger than the torque of the motor 228 that is rotated by the pulse signals of the associated second duty ratio. The parameter table 2021 may be referred to by the CPU 201 when the duty ratio of the pulse signal is determined in order to rotate the motor 228 in the take-up direction. The details will be described later.

The packaging processing (refer to FIG. 48) and the rotation control processing (refer to FIG. 49) that may be performed by the CPU 201 of the packaging device 5, and packaging steps that may be performed by the packaging device 5 will be explained with reference to FIG. 48 to FIG. 58. When the power source of the packaging device 5 is turned on, the CPU 201 starts the packaging processing by reading and executing the program stored in the flash ROM 208. The rotation control processing is started by processing at Step S35 of the packaging processing. Note that FIG. 51 to FIG. 58 each show a cross-sectional view taken in the direction of the arrows on the line A-A shown in FIG. 3 when the packaging device 1 is replaced with the packaging device 5.

The packaging processing will be explained with reference to FIG. 48. The CPU 201 initializes the state of the packaging device 5 (Step S101). Specifically, the CPU 201 performs the following processing. The CPU 201 drives the motor 221 by controlling the drive portion 211, thus causing the support portions 34 to move upward and be positioned at their highest positions. That causes the movable rollers 30 supported by the support portions 34 to be positioned at their highest positions (refer to FIG. 51). The CPU 201 drives the motor 222 by controlling the drive portion 212, thus causing the belts 51 (refer to FIG. 4) of the conveyance mechanism 50 to rotate. When the sensor 204 (refer to FIG. 46) detects the reflecting plate, the CPU 201 stops the driving of the motor 222 by controlling the drive portion 212. That places the conveyance portions 60 into a state in which they protrude upward higher than the receiving surface 12A (refer to FIG. 4) of the receiving tray 12 (refer to FIG. 51). The packaging device 5 is put into a state in which the user can set the base 2 on the receiving surface 12A of the receiving tray 12. The CPU 201 drives the motor 223 by controlling the drive portion 213, thus moving the heating portion 86 downward such that the heating portion 86 is positioned at its lowest position. That puts the heaters 871 at the top of the heating portion 86 into a state in which they are separated from the conveyance path 103 (refer to FIG. 51). The CPU 201 drives the motor 224 by controlling the drive portion 214, thus moving the stopper 81 toward the downstream side (refer to FIG. 51). The CPU 201 drives the motor 225 by controlling the drive portion 215, thus moving the cutting portion 77 to the left. The CPU 201 drives the motor 226 by controlling the drive portion 216, thus causing the holding portions 78 to swing. The holding roller 72 is put into a state in which it is separated from the base guide roller 71 in the downward direction (refer to FIG. 53).

When the user mounts the unused film cassette 21 and turns on the power source of the packaging device 5, the user performs an input operation via the input portion 205 in order to notify the packaging device 5 that the unused film cassette 21 is mounted. In a case where the CPU 201 detects the input operation that notifies the packaging device 5 that the unused film cassette 21 is mounted, the CPU 201 performs initialization processing (Step S101) and sets zero (0) as the total number of feeding rotations and as the total number of take-up rotations that are stored in the flash ROM 208. On the other hand, in a case where the CPU 201 does not detect the input operation that notifies the packaging device 5 that the unused film cassette 21 is mounted, the CPU 201 does not set zero (0) as the total number of feeding rotations and as the total number of take-up rotations.

The CPU 201 determines whether or not a command to start the packaging is input (Step S105). In a case where the command to start the packaging is not input (NO at Step S105), the CPU 201 returns the processing to Step S105. The user manually pulls down the film 24 that is discharged from the discharge opening of the film cassette 21 mounted in the packaging device 5, through the upstream side of the second auxiliary roller 33. Since the film 24 comes into contact with the upstream side of the second auxiliary roller 33, the film 24 is guided slightly to the upstream side. The user pulls the leading end of the pulled-down film 24 until the leading end is below the conveyance path 103 and arranges the leading end on the downstream side of the base guide roller 71 (refer to FIG. 51). When the film roll 22 rotates due to the film 24 being pulled out from the film cassette 21, the motor 228 rotates in the feeding direction. The CPU 201 updates the total number of feeding rotations stored in the flash ROM 208, in response to the pulse signals that are output from the encoder 237 when the motor 228 rotates.

The user performs an input operation via the input portion 205 in order to notify the packaging device 5 that the film 24 is ready. The CPU 201 drives the motor 226 by controlling the drive portion 216, thus causing the holding portions 78 to swing. As shown in FIG. 51, due to the swing of the holding portions 78, the holding roller 72 is put into a state in which it is positioned in the vicinity of and on the downstream side of the base guide roller 71. The leading end of the film 24 that is discharged from the film cassette 21 is clamped by the base guide roller 71 and the holding roller 72 from both the upstream side and the downstream side in the conveyance direction. The film 24 and the conveyance path 103 intersect with each other in the vicinity of the leading end of the film 24. The film 24 is put into a state in which it extends straight in the up-down direction between the upstream side of the second auxiliary roller 33 and the section that is clamped by the base guide roller 71 and the holding roller 72.

The user places the base 2 on the receiving tray 12. The base 2 is positioned by the conveyance portions 60. The side 901 of the first plate-shaped portion 905 of the base 2 is positioned on the downstream side, and the side 902 is positioned on the upstream side. The object 3 is placed on the first plate-shaped portion 905 of the base 2.

The user inputs the command to start the packaging via the input portion 205. As shown in FIG. 48, in a case where the command to start the packaging is input (YES at Step S105), the CPU 201 drives the motor 222 by controlling the drive portion 212. The CPU 201 controls the drive portion 212 and thus causes the motor 222 to rotate such that the belts 51 rotate in the direction in which the base 2 is conveyed from the upstream side toward the downstream side. The belts 51 rotate in the direction (the direction of the arrow 141 in FIG. 51) in which the conveyance portions 60 that protrude upward higher than the receiving surface 12A of the receiving tray 12 move from the upstream side toward the downstream side. The conveyance portions 60 convey the base 2 along the conveyance path 103 from the upstream side toward the downstream side at a specified speed (hereinafter referred to as a conveyance speed) (Step S107). Hereinafter, the rotation direction of the motor 222 and the belts 51 when the base 2 is conveyed from the upstream side toward the downstream side is referred to as the forward direction, and the rotation direction of the motor 222 and the belts 51 that is opposite to the forward direction is referred to as the reverse direction.

The downstream edges of the base 2 and the object 3 gradually approach the film 24. The CPU 201 continues to drive the motor 222 by controlling the drive portion 212, thus causing the belts 51 to continue to rotate in the forward direction. As shown by the arrow 142 in FIG. 52, when the base 2 continues to be conveyed toward the downstream side, the downstream edge (the side 901) of the first plate-shaped portion 905 comes into contact with the film 24 and thereafter passes over the holding roller 72. The side 901 pushes the film 24 toward the downstream side. The side 901 approaches the movement path 104 from the upstream side and passes above the heating portion 86 (refer to FIG. 52). Note that the leading end of the film 24 is clamped by the base guide roller 71 and the holding roller 72. When the film 24 is pushed toward the downstream side by the side 901 of the base 2, the leading end of the film 24 is moved around to the lower surface of the first plate-shaped portion 905 of the base 2. The film 24 is fed out from the film roll 22 and the film roll 22 rotates. The motor 228 rotates in accordance with the rotation of the film roll 22. The CPU 201 updates the total number of feeding rotations stored in the flash ROM 208, in response to the pulse signals that are output from the encoder 237 when the motor 228 rotates.

Figure 52:
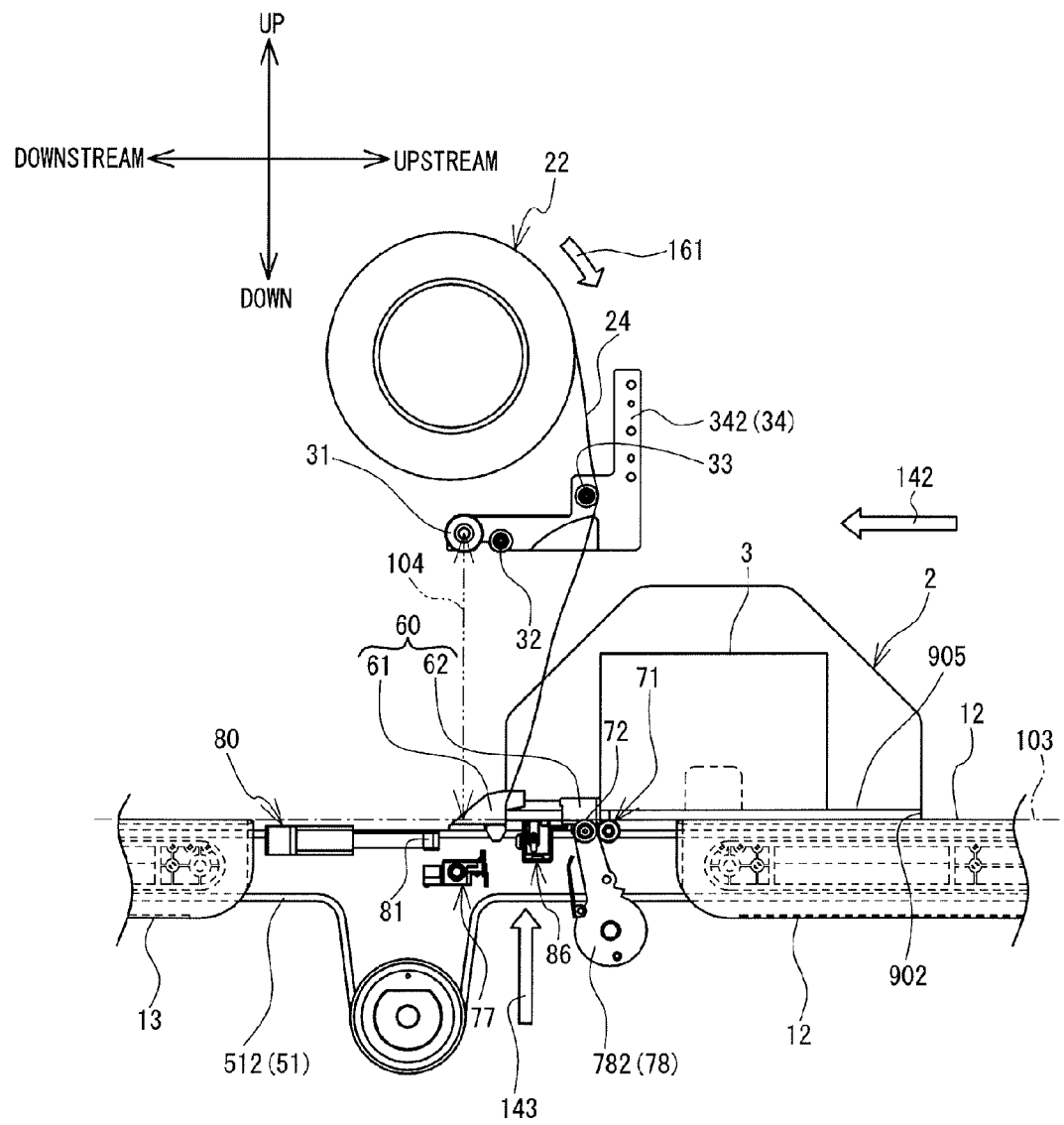
FIG. 52 is a figure that shows a packaging step in the packaging processing.

The CPU 201 identifies the number of rotations of the motor 222 from the start of the conveyance of the base 2, based on the pulse signals that are output from the encoder 232 after the conveyance of the base 2 toward the downstream side is started by the processing at Step S107. Based on the identified number of rotations of the motor 222, the CPU 201 determines whether or not the side 901 of the base 2 has been moved farther toward the downstream side than the position above the heating portion 86 by a specified distance. In a case where the CPU 201 determines that the side 901 of the base 2 has been moved farther toward the downstream side than the position above the heating portion 86 by the specified distance, the CPU 201 stops the driving of the motor 222 by controlling the drive portion 212, thus stopping the conveyance of the base 2 toward the downstream side (Step S109). The CPU 201 causes the motor 228 to rotate in the feeding direction by controlling the drive portion 218, thus causing the film roll 22 to rotate in the second direction (Step S113). Thus, the film 24 of the film roll 22 is forcibly fed out from the film cassette 21 to the outside. As shown in FIG. 52, the film 24 becomes slack when the film roll 22 rotates in the second direction (in the direction of an arrow 161). Until the rotation of the motor 228 in the feeding direction is completed by processing at Step S133 that will be described later, the CPU 201 continues to perform control such that the motor 228 is caused to rotate in the feeding direction, thus causing the film roll 22 to continue to rotate in the second direction. The CPU 201 updates the total number of feeding rotations stored in the flash ROM 208, in response to the pulse signals that are output from the encoder 237 when the motor 228 rotates.

The CPU 201 drives the motor 223 by controlling the drive portion 213, thus causing the heating portion 86 to move upward (Step S115). After the heating portion 86 is put into a state in which it is at its highest position, the CPU 201 stops the driving of the motor 223 by controlling the drive portion 213, thus stopping the upward movement of the heating portion 86. As shown in FIG. 52, in a case where the heating portion 86 has been moved upward (in the direction of the arrow 143) to its highest position, the top surface of the heating portion 86 is positioned close to the conveyance path 103 from below. The side 901 of the base 2 has been moved farther toward the downstream side than the position above the heating portion 86 by the specified distance, and the film 24 has been moved around to the lower surface of the first plate-shaped portion 905. Therefore, in a state in which the heating portion 86 is located at its highest position, the film 24 is sandwiched between the top surface of the heating portion 86 and the lower surface of the first plate-shaped portion 905.

Figure 48:
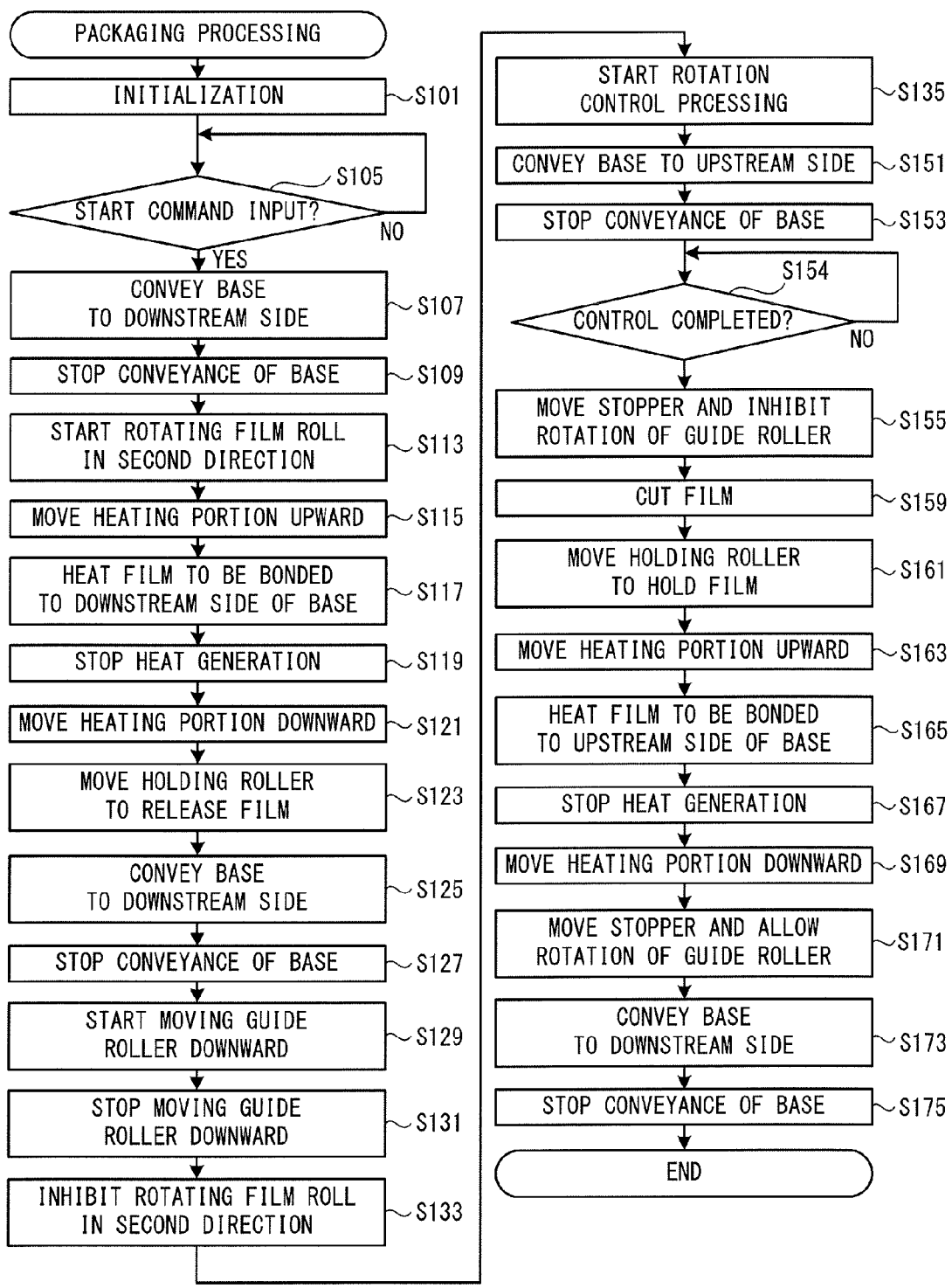
FIG. 48 is a flowchart of packaging processing according to the second embodiment.
Figure 53:
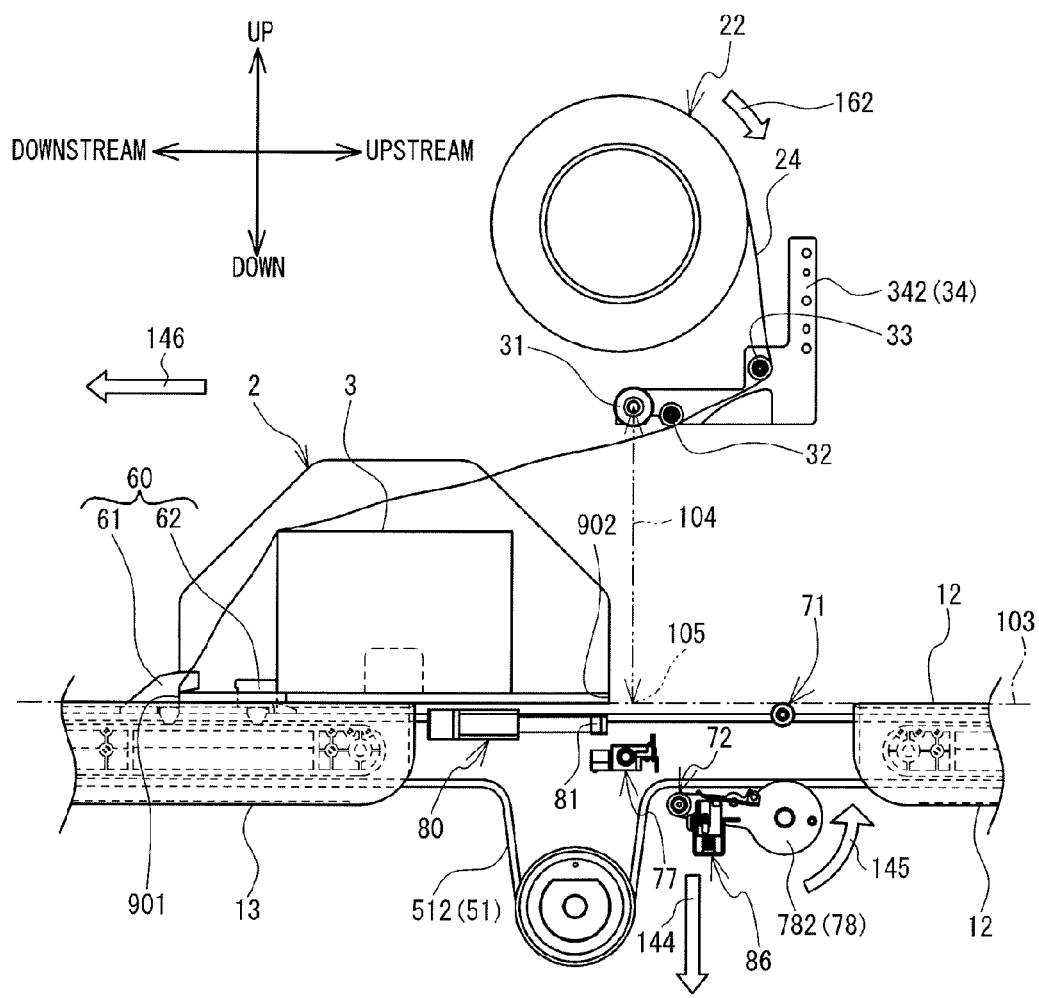
FIG. 53 is a figure that shows a packaging step in the packaging processing.

As shown in FIG. 48, the CPU 201 causes the heaters 871 of the heating portion 86 to generate heat (Step S117). The heaters 871 heat and melt the leading end of the film 24. The melted leading end of the film 24 is bonded to the lower surface of the first plate-shaped portion 905 in the vicinity of the side 901 (Step S117). The CPU 201 stops the heat generation of the heaters 871 after a specified time period has elapsed from when the heat generation of the heaters 871 is started (Step S119). The specified time period is a time period that is necessary for the heaters 871 to heat the film 24 to its melting point. The CPU 201 drives the motor 223 by controlling the drive portion 213, thus causing the heating portion 86 to move downward in the direction of the arrow 144, as shown in FIG. 53 (Step S121). The top surface of the heating portion 86 moves away from the conveyance path 103. After the heating portion 86 has reached its lowest position, the CPU 201 stops the driving of the motor 223 by controlling the drive portion 213, thus stopping the downward movement of the heating portion 86.

The CPU 201 drives the motor 226 by controlling the drive portion 216, thus causing the holding portions 78 to swing (Step S123). As shown in FIG. 53, due to the swing of the holding portions 78 in the direction of the arrow 145, the holding roller 72 is put into a state in which it is separated from the base guide roller 71 in the downward direction. The base guide roller 71 and the holding roller 72 release the leading end of the film 24 that is clamped between them. The leading end of the film 24, which was melted by being heated by the heaters 871 in the processing at Step S117 (refer to FIG. 48), is in a state in which it is bonded to the lower surface of the base 2.

As shown in FIG. 48, the CPU 201 drives the motor 222 by controlling the drive portion 212, thus causing the belts 51 to rotate in the forward direction such that the base 2 is conveyed toward the downstream side (in the direction of the arrow 146) at the conveyance speed (Step S125). The conveyance portions 60 move along the conveyance path 103 from the upstream side toward the downstream side and convey the base 2 toward the downstream side (in the direction of the arrow 146). The leading end of the film 24 has been released from the base guide roller 71 and the holding roller 72. In the state in which the leading end of the film 24 is bonded to the lower surface of the base 2, the leading end of the film 24 moves toward the downstream side in conjunction with the movement of the base 2. Note that the rotation of the motor 228 in the feeding direction has been started by the processing at Step S113, and the film roll 22 has been rotated in the second direction (in the direction of an arrow 162). Therefore, the film 24 has been fed out from the film roll 22 (refer to FIG. 53).

Since the base 2 is continuously conveyed toward the downstream side, the side 901 of the base 2 traverses the intersection position 105, at which the conveyance path 103 and the movement path 104 intersect, from the upstream side toward the downstream side. The base 2 moves farther toward the downstream side (in the direction of the arrow 146) (refer to FIG. 53). Since the base 2 moves toward the downstream side, the side 901 and the downstream end portion of the object 3 come into contact with the film 24, and the film 24 is bent at the contact portions.

The CPU 201 continuously drives the motor 222 by controlling the drive portion 212, thus causing the belts 51 to continuously rotate in the forward direction. The first conveyance portions 61 move to positions above the receiving tray 13, and the downstream section of the base 2 is conveyed to a position on the receiving tray 13. The film 24 is disposed in a position where it covers the first plate-shaped portion 905 of the base 2 and the upper side of the object 3. The upstream edge (the side 902) of the first plate-shaped portion 905 of the base 2 passes over the base guide roller 71. The base 2 is conveyed farther toward the downstream side (in the direction of the arrow 146) (refer to FIG. 53). As shown in FIG. 53, the side 902 traverses the intersection position 105 from the upstream side toward the downstream side, and is positioned on the downstream side. The film 24 that extends from the film roll 22 comes into contact with the upstream side of the second auxiliary roller 33 and is guided slightly to the upstream side. Then, the film 24 comes into contact with the lower side of the second auxiliary roller 33 and extends toward the downstream side. The film 24 comes into contact with the lower side of the first auxiliary roller 32 and extends farther toward the downstream side, eventually reaching the downstream side of the side 901 of the base 2 and the object 3. The guide roller 31 is in a state in which it is disposed above the film 24 that extends between the first auxiliary roller 32 and the base 2 and the object 3.

Based on the pulse signals that are output from the encoder 232, the CPU 201 identifies the number of rotations of the motor 222 from when the conveyance of the base 2 toward the downstream side is started at Step S125 (refer to FIG. 48). Based on the number of rotations of the motor 222, the CPU 201 determines whether or not the side 902 has been moved farther toward the downstream side than the intersection position 105. In a case where the CPU 201 determines that the side 902 has been moved farther toward the downstream side than the intersection position 105, the CPU 201 stops the driving of the motor 222 by controlling the drive portion 212, thus stopping the conveyance of the base 2, as shown in FIG. 48 (Step S127).

The CPU 201 drives the motor 221 by controlling the drive portion 211, thus causing the support portions 34 to move downward. The guide roller 31 supported by the support portions 34 starts to move from its highest position to its lowest position along the movement path 104 (Step S129). The guide roller 31 comes into contact from above with the film 24 that is disposed below the guide roller 31, and guides the film 24 downward (in the direction of the arrow 147) along the movement path 104, as shown in FIG. 54. The film 24 is pressed against the base 2 and the object 3 from above. Note that the rotation of the motor 228 in the feeding direction has been started by the processing at Step S 113, and the film roll 22 has been rotated in the second direction (in the direction of an arrow 163). Therefore, the film 24 has been fed out from the film roll 22 (refer to FIG. 54).

The CPU 201 identifies the number of rotations of the motor 221 based on the pulse signals that are output from the encoder 231 from when the downward movement of the guide roller 31 is started at Step S129. Based on the identified number of rotations, the CPU 201 determines whether or not the guide roller 31 has been positioned at its lowest position. In a case where the CPU 201 determines that the guide roller 31 has moved to its lowest position, the CPU 201 stops the driving of the motor 221, thus stopping the downward movement of the guide roller 31 (Step S131). As shown in FIG. 54, when the guide roller 31 is positioned at its lowest position, the guide roller 31 is in contact with the conveyance path 103 from below. The film 24 covers the first plate-shaped portion 905 of the base 2 and the downstream side, the upper side and the upstream side of the object 3. The CPU 201 controls the drive portion 218 and thus stops the rotation of the motor 228 in the feeding direction (Step S 133). The rotation of the motor 228 in the feeding direction has been started by the processing at Step S113, and the film roll 22 has been rotated in the second direction to feed out the film 24. The feeding out of the film 24 from the film cassette 21 has made the film 24 to be slack.

Figure 55:
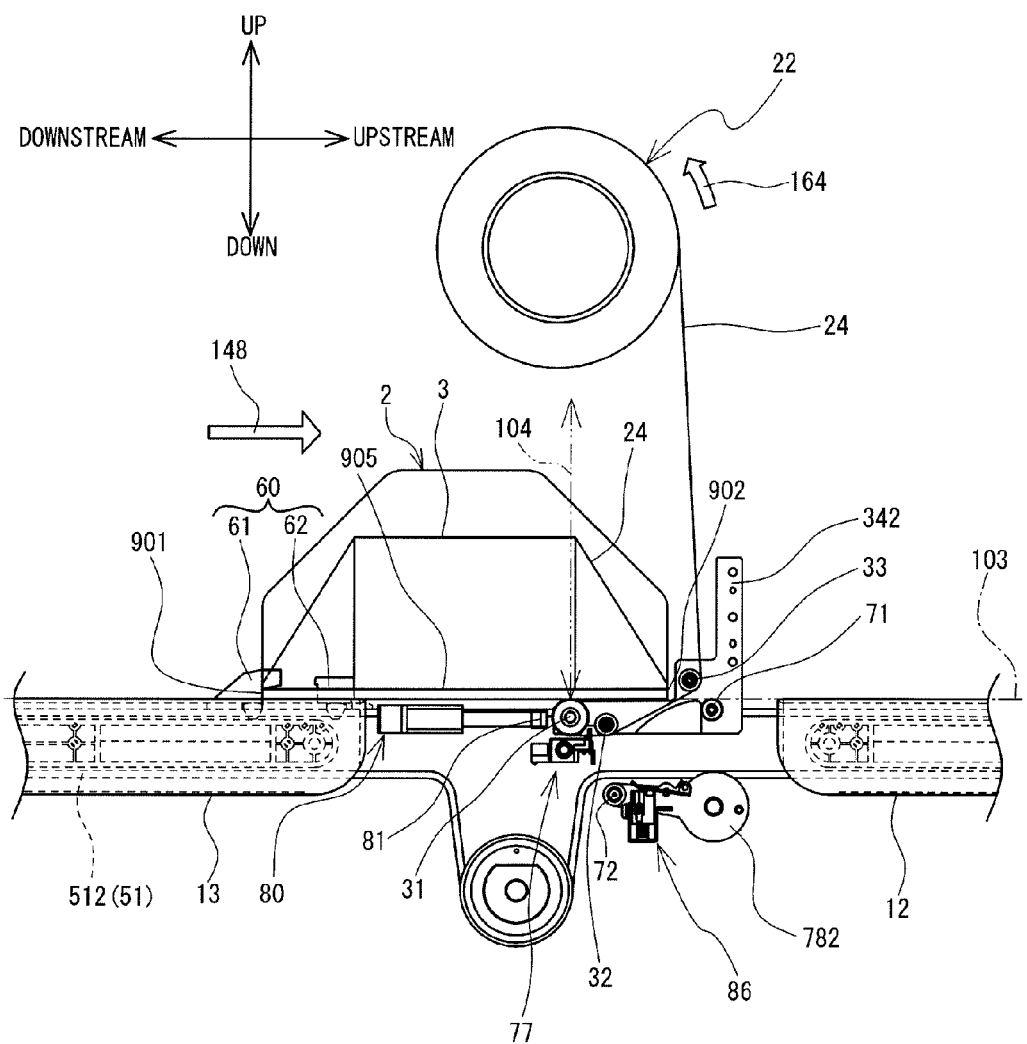
FIG. 55 is a figure that shows a packaging step in the packaging processing.

The CPU 201 starts the rotation control processing (Step S135). In the rotation control processing, the CPU 201 causes the motor 228 to rotate in the take-up direction and causes the film roll 22 to rotate in the first direction (the direction of an arrow 164), as shown in FIG. 55. The rotation of the motor 228 thus causes the slack film 24 to be taken up onto the film roll 22, and causes the film 24 to be firmly attached to the base 2 and a part of the object 3. The rotation control processing will be described in more detail later.

The CPU 201 drives the motor 222 by controlling the drive portion 212, thus causing the belts 51 to rotate in the reverse direction. The conveyance portions 60 move from the downstream side toward the upstream side and convey the base 2 along the conveyance path 103 toward the upstream side at the conveyance speed (Step S151). The base 2 is conveyed in the reverse direction (the direction from the downstream side toward the upstream side). As shown in FIG. 55, since the base 2 moves from the downstream side toward the upstream side (in the direction of the arrow 148), the side 902 of the base 2 comes into contact with the film 24 and pushes the film 24 toward the upstream side. The side 902 approaches the intersection position 105 from the downstream side. The side 902 traverses the intersection position 105 from the downstream side toward the upstream side. The side 902 passes through the position above the heating portion 86 and moves toward the upstream side. In a state in which the guide roller 31 is in contact with the lower surface of the first plate-shaped portion 905 from below, the guide roller 31 moves relatively from the side 902 toward the downstream side. The film 24 is put into a state in which it is sandwiched between the lower surface of the first plate-shaped portion 905 and the guide roller 31. The film 24 is moved around to the lower side of the base 2.

Note that, when the rotation control processing to be described later is performed, the motor 228 rotates in the take-up direction and the film roll 22 rotates in the first direction. Thus, the film 24 is taken up onto the film roll 22. Therefore, when the base 2 is conveyed toward the upstream side and the side 902 of the base 2 pushes the film 24 toward the upstream side, tension is exerted on the film 24. Due to the tension exerted on the film 24, the film 24 is firmly attached to the base 2 and a part of the object 3.

Based on the pulse signals that are output from the encoder 232, the CPU 201 identifies the number of rotations of the motor 222 from when the conveyance of the base 2 toward the upstream side is started at Step S151. Based on the identified number of rotations, the CPU 201 determines whether or not the side 902 of the base 2 has been moved farther toward the upstream side than the position above the heating portion 86 by a specified distance. When the CPU 201 determines that the side 902 has been moved farther toward the upstream side than the position above the heating portion 86 by the specified distance, the CPU 201 stops the driving of the motor 222 by controlling the drive portion 212, thus stopping the conveyance of the base 2 (Step S153). The CPU 201 advances the processing to Step S154.

The rotation control processing will be explained with reference to FIG. 49. The CPU 201 acquires the tension setting value stored in the flash ROM 208 (Step S181). The CPU 201 acquires the total number of feeding rotations and the total number of take-up rotations stored in the flash ROM 208. The CPU 201 subtracts the acquired total number of take-up rotations from the acquired total number of feeding rotations, thus calculating a difference. The difference corresponds to the amount of the film 24 that has been fed out from the film roll 22. The CPU 201 applies a specified conversion expression to the calculated difference. The conversion expression is a relational expression that can convert the difference into the remaining amount of the film 24. Thus, the CPU 201 acquires the remaining amount of the film 24 (Step S183). The CPU 201 identifies the radius of the film roll 22 based on the acquired remaining amount of the film 24 (Step S185).

The CPU 201 refers to the parameter table 2021 (refer to FIG. 47). The CPU 201 identifies the first duty ratio and the second duty ratio that are associated with the tension acquired by the processing at Step S181 and with the radius of the film roll 22 acquired by the processing at Step S185 (Step S187). The CPU 201 controls the drive portion 218 such that the pulse signals to rotate the motor 228 in the take-up direction are output from the drive portion 218 to the motor 228 (Step S189). Note that the pulse signals that the CPU 201 causes the drive portion 218 to output at Step S189 are pulse signals of the first duty ratio identified by the processing at Step S187 and of a specified frequency.

Figure 50:
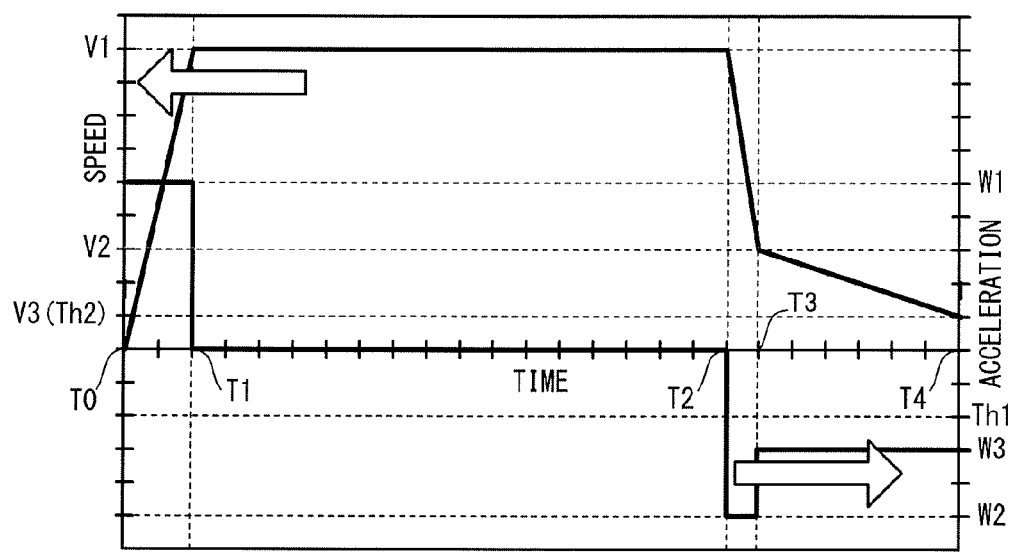
FIG. 50 is a graph that shows a speed and an acceleration of a motor 228.

As shown in FIG. 50, when the pulse signals of the first duty ratio are output to the motor 228, the rotation speed of the motor 228 in the take-up direction increases from 0 to the speed V1 with an acceleration W1 during a period from a time T0 to a time T1. After that, during a period from the time T1 to a time T2, the rotation speed of the motor 228 is constant at the speed V1. In this case, the acceleration of the motor 228 is zero (0). Note that the period from the time T0 to the time T2 corresponds to a process in which the film roll 22 rotates in the first direction due to the motor 228 rotating in the take-up direction and the surplus film 24 is taken up onto the film roll 22. Note that the surplus film 24 is the slack part of the film 24 fed out from the film roll 22 by the processing from Step S113 to Step S133 (refer to FIG. 48). Since the first duty ratio is larger than the second duty ratio, the rotation speed and the torque of the motor 228 are larger than the rotation speed and the torque of the motor 228 when the pulse signals of the second duty ratio are output to the motor 228. By thus relatively ioncreasing the rotation speed of the motor 228, it is possible to take up the surplus film 24 onto the film roll 22 at a high speed. Although the torque of the motor 228 is also increased relatively, a large tension is not exerted on the film 24 because the film 24 is in a slack state. Hereinafter, a force in the direction to stop the rotation, which is generated in the motor 228 during the period from the time T0 to the time T2 in which the film 24 is taken up onto the film roll 22, is denoted by a load X1.

The surplus film 24 is taken up onto the film roll 22 and the base 2 is conveyed toward the upstream side by the processing at Step S151 (refer to FIG. 48). As a result, at the time T2, a load X2 that is larger than the load X1 is generated in the motor 228. The rotation of the motor 228 is obstructed by the generation of the load X2. At the time T2, the acceleration of the motor 228 decreases from zero (0) to an acceleration W2 (W2<0<W1).

Figure 49:
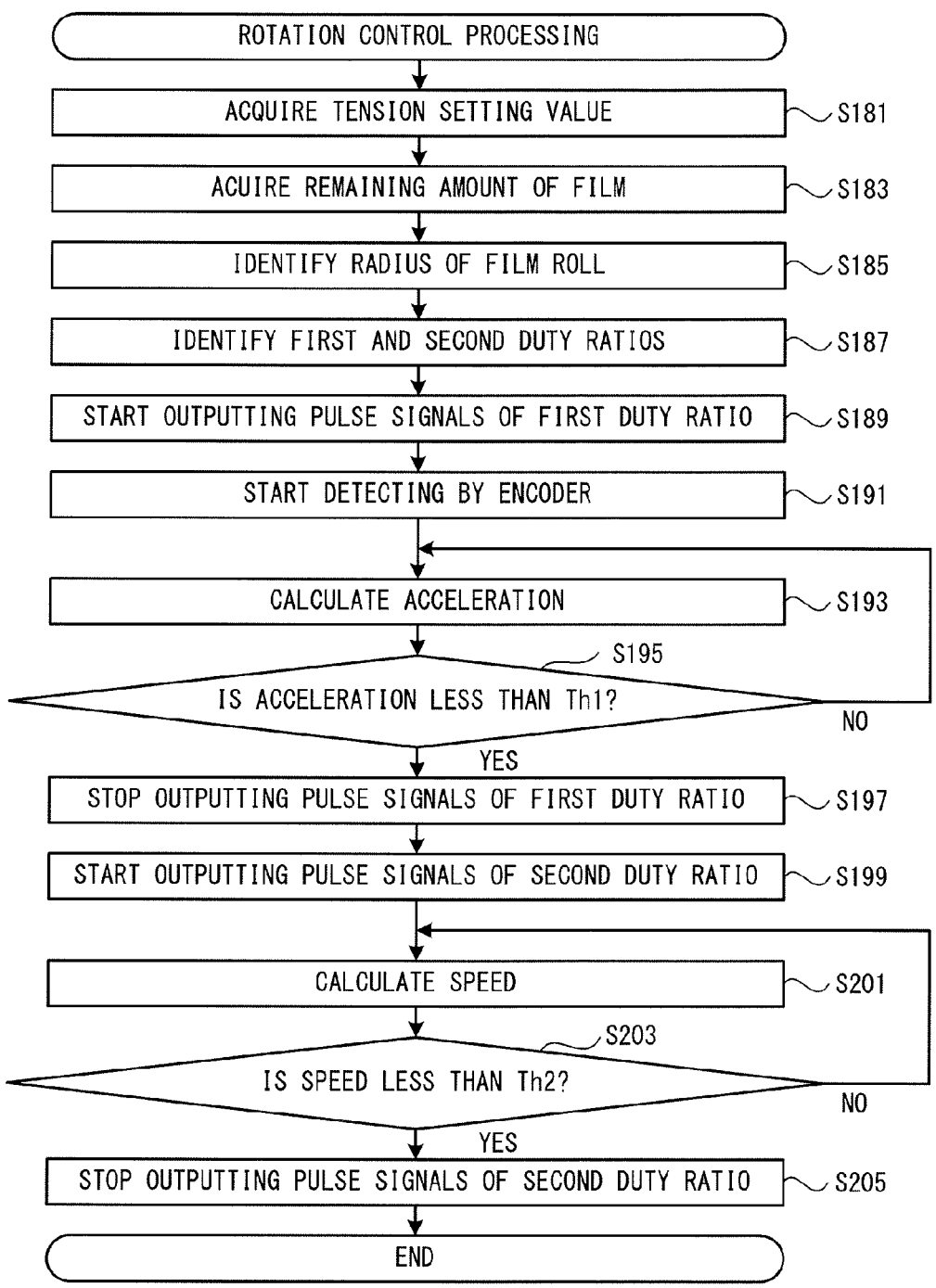
FIG. 49 is a flowchart of rotation control processing.

As shown in FIG. 49, after the CPU 201 has controlled the drive portion 218 by the processing at Step S189, the CPU 201 starts to detect the pulse signals that are output from the encoder 237 (Step S191). The CPU 201 calculates the acceleration of the motor 228 based on the number of pulse signals detected per unit time (Step S193). The CPU 201 determines whether or not the calculated acceleration is less than a specified threshold value Th1 (W2<Th1<0, refer to FIG. 50) (Step S195). In a case where the CPU 201 determines that the calculated acceleration is equal to or more than the threshold value Th1 (NO at Step S195), the CPU 201 returns the processing to Step S193. The CPU 201 continues the processing that compares the acceleration calculated by the processing at Step S193 and the threshold value Th1. In a case where the CPU 201 determines that the calculated acceleration is less than the threshold value Th1 (YES at Step S195), the CPU 201 advances the processing to Step S197. Note that, as shown in FIG. 50, when the surplus film 24 has been taken up onto the film roll 22, the strong load X2 is generated in the motor 228 and the acceleration decreases to the acceleration W2. Therefore, the CPU 201 can determine whether or not the surplus film 24 has been taken up on the film roll 22 by determining whether or not the calculated acceleration is less than the threshold value Th1. As shown in FIG. 49, the CPU 201 controls the drive portion 218 and thus stops the output of the pulse signals of the first duty ratio that has been started by the processing at Step S189 (Step S197).

Next, the CPU 201 controls the drive portion 218 such that the pulse signals to rotate the motor 228 in the take-up direction are output from the drive portion 218 to the motor 228 (Step S199). Note that the pulse signals that the CPU 201 causes the drive portion 218 to output at Step S199 are pulse signals of the second duty ratio identified by the processing at Step S187 and of the specified frequency.

As shown in FIG. 50, when the pulse signals of the second duty ratio are output to the motor 228, the speed of the motor 228 decreases to the speed V2, which is less than the speed V1 when the pulse signals of the first duty ratio are output to the motor 228, with the acceleration W2 during a period from the time T2 to a time T3. After that, during a period from the time T3 to a time T4, the rotation speed of the motor 228 decreases to a speed V3. Note that the period from the time T3 to the time T4 corresponds to a process in which the film roll 22 rotates in the first direction due to the motor 228 rotating in the take-up direction such that the film 24 is gradually taken up onto the film roll 22 and the film 24 is firmly attached to the base 2 and a part of the object 3. Since the second duty ratio is smaller than the first duty ratio, the rotation speed and the torque of the motor 228 are less than the rotation speed and the torque of the motor 228 when the pulse signal of the first duty ratio is output to the motor 228. By relatively reducing the torque of the motor 228, it is possible to inhibit a large tension from being exerted on the film 24. Therefore, the base 2 and the object 3 are inhibited from being deformed due to the film 24 being pressed against the base 2 and the object 3 with a strong force.

As shown in FIG. 49, the CPU 201 calculates the speed of the motor 228 based on the number of pulse signals detected per unit time (Step S210). The CPU 201 determines whether or not the calculated speed is less than a specified threshold value Th2 (Th2=V3, refer to FIG. 50) (Step S203). In a case where the CPU 201 determines that the calculated speed is equal to or more than the threshold value Th2 (NO at Step S203), the CPU 201 returns the processing to Step S201. The CPU 201 continues the processing that compares the speed calculated by the processing at Step S201 and the threshold value Th2. Note that, in a state in which the speed of the motor 228 is sufficiently small, the tension to firmly attach a part of the film 24 to the base 2 and the object 3 is exerted on the film 24. In a case where the CPU 201 determines that the calculated speed is less than the threshold value Th2 (YES at Step S203), the CPU 201 controls the drive portion 218 and thus stops the output of the pulse signals of the second duty ratio that has been started by the processing at Step S199 (Step S205). The CPU 201 ends the rotation control processing.

Figure 56:
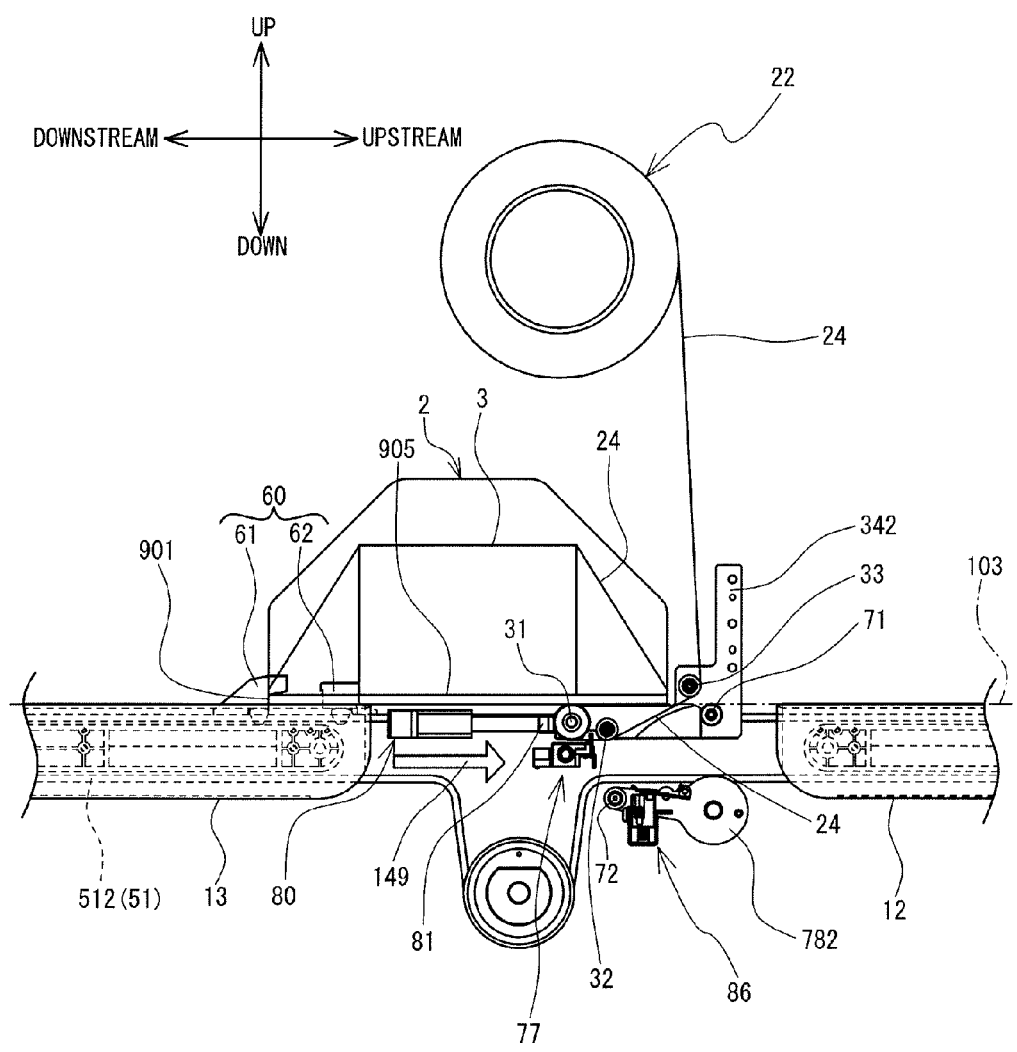
FIG. 56 is a figure that shows a packaging step in the packaging processing.

As shown in FIG. 48, after the processing at Step S153, the CPU 201 determines whether or not the rotation control processing is completed (Step S154). In a case where the CPU 201 determines that the rotation control processing is not completed (NO at Step S154), the CPU 201 returns the processing to Step S154. In a case where the CPU 201 determines that the rotation control processing is completed (YES at Step S154), the CPU 201 drives the motor 224 by controlling the drive portion 214, thus causing the stopper 81 of the rotation inhibiting portion 80 to move toward the upstream side (Step S155). As shown in FIG. 56, the guide roller 31, which has moved to its lowest position, is positioned on the upstream side of the stopper 81 of the rotation inhibiting portion 80. The movement of the stopper 81 toward the upstream side (in the direction of the arrow 149) causes the rubber strip 811 of the stopper 81 to come close to the guide roller 31, such that the film 24 that is wound around the guide roller 31 is clamped between the rubber strip 811 and the guide roller 31. The rubber strip 811 pushes the guide roller 31 toward the upstream side via the film 24, and thus the guide roller 31 is inhibited from rotating. The film 24 is clamped between the guide roller 31 and the rubber strip 811.

The CPU 201 drives the motor 225 by controlling the drive portion 215, thus moving the cutting portion 77 from the left to the right along the guide rail 74 (refer to FIG. 18) (Step S159). The movement of the cutting portion 77 to the right causes the film 24 to be cut by the blade portion 771, in the section of the film 24 that is closer to the film roll 22 than the section of the film 24 that is clamped between the guide roller 31 and the rubber strip 811. The cutting portion 77 cuts the section of the film 24 that covers the first plate-shaped portion 905 of the base 2 and the object 3, away from the section of the film 24 that is on the film roll 22 side.

Figure 57:
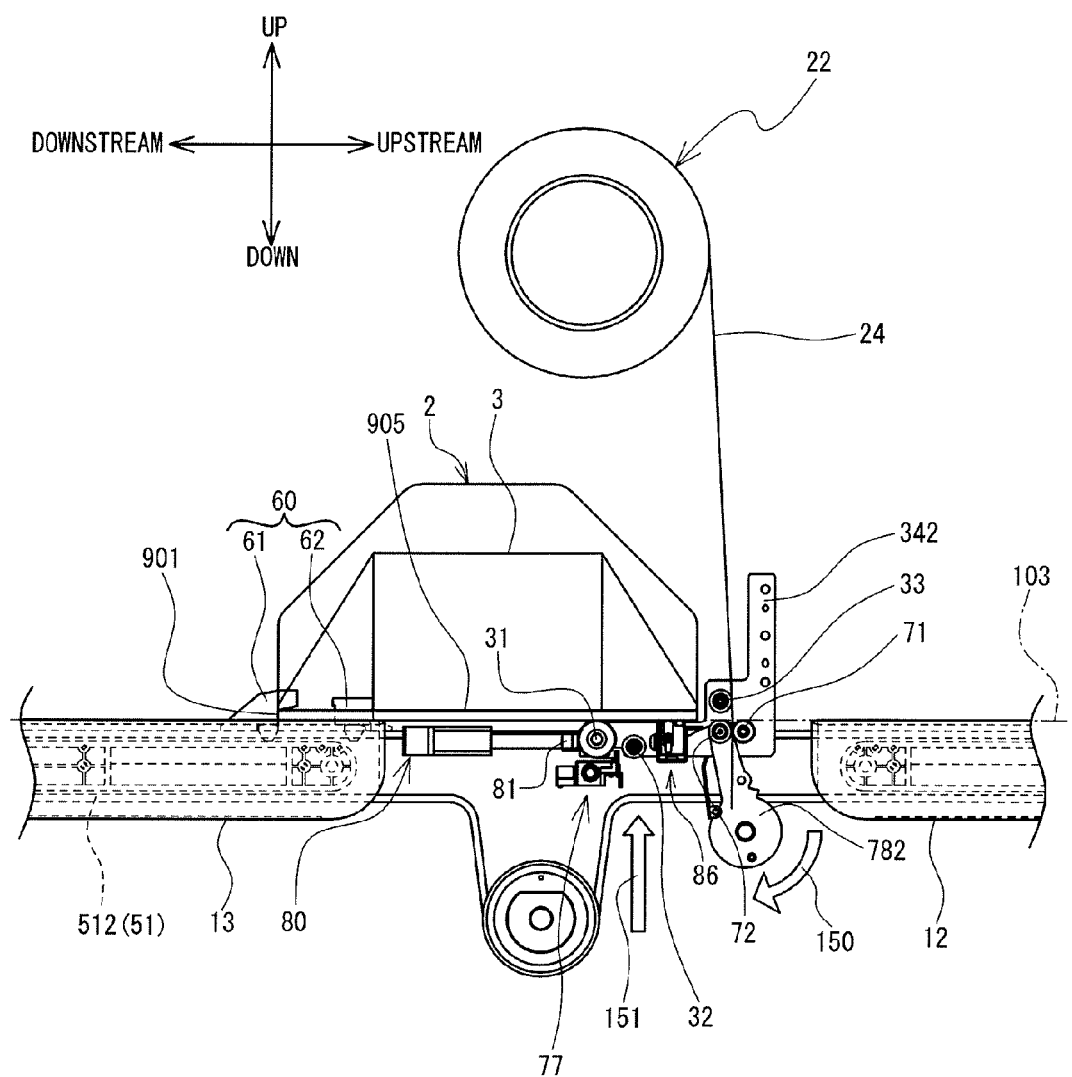
FIG. 57 is a figure that shows a packaging step in the packaging processing.

After the film 24 has been cut, the cut end of the film 24 that extends from the film roll 22 hangs down below the base guide roller 71. The CPU 201 drives the motor 226 by controlling the drive portion 216, thus causing the holding portions 78 to swing (Step S161). As shown in FIG. 57, the holding portions 78 swing in the direction of the arrow 150. The holding roller 72 is put into a state in which it is positioned close to the downstream side of the base guide roller 71. The end of the film 24 that has been cut by the cutting portion 77 is clamped by the base guide roller 71 and the holding roller 72.

As shown in FIG. 48, the CPU 201 drives the motor 223 by controlling the drive portion 213, thus causing the heating portion 86 to move upward (Step S163). After the heating portion 86 has been located at its highest position, the CPU 201 stops the driving of the motor 223 by controlling the drive portion 213, thus stopping the upward movement of the heating portion 86. As shown in FIG. 57, in the state in which the heating portion 86 has been moved upward (in the direction of the arrow 151) to its highest position, the top surface of the heating portion 86 is in a state in which it is positioned close to the conveyance path 103 from below. Note that the side 902 of the base 2 has been moved farther toward the upstream side than the position above the heating portion 86 by the specified distance. The film 24, which has been guided by the guide roller 31, is positioned along the lower surface of the first plate-shaped portion 905, close to the side 902. Therefore, in a case where the heating portion 86 has been moved upward and is located at its highest position, the film 24 is in a state in which it is sandwiched between the top surface of the heating portion 86 and the base 2.

Figure 58:
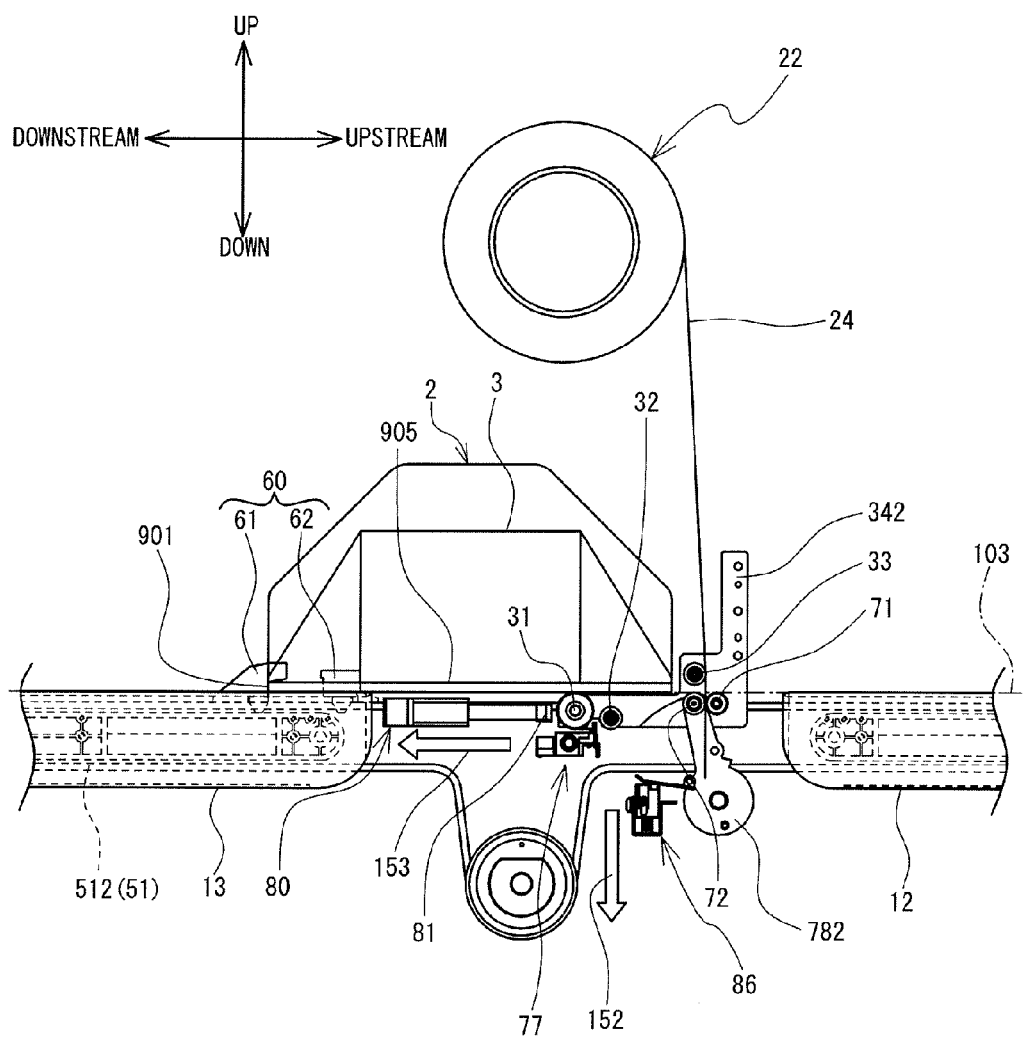
FIG. 58 is a figure that shows a packaging step in the packaging processing.

As shown in FIG. 48, the CPU 201 causes the heaters 871 of the heating portion 86 to generate heat (Step S165). The heaters 871 heat the end of the film 24 that was cut by the cutting portion 77, thereby melting the film 24. The melted film 24 is bonded to the lower surface of the first plate-shaped portion 905, in the vicinity of the side 902 (Step S165). The film 24 that was cut away from the film roll 22 is put into a state in which it covers the base 2 and the object 3. The CPU 201 stops the heat generation of the heaters 871 after a specified time period has elapsed from when the heat generation of the heaters 871 is started at Step S165 (Step S167). The CPU 201 drives the motor 223 by controlling the drive portion 213, thus causing the heating portion 86 to move downward in the direction of the arrow 152, as shown in FIG. 58 (Step S169). The top surface of the heating portion 86 moves away from the conveyance path 103. After the heating portion 86 has reached its lowest position, the CPU 201 stops the rotation of the motor 223 by controlling the drive portion 213.

The CPU 201 drives the motor 224 by controlling the drive portion 214, thus causing the stopper 81 of the rotation inhibiting portion 80 to move toward the downstream side (in the direction of the arrow 153), as shown in FIG. 58 (Step S171). The stopper 81 moves toward the downstream side, and the rubber strip 811 that is provided on the stopper 81 separates from the guide roller 31. The guide roller 31 is put into a state in which it can rotate. The CPU 201 drives the motor 222 by controlling the drive portion 212, thus causing the belts 51 to rotate in the forward direction such that the base 2 is conveyed toward the downstream side (Step S173). The base 2 and the object 3, for which the packaging has been completed, are conveyed toward the downstream side. Based on the pulse signals that are output from the encoder 232, the CPU 201 identifies the number of rotations of the motor 222 from when the conveyance of the base 2 toward the downstream side is started at Step S173. Based on the identified number of rotations, the CPU 201 determines whether or not the first conveyance portions 61 have been moved toward the downstream side and have reached the downstream end portion of the receiving tray 13. In a case where the CPU 201 determines that the first conveyance portions 61 have been moved toward the downstream side and have reached the downstream end portion of the receiving tray 13, the CPU 201 stops the driving of the motor 222 by controlling the drive portion 212, thus stopping the conveyance of the base 2 (Step S175). The packaging processing ends.

As explained above, after the base 2 and a part of the object 3 have been covered by the film 24 (Step S107 to Step S133), the CPU 201 causes the motor 228 to rotate in the direction (the take-up direction) in which the film 24 is taken up (the rotation control processing, Step S135 and FIG. 49). Thus, the CPU 201 can cause the film roll 22 to rotate in the first direction and cause the film 24 to be firmly attached to the base 2 and a part of the object 3. After the film 24 has been taken up by the rotation control processing (Step S135 and FIG. 49), the CPU 201 causes the other end of the film 24 to be bonded to the base 2 (Step S165). Therefore, the CPU 201 can appropriately package the base 2 and the object 3 with the film 24.

In the rotation control processing, the CPU 201 controls the drive portion 218 such that the pulse signals of the first duty ratio, which is relatively large r, are first output to the motor 228 (Step S189). By doing this, it is possible to rotate the film roll 22 at a relatively high speed. Therefore, the CPU 201 can cause the film 24 to be taken up at a high speed, and it is possible to shorten the time to complete the packaging of the base 2 and the object 3 with the film 24. Further, the CPU 201 controls the drive portion 218 such that the pulse signals of the second duty ratio, which is relatively small, are subsequently output to the motor 228 (Step S199). By doing this, it is possible to apply a relatively small tension to the film 24. Therefore, the CPU 201 can inhibit the object 3 from being deformed due to the film 42 being pressed against a part of the object 3 with a strong force.

In a case where the acceleration of the motor 228 is less than the threshold value Th1 (YES at Step S95), the CPU 201 determines that the surplus portion of the film 24 fed out from the film roll 22 has been taken up on the film roll 22. In this state, the film 24 has been firmly attached to the base 2 and a part of the object 3. The CPU 201 switches the duty ratio of the pulse signals for the motor 228 from the first duty ratio to the second duty ratio (Step S197, Step S199). In this case, the rotation speed of the motor 228 switches from a relatively high state to a relatively low state. Therefore, until the film 24 is firmly attached to the base 2 and a part of the object 3, the CPU 201 can cause the surplus film 24 to be taken up at a high speed. Therefore, the CPU 201 can appropriately shorten the time to complete the packaging of the base 2 and the object 3 with the film 24. Further, the CPU 201 can inhibit a large torque from being applied to the motor 228 in a state in which the film 24 is firmly attached to the base 2 and a part of the object 3. Therefore, the CPU 201 can inhibit a strong tension from being exerted on the film 24 in the state in which the film 24 is firmly attached to the base 2 and a part of the object 3. It is thus possible to more appropriately inhibit the base 2 and the object 3 from being deformed by the film 24.

In a case where the speed of the motor 228 is less than the threshold value Th2, the amount of rotation of the motor 228 in the take-up direction is small. Therefore, the CPU 201 determines that a sufficient tension to firmly attach the film 24 to the base 2 and a part of the object 3 is being exerted on the film 24 (YES at Step S203). In this case, the CPU 201 stops the rotation of the motor 228 in the take-up direction (Step S205). Thus, the CPU 201 can inhibit the tension of the film 24 from becoming higher than a target tension, and it is thus possible to more appropriately inhibit the base 2 and the object 3 from being deformed by the film 24.

The duty ratio of the pulse signals when the motor 228 is caused to rotate in order to exert a desired tension on the film 24, and the duty ratio of the pulse signals when the motor 228 is caused to rotate at a desired take-up speed vary depending on the remaining amount of the wound film 24. This is because the length from the rotating shaft of the film roll 22 to the film 24 immediately before the film 24 is fed out (the radius of the film roll 22) varies depending on the amount of the wound film 24. To address this, the CPU 201 can change the first duty ratio and the second duty ratio depending on the remaining amount of the film 24. Thus, the CPU 201 can drive the motor 228 at an appropriate torque and an appropriate rotation speed.

The CPU 201 forcibly feeds out the film 24 from the film roll 22 by causing the motor 228 to rotate in the feeding direction, during the period (Step S131 to Step S133) until the base 2 and the object 3 are conveyed toward the upstream side. By doing this, the tension that is exerted on the film 24 is weakened. Therefore, the CPU 201 can weaken the force when the film 24 is pressed against the base 2 and a part of the object 3 during the conveyance, and it is thus possible to more appropriately inhibit the base 2 and the object 3 from being deformed by the film 24.

Various modifications can be made to the above-described second embodiment. The CPU 201 need not necessarily rotate the motor 228 in the feeding direction by the processing at Step S113, and need not necessarily feed out the film 24 from the film roll 22. More specifically, the CPU 201 may rotate the motor 228 in the take-up direction by the rotation control processing (Step S135), and may perform only the processing that takes up the film 24 onto the film roll 22. Further, in this case, the CPU 201 may start the rotation of the motor 228 in the take-up direction at any time during the period after the film 24 is bonded to the downstream side of the base 2 by the processing at Step S117 until the downward movement of the guide roller 31 is stopped by the processing at Step S131.

The CPU 201 may switch the first duty ratio and the second duty ratio corresponding to a temperature, instead of switching the first duty ratio and the second duty ratio corresponding to the tension setting value and the radius of the film roll 22. Details of the processing in this case are as follows. The packaging device 5 may include a temperature sensor. Although the temperature sensor may be provided at any position, the temperature sensor may preferably be provided close to the film cassette 21. The temperature, the first duty ratio and the second duty ratio may be associated and stored in the parameter table 2021. The CPU 201 may acquire the temperature from the temperature sensor by the processing that corresponds to Step S181 to Step S185. The CPU 201 may identify the first duty ratio and the second duty ratio that are associated with the acquired temperature, through the processing at Step S187.

The reason why the first duty ratio and the second duty ratio are switched corresponding to the temperature is that the second duty ratio when the motor 228 is caused to rotate in the take-up direction with the torque necessary to exert a specified tension on the film 24 varies depending on the temperature of the film 24. Further, in a case where the second duty ratio changes corresponding to the temperature, the duty ratio (the first duty ratio) of the pulse signals, which causes the motor 228 to rotate in the take-up direction at a speed faster than the rotation speed when the motor 228 rotates in the take-up direction based on the pulse signals of the second duty ratio, also changes.

As described above, in a case where the first duty ratio and the second duty ratio to be identified are switched corresponding to the temperature, even if the temperature of the film 24 changes, the CPU 201 can cause the motor 228 to rotate at an appropriate speed and also can cause an appropriate tension to be exerted on the film 24.

The CPU 201 may identify the first duty ratio and the second duty ratio without using the parameter table 2021. For example, a specified calculation formula that indicates relationships between the tension and the radius of the film roll 22 and the first duty ratio and the second duty ratio may be stored in the flash ROM 208. The CPU 201 may calculate the first duty ratio and the second duty ratio by substituting the tension and the radius into the calculation formula.

The CPU 201 need not necessarily switch the first duty ratio and the second duty ratio corresponding to the tension setting value, the radius of the film roll 22 and the temperature etc. More specifically, the CPU 201 may cause the motor 228 to rotate in the take-up direction by causing the pulse signals of the uniform first duty ratio and the uniform second duty ratio to be output to the motor 228.

In the above-described second embodiment, after the CPU 201 causes the pulse signals of the first duty ratio to be output to the motor 228 and thus causes the motor 228 to rotate in the take-up direction (Step S189), in a case where the acceleration of the motor 228 becomes less than the threshold value Th1 (YES at Step S195), the CPU 201 causes the pulse signals of the second duty ratio to be output to the motor 228 and thus causes the motor 228 to rotate in the take-up direction (Step S199). The CPU 201 may use a different method to determine the time at which the duty ratio of the pulse signals to be output to the motor 228 is switched. For example, the CPU 201 may directly measure the tension of the film 24. Then, after the CPU 201 causes the pulse signals of the first duty ratio to be output to the motor 228, in a case where the measured tension becomes less than a specified threshold value, the CPU 201 may cause the pulse signals of the second duty ratio to be output to the motor 228. Alternatively, for example, when a specified time period has elapsed after the CPU 201 causes the pulse signals of the first duty ratio to be output to the motor 228, the CPU 201 may cause the pulse signals of the second duty signal to be output to the motor 228.

In the above-described second embodiment, the CPU 201 switches the duty ratio to be output to the motor 228. Thus, the CPU 201 adjusts an electrical quantity to be output to the motor 228 and controls the rotation speed of the motor 228 and the tension that is exerted on the film 24. The CPU 201 may adjust the electrical quantity to be output to the motor 228, using any parameter that is different from the duty ratio.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A packaging device configured to package, with a film, a base and an object placed on the base, the packaging device comprising:
    a conveyance mechanism configured to convey the base on which the object is placed;
    a guide portion configured to move along a movement path and configured to guide the film, the movement path extending in a direction that intersects a conveyance path along which the base conveyed by the conveyance mechanism passes;
    a rotation mechanism configured to rotate a film roll, around which the film is wound, around a winding center as an axis;
    a bonding mechanism configured to bond the film to the base;
    a processor; and
    a memory storing computer-readable instructions that, when executed by the processor, cause the packaging device to:
        cause the bonding mechanism to bond a first section of the film to the base, the first section being a part of the film,
        cause the conveyance mechanism to convey the base from an upstream side toward a downstream side in a conveyance direction with respect to an intersection position, the intersection position being a position at which the conveyance path and the movement path intersect,
        move the guide portion along the movement path when the base is conveyed toward the downstream side and an edge of the base on the upstream side is moved farther toward the downstream side than the intersection position;
        cause the conveyance mechanism to convey the base toward the upstream side after the guide portion is moved;
        cause the bonding mechanism to bond a second section of the film to the base when the base is conveyed toward the upstream side and the edge of the base on the upstream side is moved farther toward the upstream side than the intersection position, the second section being a part of the film and being different from the first section, and
        cause the rotation mechanism to move the film in an opposite direction to a feeding direction at any time during a period after the first section is bonded to the base and before the second section is bonded to the base, the feeding direction being a direction in which the film is fed out from the film roll that is rotated by the rotation mechanism when the base is conveyed toward the downstream side in the conveyance direction.

2. The packaging device according to claim 1, wherein the computer-readable instructions, when executed by the processor, further cause the packaging device to:
    cause the conveyance mechanism to convey the base from the upstream side toward the downstream side with respect to the intersection position after causing the bonding mechanism to bond the first section to the base.

3. The packaging device according to claim 1,
    wherein the causing the rotation mechanism to move the film includes causing the rotation mechanism to move the film in the opposite direction at any time during a period after the conveyance of the base from the upstream side toward the downstream side is started and before the movement of the guide portion is started.

4. The packaging device according to claim 1,
wherein the causing the rotation mechanism to move the film includes causing the rotation mechanism to move the film in the opposite direction at any time during a period after the movement of the guide portion is started and before the conveyance of the base toward the upstream side is started.

5. The packaging device according to claim 1,
wherein the causing the rotation mechanism to move the film includes causing the rotation mechanism to move the film in the opposite direction at any time during a period after the conveyance of the base toward the upstream side is started and before causing the bonding mechanism to bond the second section to the base.

6. The packaging device according to claim 5,
wherein the causing the rotation mechanism to move the film includes causing the rotation mechanism to move the film in the opposite direction at any time during a period after the conveyance of the base toward the upstream side is finished and before causing the bonding mechanism to bond the second section to the base.

7. The packaging device according to claim 1,
wherein the causing the rotation mechanism to move the film includes causing the rotation mechanism to move the film in the opposite direction by causing the rotation mechanism to rotate the film roll in a first direction, the first direction being a direction in which the film is taken up onto the film roll.

8. The packaging device according to claim 1, further comprising:
an acquiring portion configured to acquire an information that indicates a force to be exerted on the film in the opposite direction,
wherein the computer-readable instructions, when executed by the processor, further cause the packaging device to:
cause the acquiring portion to acquire the information that indicates the force to be exerted on the film in the opposite direction when the film is moved in the opposite direction by the rotation mechanism, and
wherein the causing the rotation mechanism to move the film includes causing the rotation mechanism to move the film in the opposite direction by controlling the rotation mechanism based on the force that is indicated by the acquired information.

9. The packaging device according to claim 1, further comprising:
a current supply portion configured to output a current and
a DC motor provided in the rotation mechanism and configured to rotate, at least in a first direction, the film roll, by the current outputted from the current supply portion, the first direction being a direction in which the film is taken up onto the film roll,
wherein:
the causing the rotation mechanism to move the film includes causing the rotation mechanism to move the film in the opposite direction by causing the current supply portion to output a first current of a first electrical quantity to the DC motor to rotate the film roll in the first direction, and
the causing the rotation mechanism to move the film includes causing the rotation mechanism, after causing the current supply portion to output the first current of the first electrical quantity, to move the film in the opposite direction by causing the current supply portion to output a second current of a second electrical quantity to the DC motor to rotate the film roll in the first direction, the second electrical quantity being smaller than the first electrical quantity.

10. The packaging device according to claim 9, further comprising:
a detection portion configured to detect a number of rotations of the DC motor;
an identifying portion configured to identify an acceleration of the DC motor based on the detected number of rotations and
a determination portion configured to compare the acceleration with a specified threshold value,
wherein the computer-readable instructions, when executed by the processor, further cause the packaging device to:
cause the detection portion to detect a number of rotations of the DC motor;
cause the identifying portion to identify an acceleration of the DC motor based on the detected number of rotations; and
cause the current supply portion to change an electrical quantity of the current to be output to the DC motor from the first electrical quantity to the second electrical quantity when the determination portion determines that the identified acceleration of the DC motor changes from a state in which the identified acceleration is equal to or larger than the threshold value to a state in which the identified acceleration is smaller than the threshold value.

11. The packaging device according to claim 9, further comprising:
a detection portion configured to detect a number of rotations of the DC motor;
an identifying portion configured to identify a speed of the DC motor based on the detected number of rotations and
a determination portion configured to compare the identified speed with a specified threshold value,
wherein to the computer-readable instructions, when executed by the processor, further cause the packaging device to:
cause the detection portion to detect a number of rotations of the DC motor;
cause the identifying portion to identify a speed of the DC motor based on the detected number of rotations; and
cause the current supply portion to stop the output of the current of the second electrical quantity when the determination portion determines that the identified speed changes from a state in which the identified speed is equal to or larger than the threshold value to a state in which the identified speed is smaller than the threshold value.

12. The packaging device according to claim 9, further comprising:
a film amount acquiring portion configured to acquire an amount of the film wound around the film roll; and
an identifying portion configured to identify the first electrical quantity and the second electrical quantity that correspond to the amount of the film,
wherein the computer-readable instructions, when executed by the processor, further cause the packaging device to:
cause the film amount acquiring portion to acquire an amount of the film wound around the film roll;
cause the identifying portion to identify the first electrical quantity and the second electrical quantity that correspond to the acquired amount of the film;

cause the supply current portion to output the current of the identified first electrical quantity to the DC motor; and cause the supply current portion to output the current of the identified current of the identified second electrical quantity to the DC motor after outputting the current of the identified first electrical quantity.

13. The packaging device according to claim 9, further comprising:

an input portion configured to acquire a tension of the film; and an identifying portion configured to identify the first electrical quantity and the second electrical quantity that correspond to the tension of the film, wherein the computer-readable instructions, when executed by the processor, further cause the packaging device to:

cause the input portion to acquire the tension of the film, the tension being input via an input portion, cause the identifying portion to identify the first electrical quantity and the second electrical quantity that correspond to the acquired tension;

cause the current supply portion to output the current of the identified first electrical quantity to the DC motor; and cause the current supply portion to output the current of the identified second electrical quantity to the DC motor after outputting the current of the identified first electrical quantity.

14. The packaging device according to claim 9, further comprising:

a temperature acquiring portion configured to acquire a temperature of the film; and an identifying portion configured to identify the first electrical quantity and the second electrical quantity that correspond to the temperature of the film, wherein the computer-readable instructions, when executed by the processor, further cause the packaging device to:

cause the temperature acquiring portion to acquire the temperature of the film;

cause the identifying portion to identify the first electrical quantity and the second electrical quantity that correspond to the acquired temperature;

cause the current supply portion to output the current of the identified first electrical quantity to the DC motor; and cause the current supply portion to output the current of the identified second electrical quantity to the DC motor after outputting the current of the identified first electrical quantity.

15. The packaging device according to claim 9, wherein:

the causing the rotation mechanism to move the film includes causing the rotation mechanism to move the film in the feeding direction by causing the DC motor to rotate the film roll in a second direction, the second direction being a direction opposite to the first direction, and the computer-readable instructions, when executed by the processor, further cause the packaging device to:

cause the DC motor to rotate the film roll in the second direction during at least a part of a period before the film roll is rotated in the first direction.

16. The packaging device according to claim 1, wherein:

the bonding mechanism includes a heating portion provided with at least a bonding heater, the causing the bonding mechanism to bond the first section of the film to the base includes causing the bonding mechanism to bond the first section of the film to a downstream end portion of the base by causing the heating portion to heat the first section of the film, and the causing the bonding mechanism to bond the second section of the film to the base includes causing the bonding mechanism to bond the second section of the film to an upstream end portion of the base by causing the heating portion to heat the second section of the film.

* * * * *